United States Patent
Wang et al.

(10) Patent No.: US 12,486,251 B2
(45) Date of Patent: Dec. 2, 2025

(54) CBP/EP300 INHIBITOR AND USE THEREOF

(71) Applicant: PHARMABLOCK SCIENCES (NANJING), INC., Jiangsu (CN)

(72) Inventors: Lisha Wang, Jiangsu (CN); Enge Zhang, Jiangsu (CN); Jin Li, Jiangsu (CN)

(73) Assignee: PHARMABLOCK SCIENCES (NANJING), INC., Jiangsu (CN)

( * ) Notice: Subject to any disclaimer, the term of this patent is extended or adjusted under 35 U.S.C. 154(b) by 629 days.

(21) Appl. No.: 17/920,890

(22) PCT Filed: Apr. 25, 2021

(86) PCT No.: PCT/CN2021/089486
§ 371 (c)(1),
(2) Date: Oct. 24, 2022

(87) PCT Pub. No.: WO2021/213521
PCT Pub. Date: Oct. 28, 2021

(65) Prior Publication Data
US 2023/0159497 A1    May 25, 2023

(30) Foreign Application Priority Data
Apr. 25, 2020 (CN) .......................... 202010335713.9

(51) Int. Cl.
| | |
|---|---|
| *C07D 401/14* | (2006.01) |
| *A61K 31/4725* | (2006.01) |
| *C07D 405/14* | (2006.01) |
| *C07D 413/14* | (2006.01) |
| *C07D 417/14* | (2006.01) |
| *C07D 471/04* | (2006.01) |
| *C07D 491/048* | (2006.01) |

(52) U.S. Cl.
CPC ......... *C07D 401/14* (2013.01); *C07D 405/14* (2013.01); *C07D 413/14* (2013.01); *C07D 417/14* (2013.01); *C07D 471/04* (2013.01); *C07D 491/048* (2013.01)

(58) Field of Classification Search
CPC .. C07D 401/14; C07D 471/04; C07D 413/14; A61K 31/4725; A61K 31/4375; A61K 31/536

USPC ......... 546/146, 122; 544/105; 514/307, 300, 514/230.5
See application file for complete search history.

(56) References Cited

FOREIGN PATENT DOCUMENTS

| | | |
|---|---|---|
| CN | 107108512 A | 8/2017 |
| CN | 109476641 A | 3/2019 |
| JP | 2012072068 A | 4/2012 |
| JP | 2017530176 A | 10/2017 |
| JP | 2017537100 A | 12/2017 |
| JP | 2019516757 A | 6/2019 |
| WO | 2017205536 A | 11/2017 |
| WO | 2019191667 A | 10/2019 |
| WO | 2019204781 A1 | 10/2019 |

OTHER PUBLICATIONS

Japanese Office Action dated Oct. 4, 2023. Japanese Patent Application No. 2022-564523.
Australian Office Action dated Apr. 21, 2023. Australian Patent Application No. 2021259814.
International Search Report mailed Jul. 22, 2021; International Patent Application No. PCT/CN2021/089486 filed Apr. 25, 2021. ISA/CN.
Bronner, S.M. et al., "A Unique Approach to Design Potent and Selective Cyclic Adenosine Monophosphate Response Element Binding Protein, Binding Protein (CBP) Inhibitors", Journal of Medicinal Chemistry, vol. 60, (Nov. 20, 2017), pp. 10151-10171.

*Primary Examiner* — Charanjit Aulakh
(74) *Attorney, Agent, or Firm* — McDonald Hopkins LLC

(57) ABSTRACT

Provided are a compound represented by Formula (I), a stereoisomer thereof or a pharmaceutically acceptable salt thereof, and a use thereof in preparing a drug for diseases mediated by CBP and/or EP300.

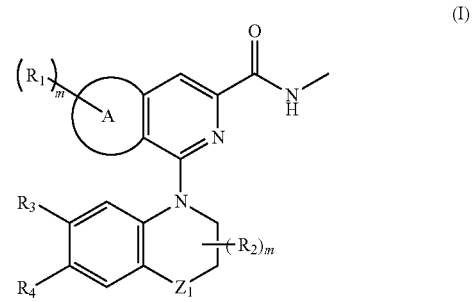

14 Claims, No Drawings

CBP/EP300 INHIBITOR AND USE THEREOF

CROSS-REFERENCE TO RELATED APPLICATIONS

This application is a U.S. National Stage Application, filed under 35 U.S.C. 371 of International Patent Application No. PCT/CN2021/089486 filed on Apr. 25, 2021, which claims priority to Chinese Patent Application No. 202010335713.9 filed with the China National Intellectual Property Administration (CNIPA) on Apr. 25, 2020, the disclosures of which are incorporated herein by reference in their entireties.

TECHNICAL FIELD

The present application belongs to the field of chemical pharmaceuticals, and specifically, relates to a CBP/EP300 inhibitor and use thereof

BACKGROUND

Chromatin is a linear complex structure composed of DNA, histones, non-histones and a small amount of RNA within nucleus during interphase. Histones are the primary protein components of chromatin. Cell activities directly related to genome are carried out at chromatin, such as DNA replication, gene transcription, homologous recombination and DNA repair, including transcription-coupled repair and various modifications of DNA and histones. These modifications include methylation, acetylation, phosphorylation, nitrosylation and ubiquitination.

Among all kinds of proteins, histones are the most prone to post-translational modification. Histone modifications are dynamic because they can be added or removed in response to specific stimulation, and these modifications cause structural changes of chromatin and changes of gene transcription. Histone acetyltransferases (HATs) and histone deacetylase (HDAC) acetylate or deacetylate specific histone lysine residues.

CBP/EP300 is a lysine acetyltransferase and can catalyze the ligation of acetyl groups with lysine side chains of histones and other protein substrates. CBP and EP300 have extensive sequence identity and functional similarity and are usually called CBP/EP300. The acetylation of histones and other proteins catalyzed by CBP/EP300 is essential for gene activation. Meanwhile, CBP/EP300 proteins also have a class of specific functional domains, which are called bromodomains.

Bromodomains of the length of approximately 110 amino acids have been found in a large number of chromatin-associated proteins and have been identified in about 70 human proteins that are often adjacent to other protein motifs. The interaction between bromodomains and modified histones may be an important mechanism of chromatin structure changes and regulation of gene expression. Cell-type specificity and proper tissue functionality require strict control of the transcription process of different genes, and the transcription process is greatly influenced by their structural environment of the genes. Bromodomains are located in key chromatin modification complexes that control the transcriptional pathways of unique disease-related pathogenic genes. Bromodomains are selectively inhibited in specific families, for example, bromodomains of CBP/EP300 are selectively inhibited. Such changes of transcription stable states are directly related to the regulation of various pathogenic genes, most particularly cancers, immune inflammations, infectious diseases, neurological diseases, cardiovascular diseases and metabolic diseases, and further regulate the expression of various downstream pathogenic proteins.

Therefore, new compounds with of CBP/EP300 bromodomain inhibitory activity may provide possibilities for the treatment of cancers, inflammations, autoimmune diseases, infectious diseases and cardiovascular diseases.

SUMMARY

An aspect of the present application provides a compound of Formula (I), an isomer thereof or a pharmaceutically acceptable salt thereof:

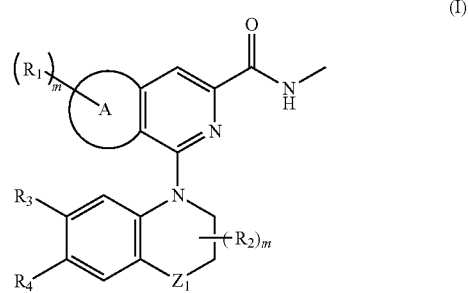

(I)

where $R_1$ is selected from hydrogen, $C_1$-$C_6$ alkyl, halogenated $C_1$-$C_6$ alkyl, halogen, cyano, —C(O)NR$_5$R$_6$, —C(O)R$_5$, —C(O)OR$_5$, —OR$_5$, —OC(O)R$_5$, —OC(O)OR$_5$, —OC(O)NR$_5$R$_6$, —NR$_5$R$_6$, —SR$_5$, —S(O)R$_5$, —S(O)$_2$R$_5$, —(CH$_2$)nOH or a 5-6-membered saturated or unsaturated ring containing 0-3 N, O or S atoms; where the 5-6-membered saturated or unsaturated ring containing 0-3 N, O or S atoms is optionally substituted with 1-3 R$_5$;

$R_2$ is selected from hydrogen, $C_1$-$C_6$ alkyl, halogenated $C_1$-$C_6$ alkyl, halogen, cyano, —C(O)NR$_5$R$_6$, —C(O)R$_5$, —C(O)OR$_5$, —OR$_5$, —OC(O)R$_5$, —OC(O)OR$_5$, —OC(O)NR$_5$R$_6$, —NR$_5$R$_6$, —SR$_5$, —S(O)R$_5$, —S(O)$_2$R$_5$ or —(CH$_2$)nOH;

$R_3$ is selected from hydrogen, $C_1$-$C_6$ alkyl, halogenated $C_1$-$C_6$ alkyl, halogen, cyano, —C(O)NR$_5$R$_6$, —C(O)R$_5$, —C(O)OR$_5$, —OR$_5$, —OC(O)R$_5$, —OC(O)OR$_5$, —OC(O)NR$_5$R$_6$, —NR$_5$R$_6$, —SR$_5$, —S(O)R$_5$, —S(O)$_2$R$_5$, —(CH$_2$)nOH or a 5-6-membered saturated or unsaturated ring containing 0-3 N, O or S atoms; where the 5-6-membered saturated or unsaturated ring containing 0-3 N, O or S atoms is optionally substituted with 1-3 R$_5$;

$R_4$ is selected from hydrogen, $C_1$-$C_6$ alkyl, halogenated $C_1$-$C_6$ alkyl, halogen, cyano, —C(O)NR$_5$R$_6$, —C(O)R$_5$, —C(O)OR$_5$, —OR$_5$, —OC(O)R$_5$, —OC(O)OR$_5$, —OC(O)NR$_5$R$_6$, —NR$_5$R$_6$, —SR$_5$, —S(O)R$_5$, —S(O)$_2$R$_5$, —(CH$_2$)nOH or a 5-6-membered saturated or unsaturated ring containing 0-3 N, O or S atoms; where the 5-6-membered saturated or unsaturated ring containing 0-3 N, O or S atoms is optionally substituted with 1-3 R$_5$;

each $R_5$ and $R_6$ is independently selected from hydrogen, $C_1$-$C_6$ alkyl, $C_3$-$C_6$ cycloalkyl, 3-6-membered heterocyclyl optionally substituted with R$_7$, halogenated $C_1$-$C_6$ alkyl, halogen, =O, —(CH$_2$)nC(O)NR$_7$R$_8$, —C(O)R$_7$, —C(O)OR$_7$, —OR$_7$, —OC(O)R$_7$, —OC (O)OR₇, —OC(O)NR₇R₈, —(CH₂)nNR₇R₈, —SR₇, —S(O)R₇, —(CH₂)nS(O)₂R₇, —(CH₂)nOH or —(CH₂)nCN;

each $R_7$ and $R_8$ is independently selected from hydrogen or $C_1$-$C_6$ alkyl;

$Z_1$ is —CH₂— or —O—;

the ring A is a 5-6-membered saturated or unsaturated ring containing 0-3 N, O or S atoms; and each m and n is independently selected from 0, 1, 2 or 3.

In some embodiments, Formula (I) is Formula (Ia), Formula (Ib), Formula (Ic), Formula (Id) or Formula (Ie):

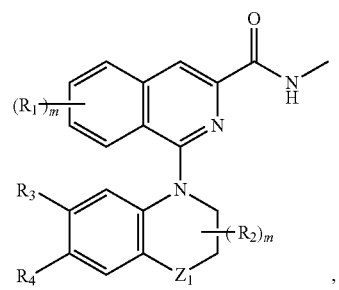

(Ia)

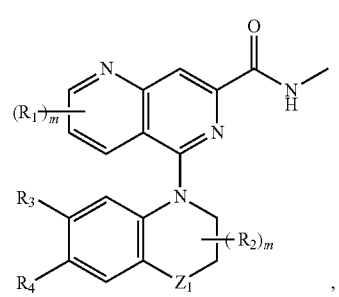

(Ib)

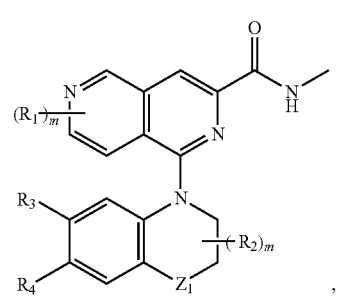

(Ic)

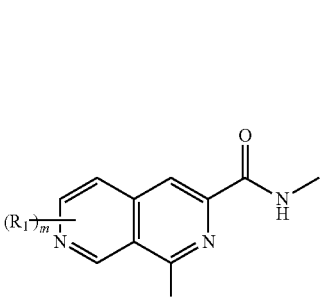

(Id)

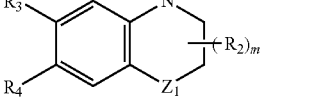

or

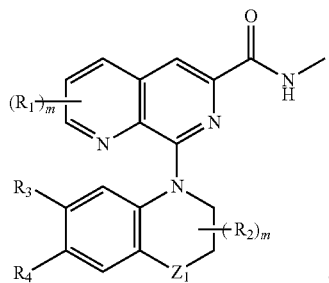

(Ie)

In other embodiments, Formula (I) is Formula (If), Formula (Ig) or Formula (Ih):

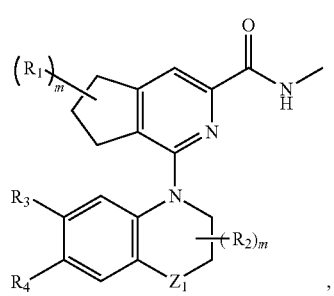

(If)

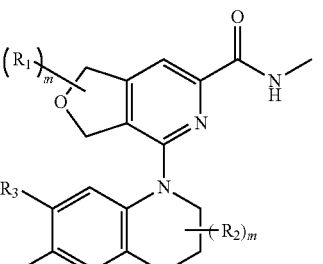

(Ig)

or (Ih)

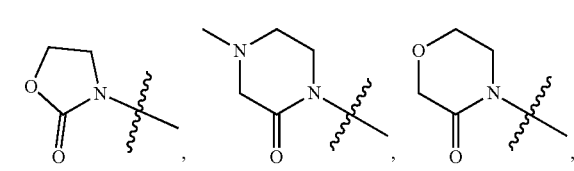

In other embodiments, $R_1$ is selected from hydrogen, halogen, methoxy,

-continued

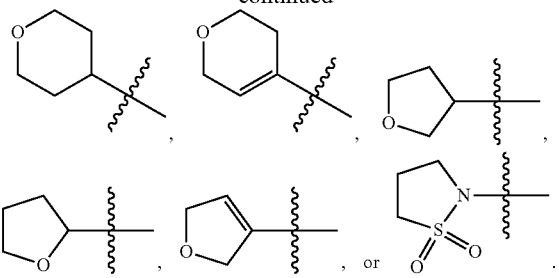

In other embodiments, $R_2$ is selected from —OH or —NHCH$_3$.

In other embodiments, $R_3$ is selected from hydrogen, halogen or halogenated $C_1$-$C_6$ alkyl.

In other embodiments, $R_3$ is —CHF$_2$.

In other embodiments, $R_4$ is selected from hydrogen, —CH$_2$OH, —C(O)NHCH$_3$,

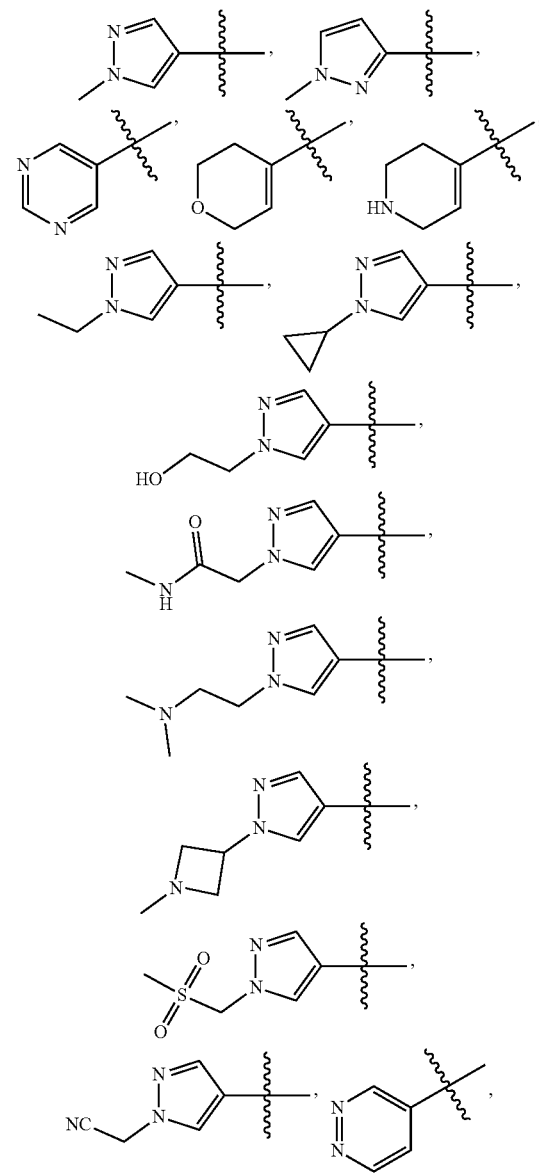

-continued

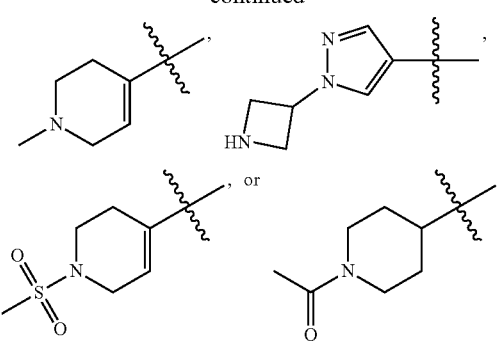

In another aspect, the present application further provides a compound having the following structure, an isomer thereof or a pharmaceutically acceptable salt thereof:

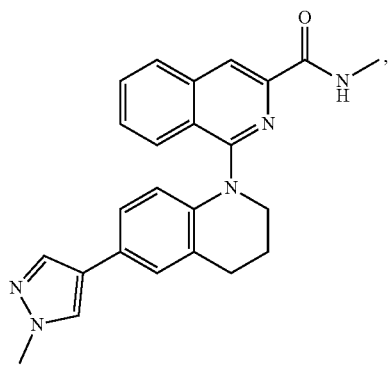

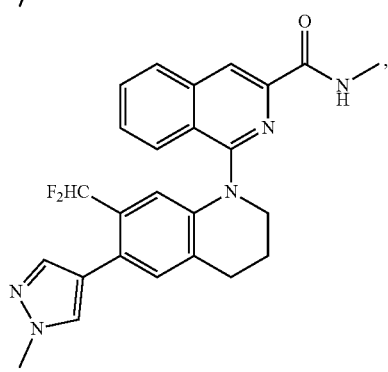

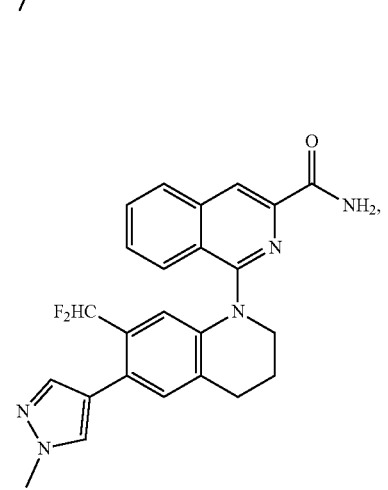

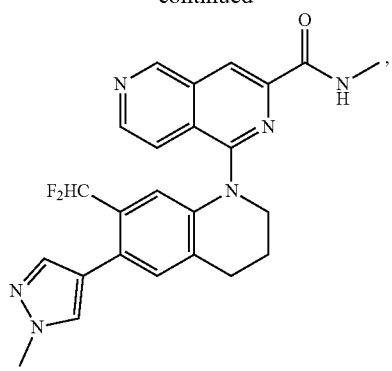
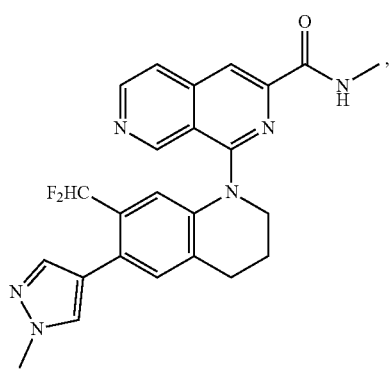
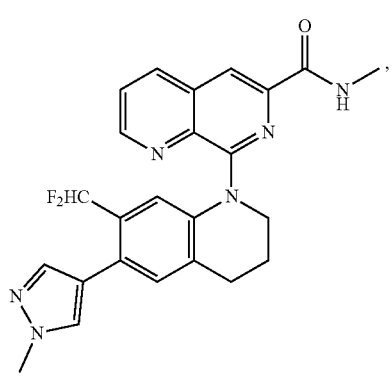
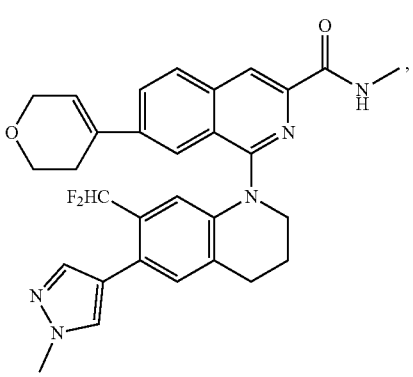
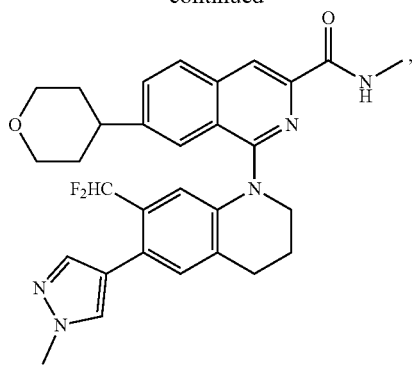
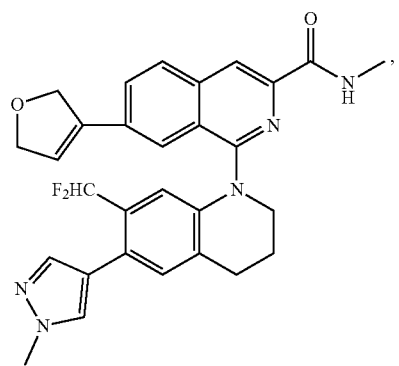
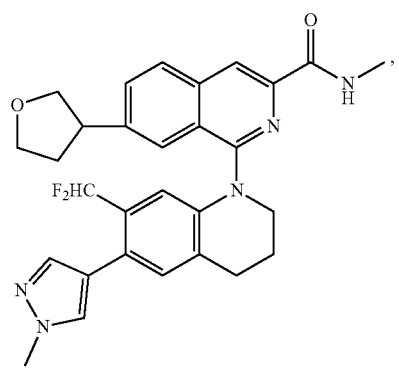
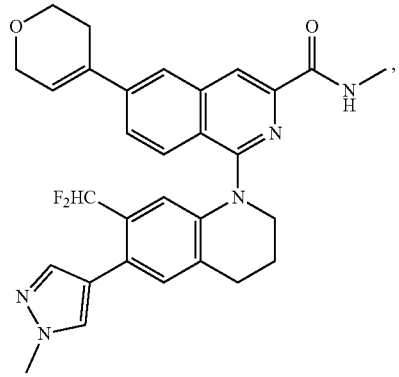

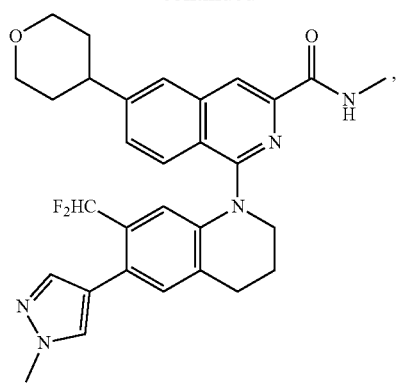
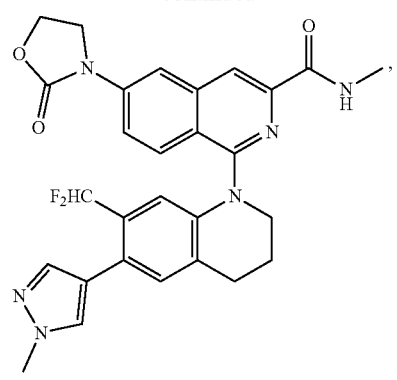
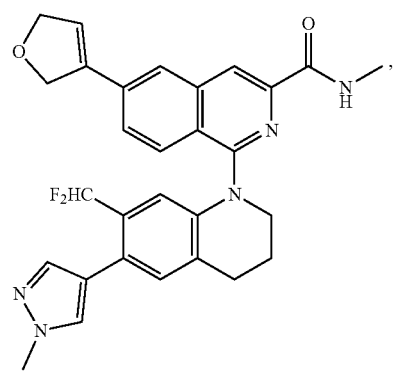
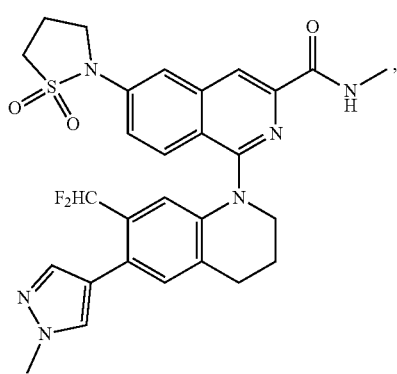
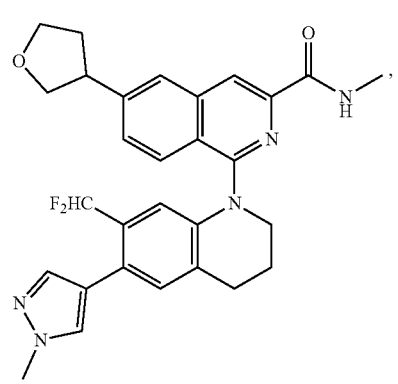
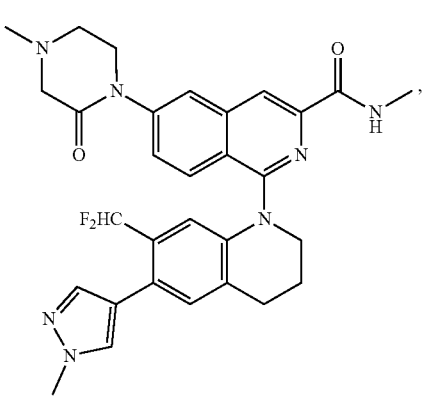
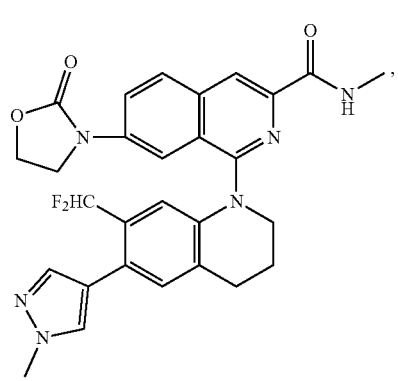
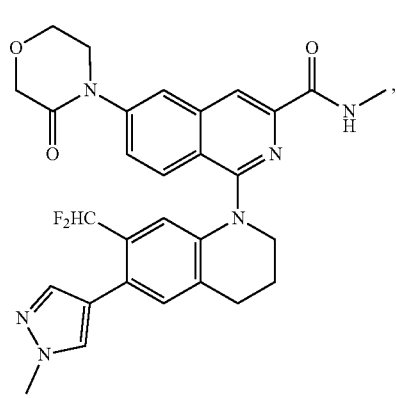

-continued
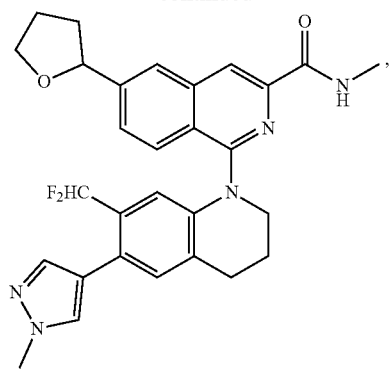
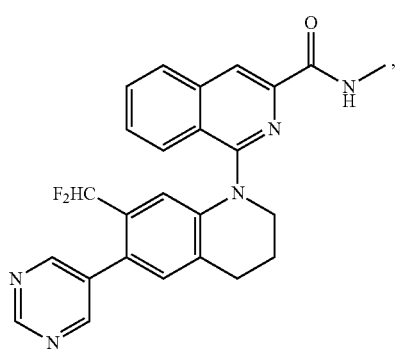
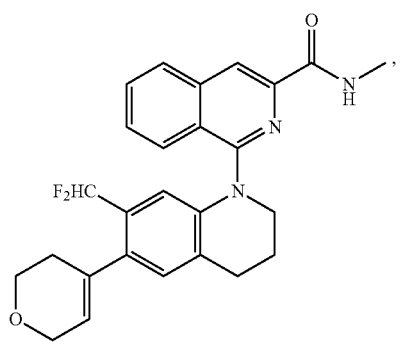
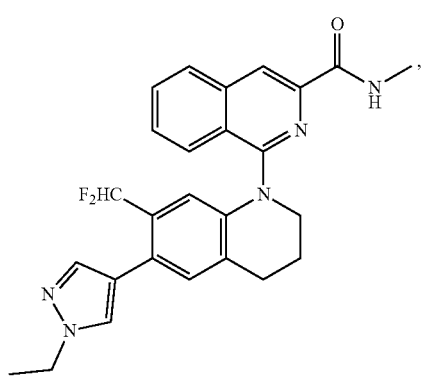
-continued
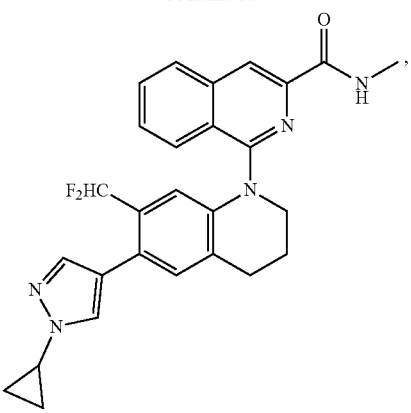
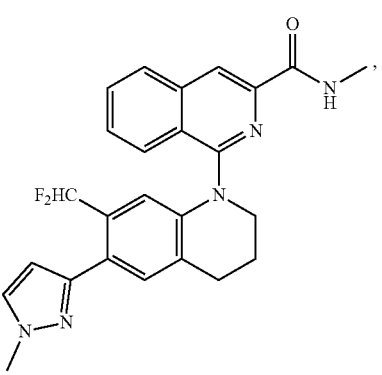
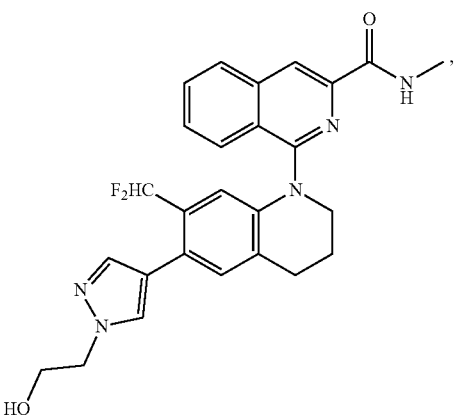
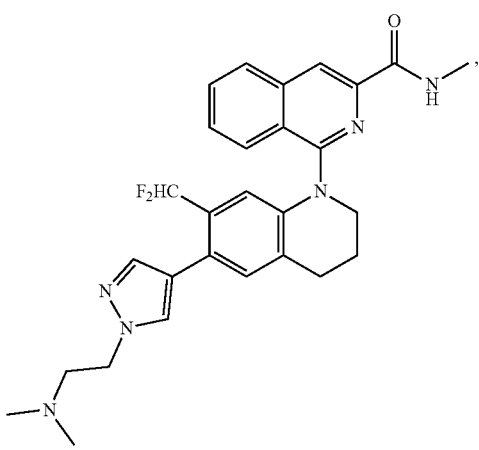

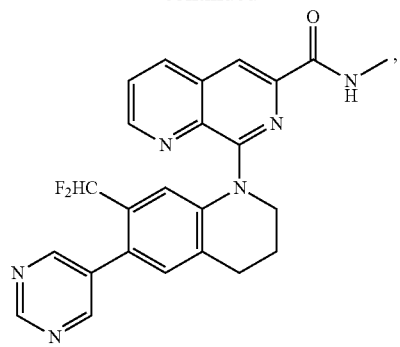
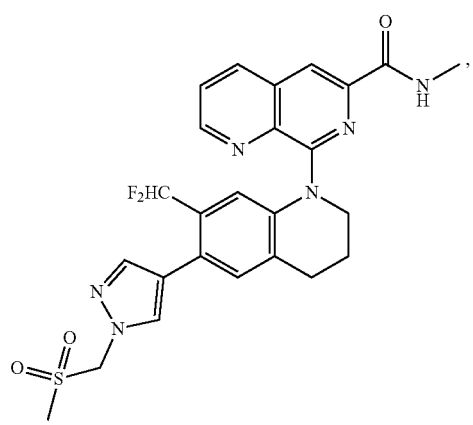
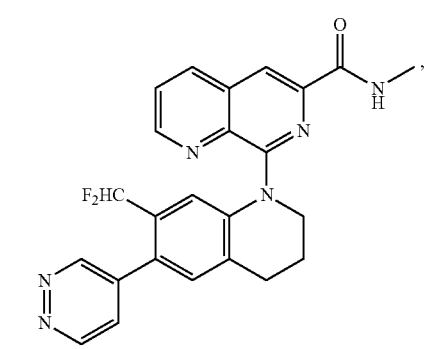
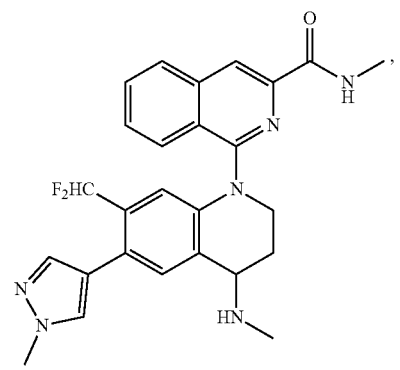
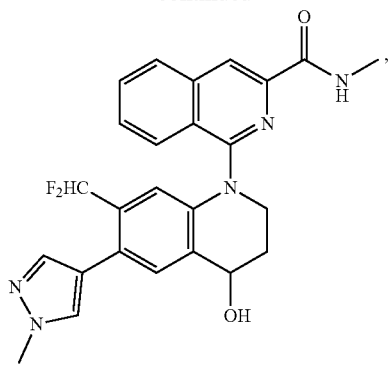
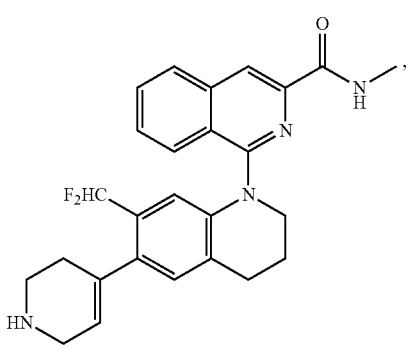
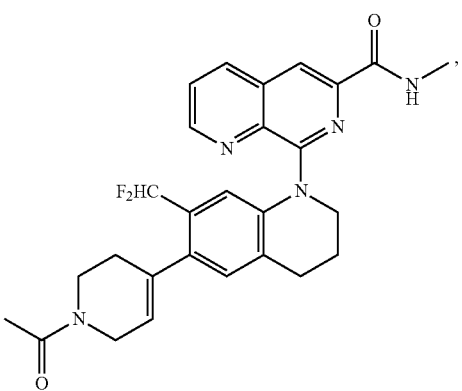
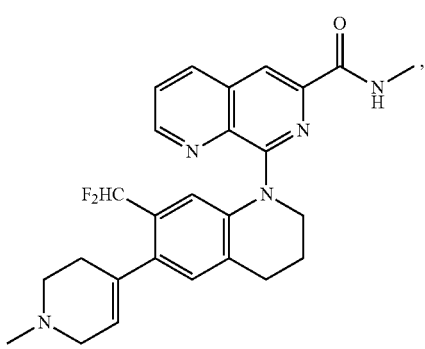

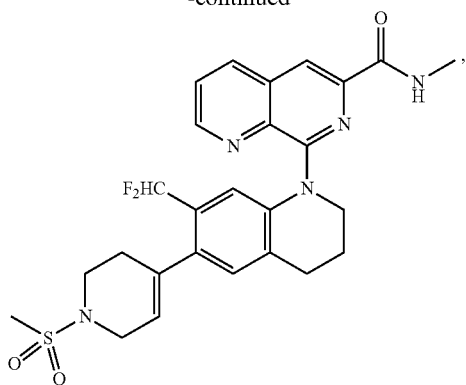
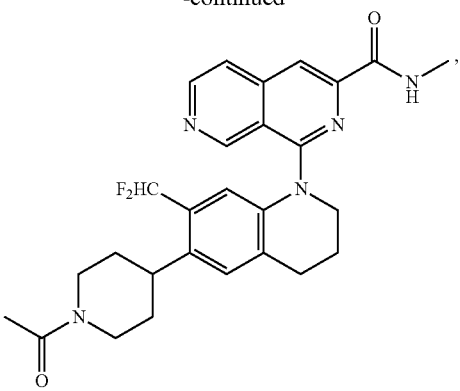

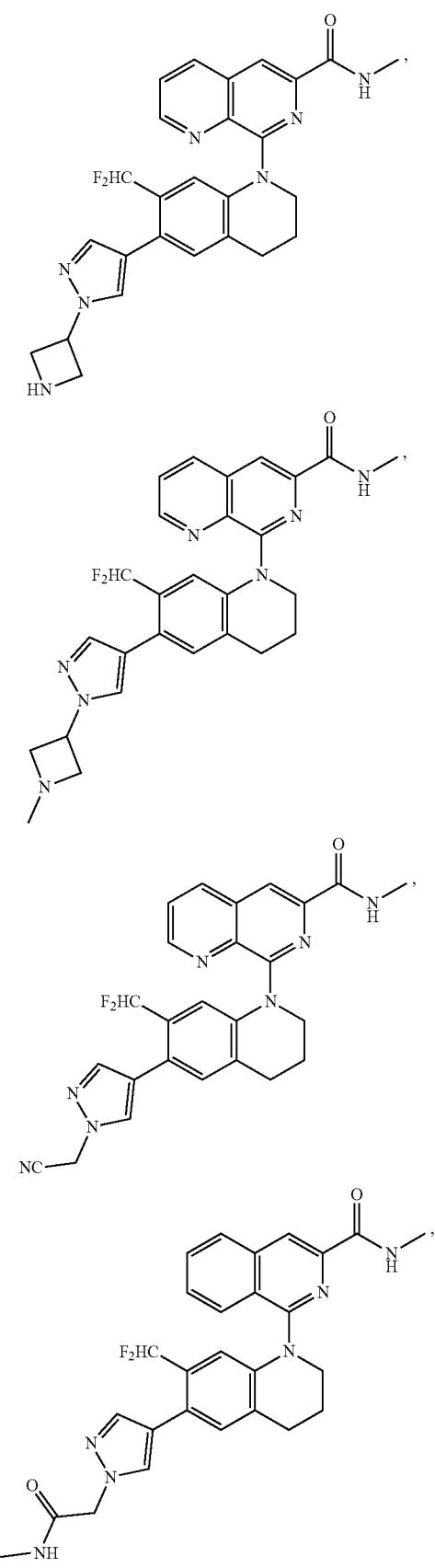
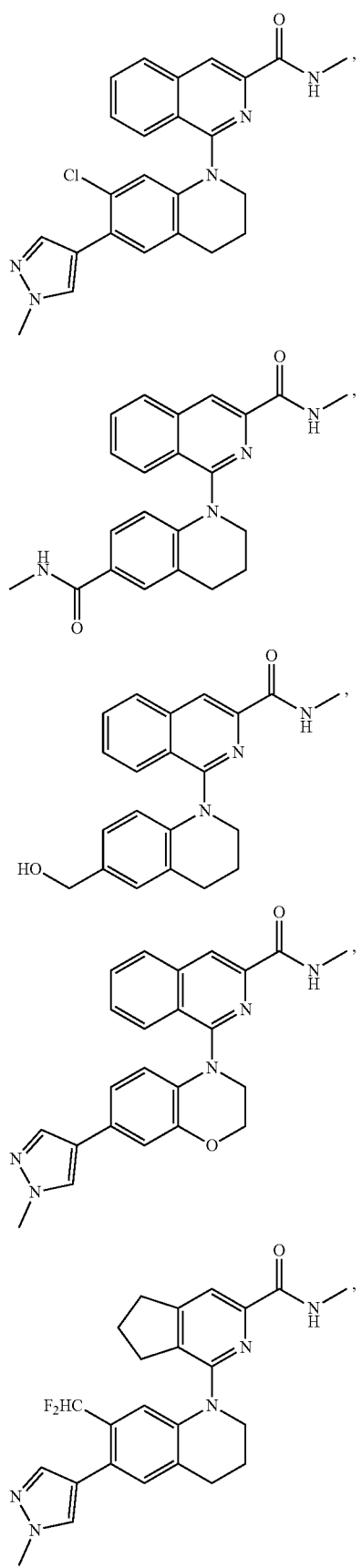

-continued

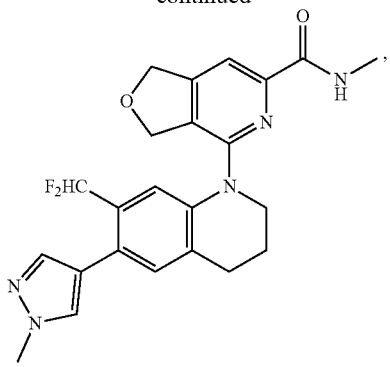

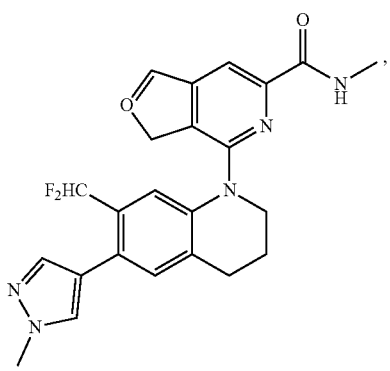

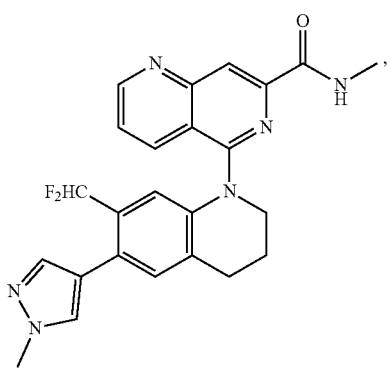

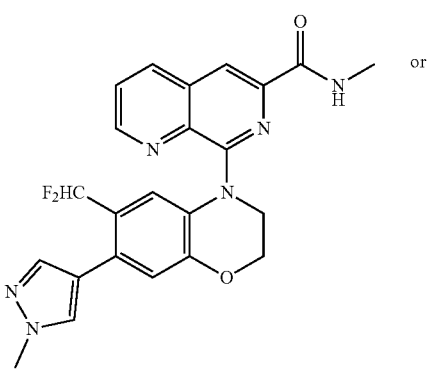

or

-continued

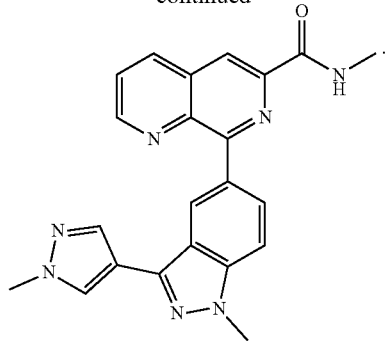

In another aspect, the present application provides use of the preceding compound, the isomer thereof or the pharmaceutically acceptable salt thereof in the preparation of a drug for a disease mediated by CBP and/or EP300.

In some embodiments, the disease mediated by CBP and/or EP300 is a cancer, an inflammatory disorder, an autoimmune disease, a viral infection or a cardiovascular system disease.

Particularly, the cancer is leukemia, lymphoma, multiple myeloma, lung cancer, prostate cancer, head and neck cancer, breast cancer, pancreatic cancer, colorectal cancer or melanoma.

In another aspect, the present application further provides a pharmaceutical composition, which includes a therapeutically effective amount of the preceding compound, the isomer or the pharmaceutically acceptable salt thereof, and a pharmaceutically acceptable carrier or excipient. The pharmaceutical composition may further include one or more other anti-cancer drugs. The anti-cancer drug may be a chemotherapy drug.

As used herein, the term "isomer" includes enantiomeric forms, diastereomeric forms, and geometric (or conformational) isomeric forms of a given structure. For example, the present application includes R- and S-configurations for each asymmetric center, Z and E double-bond isomers, Z and E conformational isomers, single stereochemical isomers and a mixture of enantiomers, diastereomers and geometric (or conformational) isomers. Unless otherwise stated, the present application includes all tautomeric forms of the structures described herein.

As used herein, the term "pharmaceutically acceptable salt" includes both acid and base addition salts.

As used herein, the term "unsaturated" means that a group has one or more unsaturated units.

As used herein, the terms "halogenated" and "halogen" refer to an atom selected from fluorine (—F), chlorine (—Cl), bromine (—Br) and iodine (—I).

As used herein, the term "oxo-" means "=O".

As used herein, the term "$C_1$-$C_6$ alkyl" refers to a saturated straight or branched hydrocarbyl group having 1-6 carbon atoms.

As used herein, the term "halogenated $C_1$-$C_6$ alkyl" refers to $C_1$-$C_6$ alkyl as defined herein substituted with one or more (e.g., 1, 2, 3 or 4) halogens.

As used herein, the term "$C_3$-$C_6$ cycloalkyl" refers to a saturated or unsaturated carbocyclic ring containing 3-6 carbon atoms.

As used herein, the term "heterocyclyl" refers to a saturated or unsaturated carbocyclic ring in which one or more (e.g., 1, 2, 3, or 4) carbon atoms have been substituted with heteroatoms (e.g., O, N or S).

As used herein, the term "therapeutically effective amount" refers to an amount of the compound provided by the present application that (i) treats a specific disease, condition or disorder; (ii) attenuates, ameliorates, or eliminates one or more symptoms of the specific disease, condition or disorder; or (iii) prevents or delays the onset of one or more symptoms of the specific disease, condition or disorder described herein.

As used herein, the term "pharmaceutically acceptable carrier or excipient" refers to a non-toxic carrier, adjuvant or vector that does not destroy the pharmacological activity of the compound formulated therewith.

DETAILED DESCRIPTION

Synthesis of Intermediate I: methyl 1-chloroisoquinoline-3-carboxylate

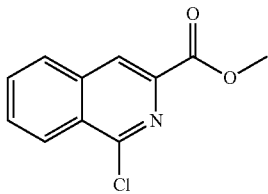

Step 1: Preparation of 3-bromo-3H-isobenzofuran-1-one. Phthalide (20.0 g, 149.1 mmol, 1.0 eq.) was dissolved in 1,2-dichloroethane (100 mL), AIBN (2.5 g, 14.9 mmol, 0.1 eq.) and NBS (31.9 g, 178.9 mmol, 1.2 eq.) were added with stirring, respectively, and the reaction mixture was reacted at 80° C. for 12 h under nitrogen protection. After the reaction was cooled to room temperature, the reaction mixture was diluted with 50 mL of water, layers were separated, and then the organic phase was washed once with water (50 mL), washed with saturated brine, dried with anhydrous magnesium sulfate, filtered and concentrated to give the title compound as a yellowish solid (31.0 g, yield of 98%), which can be directly used without further purification. MS (m/z)=212.95 [M+1-1]$^+$.

Step 2: Preparation of 2-formylbenzoic acid. 3-bromo-3H-isobenzofuran-1-one (31.0 g, 145.5 mmol, 1.0 eq.) was dissolved in 100 mL of water and reacted at 100° C. for 2 h. After the reaction was cooled to room temperature, the reaction mixture was extracted with EtOAc, and the organic phase was washed with saturated brine, dried with anhydrous magnesium sulfate, filtered and concentrated to give the title compound as an off-white solid (21.0 g, yield of 96%), which can be directly used without further purification. MS (m/z)=151.04 [M+H]$^+$.

Step 3: Preparation of methyl 2-formylbenzoate. 2-formylbenzoic acid (21.0 g, 140.0 mmol, 1.0 eq.) was dissolved in acetone (150 mL), potassium carbonate (19.3 g, 140.0 mmol, 1.0 eq.) and iodomethane (39.7 g, 280.0 mmol, 2.0 eq.) were added with stirring, respectively, and the reaction mixture continued to react at 70° C. for 15 h. After the reaction was cooled to room temperature, the mixture was filtered and directly concentrated under vacuum to give the title compound as an off-white solid (22.0 g, yield of 96%), which can be directly used without further purification. MS (m/z)=165.05 [M+H]$^+$.

Step 4: Preparation of 2-tert-butyl 3-methyl 1-oxo-1H-isoquinoline-2,3-dicarboxylate. Methyl 2-formylbenzoate (22.0 g, 134.0 mmol, 1.0 eq.) and DBU (20.4 g, 134.0 mmol, 1.0 eq.) were dissolved in dichloromethane (120 mL), (±)—BOC-alpha-phosphonoglycine trimethyl ester (39.8 g, 134.0 mmol, 1.0 eq.) was added at 0° C., and the reaction mixture was stirred at room temperature for 5 h. The reaction mixture was diluted with 100 mL of water, layers were separated, and the organic phase was washed with saturated brine, dried with anhydrous magnesium sulfate, filtered and concentrated to give the title compound as an off-white solid (30.0 g, yield of 74%), which can be directly used without further purification. MS (m/z)=304.12 [M+H]$^+$.

Step 5: Preparation of methyl 1-oxo-1,2-dihydroisoquinoline-3-carboxylate. 2-tert-butyl 3-methyl 1-oxo-1H-isoquinoline-2,3-dicarboxylate (30.0 g, 100.0 mmol, 1.0 eq.) was dissolved in 100 mL of dioxane hydrochloride solution (4.0 M), and the reaction mixture was stirred at room temperature for 12 h. After the reaction was completed, the reaction mixture was directly concentrated under vacuum to give the title compound as an off-white solid (22.0 g, quantitative yield). MS (m/z)=204.07 [M+1-1]$^+$.

Step 6: Preparation of methyl 1-chloroisoquinoline-3-carboxylate. A mixture of methyl 1-oxo-1,2-dihydroisoquinoline-3-carboxylate (14.4 g, 70.9 mmol, 1.0 eq.) and POCl$_3$ (50 mL) was heated at 110° C. for 2 h. The reaction liquid was cooled to room temperature, and then a large deal of solid was precipitated out and filtered. The filtered solid was completely dissolved in 100 mL of dichloromethane, and ice water and NaHCO$_3$ solid were added successively with stirring until no bubbles emerged violently while ensuring that the PH of the mixture was about 8. The organic phase was washed with saturated brine, dried with anhydrous magnesium sulfate, filtered and concentrated to give the title compound as an off-white solid (13.0 g, 83%), which was used in the next step without further purification. MS (m/z)=222.03 [M+1-1]$^+$.

Intermediates II and III were prepared in a method similar to the preparation method of Intermediate I.

| Intermediate No. | Structure | Chemical name | MS (m/z) [M + H]$^+$ |
|---|---|---|---|
| II | | 2-tert-butyl 3-methyl 7-bromo-1-oxo-1H-isoquinoline-2,3-dicarboxylate | 382.03 |

| Intermediate No. | Structure | Chemical name | MS (m/z) [M + H]+ |
|---|---|---|---|
| III | ![structure] | 2-tert-butyl 3-methyl 6-bromo-1-oxo-1H-isoquinoline-2,3-dicarboxylate | 382.03 |

Synthesis of Intermediate IV: ethyl 8-chloro-1,7-naphthyridine-6-carboxylate

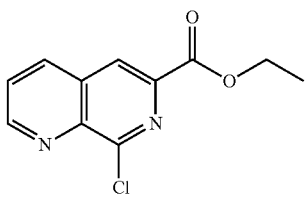 [SMILES: CCOC(=O)c1cc2cccnc2c(Cl)n1]

Step 1: Preparation of N-(tert-butyl)-3-methylpyridineamide. With stirring, concentrated sulfuric acid (15.0 g, 281.4 mmol, 2.2 eq.) was slowly added dropwise to a mixture of 2-cyano-3-methylpyridine (15.0 g, 127.0 mmol, 1.0 eq.) and tert-butanol (40 mL) at 70° C. The reaction mixture was stirred and reacted at 75° C. for 30 min, then diluted with 200 mL of water, adjusted to PH 8 with ammonia water and concentrated under vacuum. The concentrated mixture was extracted with EtOAc, and the organic phase was combined, washed with saturated brine, dried with anhydrous magnesium sulfate, filtered and concentrated. The crude product was purified by column chromatography (PE/EtOAc=10:1) to give the title compound which was initially a yellowish oil and became a white solid after being left to stand for a period of time (20.0 g, yield of 82%). MS (m/z)=193.13 [M+H]+.

Step 2: Preparation of ethyl 3-(2-(tert-butylamino)pyridin-3-yl)-2-oxopropanoate N-(tert-butyl)-3-methylpyridineamide (10.0 g, 52.0 mmol, 1.0 eq.) was dissolved in dry THF (200 mL) with stirring at −78° C. under N2 protection, n-BuLi (6.7 g, 104.0 mmol, 2.0 eq.) and tetramethyl ethylene diamine (6.0 g, 52.0 mmol, 1.0 eq.) were added dropwise with stirring, respectively, and the reaction mixture was stirred and reacted at −78° C. for 30 min. A solution of diethyl oxalate (15.2 g, 104.0 mmol, 2.0 eq.) in THF (200 mL) was added dropwise under the same conditions, and the resulting mixture was stirred and reacted for 3 h. After the reaction was quenched with a saturated aqueous ammonium chloride solution, the reaction mixture was extracted with EtOAc, and the organic phase was washed with saturated brine, dried with anhydrous magnesium sulfate, filtered and concentrated. The crude product was purified by column chromatography (PE/EtOAc=3:1) to give the title compound as a colorless oil (9.6 g, yield of 63%). MS (m/z)=293.15 [M+H]+

Step 3: Preparation of ethyl 8-oxo-7,8-dihydro-1,7-naphthyridine-6-carboxylate. Ethyl 3-(2-(tert-butylamino)pyridin-3-yl)-2-oxopropanoate (4.5 g, 15.4 mmol, 1.0 eq.) and ammonium acetate (2.4 g, 30.8 mmol, 2.0 eq.) were added to acetic acid (45 mL) with stirring and heated at 110° C. for 12 h. The reaction mixture was directly concentrated under vacuum to give a crude product, and the crude product was purified by column chromatography (CH2Cl2/MeOH=10:1) to give the title compound as an off-white solid (3.0 g, yield of 88%). MS (m/z)=219.08 [M+1-1]+.

Step 4: Preparation of ethyl 8-chloro-1,7-naphthyridine-6-carboxylate. A mixture of ethyl 8-oxo-7,8-dihydro-1,7-naphthyridine-6-carboxylate (1.0 g, 4.6 mmol, 1.0 eq.) and POCl3 (8 mL) was heated at 110° C. for 2 h. The reaction mixture was placed in an ice bath, and ice water and NaHCO3 solid were added successively with stirring until no bubbles emerged violently while ensuring that the PH of the mixture was about 8. The reaction mixture was extracted with CH2Cl2, and the organic phase was washed with saturated brine, dried with anhydrous magnesium sulfate, filtered and concentrated to give the title compound as an off-white solid (1.1 g, quantitative yield), which was used in the next step without further purification. MS (m/z)=237.04 [M+1-1]+.

Intermediates V, VI, VII and VIII were prepared in a method similar to the preparation method of Intermediate IV.

| Intermediate No. | Structure | Chemical name | MS (m/z) [M + H]+ |
|---|---|---|---|
| V | | Ethyl 1-chloro-[2,6]naphthyridine-3-carboxylate | 237.04 |
| VI | | Ethyl 8-chloro-3-fluoro-[1,7]naphthyridine-6-carboxylate | 255.03 |
| VII | | Ethyl 3,8-dichloro-[1,7]naphthyridine-6-carboxylate | 271.00 |
| VIII | | Ethyl 8-chloro-3-methoxy-[1,7]naphthyridine-6-carboxylate | 267.05 |

Synthesis of Intermediate IX: 7-difluoromethyl-6-(1-methyl-1H-pyrazol-4-yl)-1,2,3,4-tetrahydroquinoline

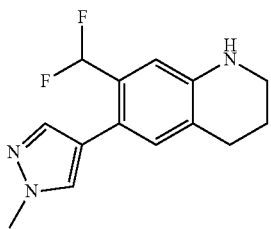 [SMILES: Cn1cc(-c2cc3c(cc2C(F)F)NCCC3)cn1]

Step 1: Preparation of quinoline-7-carbaldehyde. 7-methylquinoline (100.0 g, 698.4 mmol, 1.0 eq.) was heated to 160° C., selenium dioxide (77.5 g, 698.4 mmol, 1.0 eq.) was added in batches over 30 min, and the reaction mixture continued to react at 160° C. for 8 h. After the reaction was cooled to room temperature, 1000 mL of dichloromethane was added, and a large deal of solid was precipitated out. After the solid was filtered out, the filtrate was concentrated. The crude product was beaten with 500 mL of n-heptane for 30 min and filtered, and the filter cake was dried to give the title compound as an off-white solid (63.3 g, yield of 58%). MS (m/z)=158.06 [M+H]+.

Step 2: Preparation of 7-difluoromethylquinoline. Quinoline-7-carbaldehyde (63.3 g, 402.9 mmol, 1.0 eq.) was dissolved in 600 mL of dichloromethane, DAST (324.7 g, 2.0 mol, 5.0 eq.) was added dropwise at 0° C., and the reaction mixture was reacted at 20° C. for 16 h. The reaction mixture was poured into 1000 mL of saturated sodium bicarbonate solution, and the organic phase was washed with saturated brine, dried with anhydrous magnesium sulfate, filtered and concentrated to give the title compound as a yellow solid (23.8 g, yield of 33%). MS (m/z)=180.06 [M+H]+.

Step 3: Preparation of 7-difluoromethyl-1,2,3,4-tetrahydroquinoline. 7-difluoromethylquinoline (23.8 g, 132.8 mmol, 1.0 eq.) and NaBH$_3$CN (41.7 g, 664.2 mmol, 5.0 eq.) were dissolved in methanol (250 mL), boron trifluoride diethyl etherate (34 mL) was added dropwise at 0° C., and the reaction mixture was reacted at 65° C. for 16 h. The reaction mixture was poured into 1000 mL of saturated sodium bicarbonate solution, and the organic phase was washed with saturated brine, dried with anhydrous magnesium sulfate, filtered and concentrated. The crude product was purified by column chromatography (PE/EtOAc=10:1) to give the title compound as a brown oil (12.0 g, yield of 49%). MS (m/z)=186.11 [M+H]+.

Step 4: Preparation of 6-bromo-7-difluoromethyl-1,2,3,4-tetrahydroquinoline. 7-difluoromethyl-1,2,3,4-tetrahydroquinoline (12.0 g, 65.5 mmol, 1.0 eq.) was dissolved in dichloromethane (120 mL), NBS (12.8 g, 72.0 mmol, 1.1 eq.) was added, and the reaction mixture was reacted at room temperature for 16 h. The reaction mixture was diluted with 100 mL of water, and the organic phase was washed with saturated brine, dried with anhydrous magnesium sulfate, filtered and concentrated. The crude product was purified by column chromatography (PE/EtOAc=10:1) to give the title compound as an off-white solid (15.0 g, yield of 87%). MS (m/z)=264.02 [M+H]$^+$.

Step 5: Preparation of 7-difluoromethyl-6-(1-methyl-1H-pyrazol-4-yl)-1,2,3,4-tetrahydroquinoline. 1-methylpyrazole-4-boronic acid pinacol ester (4.8 g, 22.9 mmol, 1.2 eq.), 6-bromo-7-difluoromethyl-1,2,3,4-tetrahydroquinoline (5.0 g, 19.1 mmol, 1.0 eq.), Pd(dppf)Cl$_2$ (1.4 g, 1.9 mmol, 0.1 eq.) and K$_2$CO$_3$ (7.9 g, 57.2 mmol, 3.0 eq.) were dissolved in 1,4-dioxane (50 mL) and water (10 mL) and reacted at 110° C. for 18 h under nitrogen protection. The reaction liquid was filtered by suction, the filtrate was rotary evaporated to dryness, and the crude product was purified by column chromatography (PE/EtOAc=10:1-3:1, gradient elution) to give the title compound as an off-white solid (0.3 g, yield of 99%). MS (m/z)=266.15 [M+H]$^+$.

Example 1 1-[6-(1-methyl-1H-pyrazol-4-yl)-3,4-dihydro-2H-quinolin-1-yl]-isoquinoline-3-carboxylic acid methylamide

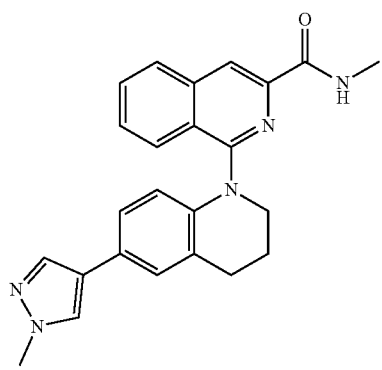 [SMILES: CNC(=O)c1cc2ccccc2c(N2CCCc3cc(-c4cnn(C)c4)ccc32)n1]

Step 1: Preparation of 6-(1-methyl-1H-pyrazol-4-yl)-1,2,3,4-tetrahydroquinoline.

1-methylpyrazole-4-boronic acid pinacol ester (1.2 g, 5.7 mmol, 1.2 eq.), 6-bromo-1,2,3,4-tetrahydroquinoline (1.0 g, 4.7 mmol, 1.0 eq.), Pd(dppf)Cl$_2$ (345.0 mg, 471.5 µmol, 0.1 eq.) and K$_2$CO$_3$ (2.0 g, 14.1 mmol, 3.0 eq.) were dissolved in 1,4-dioxane (50 mL) and water (10 mL) and reacted at 80° C. for 14 h under nitrogen protection. The reaction liquid was filtered by suction, the filtrate was rotary evaporated to dryness, and the crude product was purified by column chromatography (PE/EtOAc=10:1-3:1, gradient elution) to give the title compound as a yellow solid (0.5 g, yield of 50%). MS (m/z)=214.13 [M+H]$^+$.

Step 2: Preparation of methyl 1-[6-(1-methyl-1H-pyrazol-4-yl)-3,4-dihydro-2H-quinolin-1-yl]-isoquinoline-3-carboxylate Methyl 1-chloroisoquinoline-3-carboxylate (Intermediate I) (200.0 mg, 902.4 µmol, 1.0 eq.), 6-(1-methyl-1H-pyrazol-4-yl)-1,2,3,4-tetrahydroquinoline (288.7 mg, 1.4 mmol, 1.5 eq.), Pd(OAc)$_2$ (20.3 mg, 90.2 µmol, 0.1 eq.), BINAP (112.4 mg, 180.5 µmol, 0.2 eq.) and Cs$_2$CO$_3$ (352.8 mg, 1.08 mmol, 1.2 eq.) were dissolved in toluene (20 mL) and reacted at 90° C. for 3 h under nitrogen protection. The reaction liquid was directly rotary evaporated to dryness, and the crude product was purified by column chromatography (PE/EtOAc=2:1-0:1, gradient elution) to give the title compound as a yellow solid (200.0 mg, yield of 56%). MS (m/z)=399.18 [M+H]$^+$.

Step 3: Preparation of 1-[6-(1-methyl-1H-pyrazol-4-yl)-3,4-dihydro-2H-quinolin-1-yl]-isoquinoline-3-carboxylic acid methylamide Methyl 1-[6-(1-methyl-1H-pyrazol-4-yl)-3,4-dihydro-2H-quinolin-1-yl]-isoquinoline-3-carboxylate (100.0 mg, 251.0 µmol, 1.0 eq.) was added to a solution of methylamine in ethanol (8 mL) and reacted at 80° C. for 2 h. The reaction liquid was rotary evaporated to dryness, and the crude product was purified on a thick preparation plate (CH$_2$Cl$_2$/MeOH=20:1) to give the title compound as a yellow solid (50.0 mg, yield of 50%). $^1$H NMR (400 MHz, DMSO) δ 8.60 (d, 1H), 8.31 (s, 1H), 8.17 (d, 1H), 7.95 (s, 1H), 7.85-7.73 (m, 2H), 7.71 (s, 1H), 7.61-7.48 (m, 1H), 7.37 (d, 1H), 6.98 (dd, 1H), 6.06 (d, 1H), 3.96 (t, 2H), 3.82 (s, 3H), 2.96 (t, 2H), 2.88 (d, 3H), 2.16 (dd, 2H). MS (m/z)=398.20 [M+H]$^+$.

Example 2 1-[7-difluoromethyl-6-(1-methyl-1H-pyrazol-4-yl)-3,4-dihydro-2H-quinolin-1-yl]isoquinoline-3-carboxylic acid methylamide

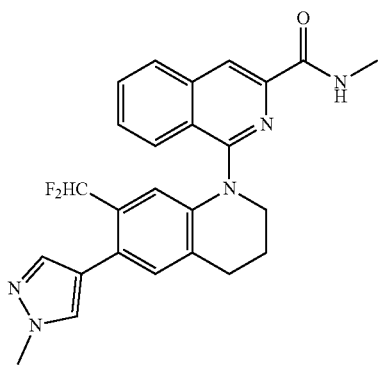 [SMILES: CNC(=O)c1cc2ccccc2c(N2CCCc3cc(-c4cnn(C)c4)c(C(F)F)cc32)n1]

Step 1: Preparation of methyl 1-[7-difluoromethyl-6-(1-methyl-1H-pyrazol-4-yl)-3,4-dihydro-2H-quinolin-1-yl]-isoquinoline-3-carboxylate Methyl 1-chloroisoquinoline-3-carboxylate (Intermediate I) (300.0 mg, 1.4 mmol, 1.0 eq.), 7-difluoromethyl-6-(1-methyl-1H-pyrazol-4-yl)-1,2,3,4-tetrahydroquinoline (Intermediate IX) (427.6 mg, 1.6 mmol, 1.2 eq.), Pd(OAc)$_2$ (30.4 mg, 135.3 µmol, 0.1 eq.), BINAP (168.6 mg, 270.7 µmol, 0.2 eq.) and Cs$_2$CO$_3$ (529.2 mg, 1.6 µmol, 1.2 eq.) were dissolved in toluene (20 mL) and reacted at 90° C. for 3 h under nitrogen protection. The reaction liquid was directly rotary evaporated to dryness, and the crude product was purified by column chromatography (PE/EtOAc=2:1-0:1, gradient elution) to give the title compound as a yellow solid (0.1 g, yield of 20%). MS (m/z)=449.18 [M+H]$^+$.

Step 2: Preparation of 1-[7-difluoromethyl-6-(1-methyl-1H-pyrazol-4-yl)-3,4-dihydro-2H-quinolin-1-yl]-isoquinoline-3-carboxylic acid methylamide Methyl 1-[7-difluoromethyl-6-(1-methyl-1H-pyrazol-4-yl)-3,4-dihydro-2H-quinolin-1-yl]-isoquinoline-3-carboxylate (102.6 mg, 228.9 µmol, 1.0 eq.) was dissolved in a solution of methylamine in ethanol (10 mL) and reacted at 80° C. for 2 h. The reaction liquid was rotary evaporated to dryness, and the crude product was purified on a thick preparation plate (CH$_2$Cl$_2$/MeOH=20:1) to give the title compound as a yellow solid (30.0 mg, yield of 29%). $^1$H NMR (400 MHz, DMSO) δ 8.59 (d, 1H), 8.41 (s, 1H), 8.23 (d, 1H), 8.04-7.74 (m, 3H), 7.70-7.59 (t, 1H), 7.54 (s, 1H), 7.28 (s, 1H), 6.66 (t, 1H), 6.27 (s, 1H), 3.97 (t, 2H), 3.87 (s, 3H), 3.01 (t, 2H), 2.88 (d, 3H), 2.26-2.11 (m, 2H). MS (m/z)=448.19 [M+H]$^+$.

Examples 3 to 15 were prepared in a method similar to the method in Example 2.

| Example No. | Structure | Chemical name | $^1$HNMR | MS (m/z) [M + H]$^+$ |
|---|---|---|---|---|
| Example 3 | | 1-[7-difluoromethyl-6-(1-methyl-1H-pyrazol-4-yl)-3,4-dihydro-2H-quinolin-1-yl]-isoquinoline-3-carboxylic acid amide | $^1$H NMR (400 MHz, DMSO) δ 8.41 (s, 1H), 8.22 (d, 1H), 7.97 (s, 1H), 7.89 (d, 1H), 7.83 (t, 1H), 7.79 (s, 1H), 7.72 (s, 1H), 7.65 (t, 1H), 7.54 (s, 1H), 7.28 (s, 1H), 6.67 (t, 1H), 6.34 (s, 1H), 3.96 (t, 2H), 3.87 (s, 3H), 3.00 (t, 2H), 2.22-2.04 (m, 2H). | 434.18 |
| Example 4 | | 1-[7-difluoromethyl-6-(1-methyl-1H-pyrazol-4-yl)-3,4-dihydro-2H-quinolin-1-yl]-isoquinoline-3-carboxylic acid dimethylamide | $^1$H NMR (400 MHz, DMSO) δ 8.13 (d, 1H), 8.03 (d, 1H), 7.95 (s, 1H), 7.83 (dd, 2H), 7.69 (t, 1H), 7.54 (s, 1H), 7.26 (s, 1H), 6.71 (t, 1H), 6.51 (s, 1H), 3.88 (s, 3H), 3.81 (s, 2H), 2.99 (d, 5H), 2.92 (s, 3H), 2.07 (s, 2H). | 462.21 |
| Example 5 | | 1-[7-difluoromethyl-6-(1-methyl-1H-pyrazol-4-yl)-3,4-dihydro-2H-quinolin-1-yl]-isoquinoline-3-carboxylic acid ethylamide | $^1$H NMR (400 MHz, DMSO) δ 8.60 (t, 1H), 8.41 (s, 1H), 8.23 (d, 1H), 7.88 (d, 1H), 7.83 (t, 1H), 7.79 (s, 1H), 7.65 (t, 1H), 7.54 (s, 1H), 7.28 (s, 1H), 6.67 (t, 1H), 6.32 (s, 1H), 3.97 (s, 2H), 3.87 (s, 3H), 3.39 (d, 2H), 3.01 (s, 2H), 2.24-2.10 (m, 2H), 1.15 (t, 3H). | 462.21 |

-continued

| Example No. | Structure | Chemical name | ¹HNMR | MS (m/z) [M + H]⁺ |
|---|---|---|---|---|
| Example 6 | | 1-[7-difluoro-methyl-6-(1-methyl-1H-pyrazol-4-yl)-3,4-dihydro-2H-quinolin-1-yl]-isoquinoline-3-carboxylic acid(2-hydroxy-ethyl)-amide | ¹H NMR (400 MHz, DMSO) δ 8.57 (t, 1H), 8.43 (s, 1H), 8.24 (d, 1H), 7.93-7.80 (m, 2H), 7.78 (s, 1H), 7.65 (t, 1H), 7.54 (s, 1H), 7.28 (s, 1H), 6.66 (t, 1H), 6.30 (s, 1H), 4.82 (t, 1H), 3.96 (s, 2H), 3.87 (s, 3H), 3.56 (dd, 2H), 3.48-3.38 (m, 2H), 3.01 (s, 2H), 2.24-2.06 (m, 2H). | 478.20 |
| Example 7 | | 1-[7-difluoro-methyl-6-(1-methyl-1H-pyrazol-4-yl)-3,4-dihydro-2H-quinolin-1-yl]-isoquinoline-3-carboxylic acid(2-hydroxy-propyl)-amide | ¹H NMR (400 MHz, DMSO) δ 8.50 (t, 1H), 8.42 (s, 1H), 8.24 (d, 1H), 7.92-7.81 (m, 2H), 7.79 (s, 1H), 7.65 (t, 1H), 7.54 (s, 1H), 7.29 (s, 1H), 6.67 (t, 1H), 6.34 (s, 1H), 4.86 (d, 1H), 3.96 (s, 2H), 3.87 (s, 3H), 3.81 (dd, 1H), 3.47-3.37 (m, 1H), 3.29-3.15 (m, 1H), 3.00 (d, 2H), 2.25-2.05 (m, 2H), 1.08 (d, 3H). | 492.22 |
| Example 8 | | {1-[7-difluoro-methyl-6-(1-methyl-1H-pyrazol-4-yl)-3,4-dihydro-2H-quinolin-1-yl]-isoquinolin-3-yl}-(3-hydroxy-azetidine-1-yl)methanone | ¹H NMR (400 MHz, DMSO) δ 8.35 (s, 1H), 8.21 (d, 1H), 7.95 (d, 1H), 7.82 (dd, 2H), 7.68 (t, 1H), 7.55 (s, 1H), 7.28 (s, 1H), 6.69 (t, 1H), 6.41 (s, 1H), 5.66 (d, 1H), 4.75-4.61 (m, 1H), 4.45 (d, 1H), 4.26 (dd, 2H), 3.88-3.74 (m, 5H), 3.00 (s, 2H), 2.12 (s, 2H). | 490.20 |
| Example 9 | | 1-[7-difluoro-methyl-6-(1-methyl-1H-pyrazol-4-yl)-3,4-dihydro-2H-quinolin-1-yl]-isoquinoline-3-carboxylic acid cyclopropylamide | ¹H NMR (400 MHz, DMSO) δ 8.64 (s, 1H), 8.43 (s, 1H), 8.23 (d, 1H), 8.11 (s, 1H), 7.81 (d, 2H), 7.70-7.48 (m, 2H), 7.25 (s, 1H), 5.97 (d, 1H), 3.95 (s, 2H), 2.98 (s, 2H), 2.87 (d, 3H), 2.72 (d, 3H), 2.16 (s, 2H). | 474.21 |

-continued

| Example No. | Structure | Chemical name | ¹HNMR | MS (m/z) [M + H]⁺ |
|---|---|---|---|---|
| Example 10 | | 4-[7-difluoromethyl-6-(1-methyl-1H-pyrazol-4-yl)-3,4-dihydro-2H-quinolin-1-yl]-thiophene[3,2-d]pyrimidin-2-carboxylic acid methylamide | ¹H NMR (400 MHz, DMSO) δ 8.80-8.71 (m, 1H), 8.19 (d, 1H), 7.95 (s, 1H), 7.69 (s, 1H), 7.53 (d, 1H), 7.47 (s, 1H), 7.35 (s, 1H), 6.95 (t, 1H), 4.21 (t, 2H), 3.92 (s, 3H), 2.87 (d, 5H), 2.03 (m, 2H). | 455.15 |
| Example 11 | | 6-[7-difluoromethyl-6-(1-methyl-1H-pyrazol-4-yl)-3,4-dihydro-2H-quinolin-1-yl]-4,5-dihydro-pyridine-2-carboxylic acid methylamide | ¹H NMR (400 MHz, DMSO) δ 8.32 (d, 1H), 7.87 (s, 1H), 7.80 (dd, 1H), 7.62 (d, 2H), 7.51 (d, 1H), 7.37-7.26 (m, 2H), 6.93 (t, 1H), 4.01-3.94 (m, 2H), 3.90 (s, 3H), 2.82 (t, 5H), 2.04-1.90 (m, 2H). | 398.18 |
| Example 12 | | 4-[7-difluoromethyl-6-(1-methyl-1H-pyrazol-4-yl)-3,4-dihydro-2H-quinolin-1-yl]-quinazolin-2-carboxylic acid methylamide | PB24-032-01 ¹H NMR (400 MHz, DMSO) δ 8.76 (d, 1H), 8.02 (d, 1H), 7.95-7.84 (m, 2H), 7.63 (s, 1H), 7.55 (d, 1H), 7.46 (dd, 2H), 6.94-6.57 (m, 2H), 4.14 (t, 2H), 3.90 (s, 3H), 2.98 (t, 2H), 2.87 (d, 3H), 2.12 (m, 2H). | 449.19 |
| Example 13 | | 2-[7-difluoromethyl-6-(1-methyl-1H-pyrazol-4-yl)-3,4-dihydro-2H-quinolin-1-yl]-[2,6]naphthyridine-3-carboxylic acid methylamide | ¹H NMR (400 MHz, DMSO) δ 9.61 (s, 1H), 8.61 (dd, 2H), 8.46 (s, 1H), 7.82 (s, 1H), 7.66-7.42 (m, 2H), 7.35 (s, 1H), 6.70 (t, 1H), 6.49 (s, 1H), 4.04 (s, 2H), 3.88 (s, 3H), 3.00 (s, 2H), 2.90 (d, 3H), 2.16 (d, 2H). | 449.19 |

| Example No. | Structure | Chemical name | ¹HNMR | MS (m/z) [M + H]⁺ |
|---|---|---|---|---|
| Example 14 | | 1-[7-difluoro-methyl-6-(1-methyl-1H-pyrazol-4-yl)-3,4-dihydro-2H-quinolin-1-yl]-[2,7]naphthyridine-3-carboxylic acid methylamide | ¹H NMR (400 MHz, DMSO) δ 9.12 (s, 1H), 8.71 (d, 1H), 8.66 (d, 1H), 8.27 (s, 1H), 8.06 (d, 1H), 7.83 (s, 1H), 7.58 (s, 1H), 7.36 (s, 1H), 7.02-6.53 (m, 2H), 4.08 (t, 2H), 3.88 (s, 3H), 3.01 (t, 2H), 2.89 (d, 3H), 2.21-2.10 (m, 2H). | 449.19 |
| Example 15 | | 8-[7-difluoro-methyl-6-(1-methyl-1H-pyrazol-4-yl)-3,4-dihydro-2H-quinolin-1-yl]-[1,7]naphthyridine-6-carboxylic acid methylamide | ¹H NMR (400 MHz, DMSO) δ 8.83 (d, 1H), 8.65-8.54 (m, 1H), 8.47 (d, 1H), 8.28 (s, 1H), 7.93-7.68 (m, 2H), 7.56 (s, 1H), 7.25 (s, 1H), 6.89-6.52 (m, 2H), 4.15 (t, 2H), 3.89 (s, 3H), 2.95 (t, 2H), 2.88 (d, 3H), 2.17-2.01 (m, 2H). | 449.19 |

Example 16: 1-[7-difluoromethyl-6-(1-methyl-1H-pyrazol-4-yl)-3,4-dihydro-2H-quinolin-1-yl]-7-(3,6-dihydro-2H-pyran-4-yl)-isoquinoline-3-carboxylic acid methylamide

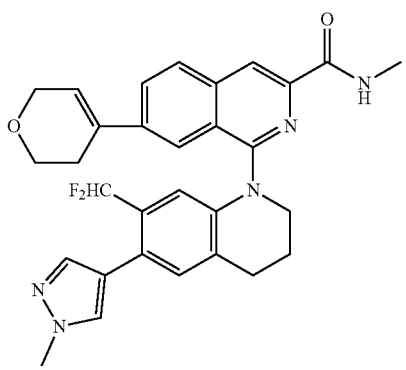 [SMILES: CNC(=O)c1cc2ccc(C3=CCOCC3)cc2c(N2CCCc3cc(-c4cnn(C)c4)c(C(F)F)cc32)n1]

Step 1: Preparation of 2-tert-butyl 3-methyl 7-(3,6-dihydro-2H-pyran-4-yl)-1-oxo-1H-isoquinoline-2,3-dicarboxylate 3,6-dihydro-2H-pyran-4-boronic acid pinacol ester (164.9 mg, 784.9 μmol, 1.0 eq.), 2-ter t-butyl 3-methyl 7-bromo-1-oxo-1H-isoquinoline-2,3-dicarboxylate (300.0 mg, 784.9 μmol, 1.0 eq.), Pd(dppf)Cl₂ (57.4 mg, 78.5 μmol, 0.1 eq.) and K₂CO₃ (108.5 mg, 784.9 μmol, 3.0 eq.) were dissolved in 1,4-dioxane (40 mL) and water (8 mL) and reacted at 110° C. for 18 h under nitrogen protection. The reaction liquid was filtered by suction, the filtrate was rotary evaporated to dryness, and the crude product was purified by column chromatography (PE/EtOAc=10:1-3:1, gradient elution) to give the title compound as an off-white solid (0.3 g, yield of 99%). MS (m/z)=386.16 [M+I-1]⁺.

Step 2: Preparation of methyl 7-(3,6-dihydro-2H-pyran-4-yl)-1-oxo-1,2-dihydro-isoquinoline-3-carboxylate 2-tert-butyl 3-methyl 7-(3,6-dihydro-2H-pyran-4-yl)-1-oxo-1H-isoquinoline-2,3-dicarboxylate (0.3 g, 778.4 μmol, 1.0 eq.) was dissolved in 20 mL of dioxane hydrochloride solution (4.0 M), and the reaction mixture was stirred at room temperature for 12 h. After the reaction was completed, the reaction mixture was directly concentrated under vacuum to give the title compound as an off-white solid (0.2 g, quantitative yield). MS (m/z)=286.11 [M+I-1]⁺.

Step 3: Preparation of methyl 1-chloro-7-(3,6-dihydro-2H-pyran-4-yl)-isoquinoline-3-carboxylate A mixture of methyl 7-(3,6-dihydro-2H-pyran-4-yl)-1-oxo-1,2-dihydro-isoquinoline-3-carboxylate (0.2 g, 778.1 μmol, 1.0 eq.) and POCl₃ (10 mL) was heated at 110° C. for 2 h. The reaction mixture was placed in an ice bath, and ice water and NaHCO₃ solid were added successively with stirring until no bubbles emerged violently while ensuring that the PH of the mixture was about 8. The reaction mixture was extracted with CH₂Cl₂, and the organic phase was washed with saturated brine, dried with anhydrous magnesium sulfate, filtered and concentrated to give the title compound as an off-white solid (0.2 g, quantitative yield), which was used in the next step without further purification. MS (m/z)=304.07 [M+1-1]⁺.

Step 4: Preparation of methyl 1-[7-difluoromethyl-6-(1-methyl-1H-pyrazol-4-yl)-3,4-dihydro-2H-quinolin-1-yl]-7-(3,6-dihy dr o-2H-pyran-4-yl)-isoquinoline-3-carboxylate Methyl 1-chloro-7-(3,6-dihydro-2H-pyran-4-yl)-isoquinoline-3-carboxylate (230.0 mg, 757.2 μmol, 1.2 eq.), 7-difluoromethyl-6-(1-methyl-1H-pyrazol-4-yl)-1,2,3,4-tetrahydroquinoline (Intermediate IX) (299.0 mg, 1.14 mmol, 1.5 eq.), Pd(OAc)₂ (17.0 mg, 75.7 μmol, 0.1 eq.), BINAP (94.3 mg, 151.5 μmol, 0.2 eq.) and Cs₂CO₃ (296.1 mg, 908.7 μmol, 1.2 eq.) were dissolved in toluene (20 mL) and reacted at 90° C. for 3 h under nitrogen protection. The reaction liquid was directly rotary evaporated to dryness, and the crude product was purified by column chromatography (PE/EtOAc=2:1-0:1, gradient elution) to give the title compound as a yellow solid (0.23 g, yield of 63%). MS (m/z)=531.22 [M+I-1]⁺.

Step 5: Preparation of 1-[7-difluoromethyl-6-(1-methyl-1H-pyrazol-4-yl)-3,4-dihydro-2H-quinolin-1-yl]-7-(3,6-dihy dr o-2H-pyran-4-yl)-isoquinoline-3-carboxylic acid methylamide Methyl 1-[7-difluoromethyl-6-(1-methyl-1H-pyrazol-4-yl)-3,4-dihydro-2H-quinolin-1-yl]-7-(3,6-dihy dr o-2H-pyran-4-yl)-isoquinoline-3-carboxylate (0.23 g, 433.5 μmol, 1.0 eq.) was dissolved in a solution of methylamine in ethanol (10 mL) and reacted at 80° C. for 2 h. The reaction liquid was rotary evaporated to dryness, and the crude product was purified on a thick preparation plate (CH₂Cl₂/MeOH=20:1) to give the title compound as a yellow solid (0.2 g, yield of 87%). ¹H NMR (400 MHz, DMSO) δ 8.61-8.51 (m, 1H), 8.33 (s, 1H), 8.17 (d, 1H), 8.00 (dd, 1H), 7.78 (s, 1H), 7.66 (s, 1H), 7.53 (s, 1H), 7.31 (s, 1H), 6.68 (t, 1H), 6.41 (s, 1H), 6.35 (s, 1H), 4.20 (d, 2H), 4.01 (t, 2H), 3.88 (s, 3H), 3.73 (t, 2H), 3.00 (t, 2H), 2.88 (d, J=4.9 Hz, 3H), 2.17 (m, 4H). MS (m/z)=530.24 [M+H]⁺.

Example 17: 1-[7-difluoromethyl-6-(1-methyl-1H-pyrazol-4-yl)-3,4-dihydro-2H-quinolin-1-yl]-7-(tetrahydro-4-yl)-isoquinoline-3-carboxylic acid methylamide

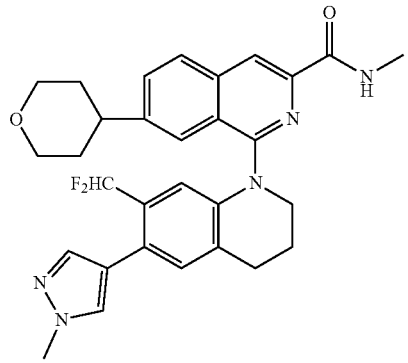 [SMILES: CNC(=O)c1cc2ccc(C3CCOCC3)cc2c(N2CCCc3cc(-c4cnn(C)c4)c(C(F)F)cc32)n1]

Step 1: Preparation of 1-[7-difluoromethyl-6-(1-methyl-1H-pyrazol-4-yl)-3,4-dihydro-2H-quinolin-1-yl]-7-(tetrahydro-4-yl)-isoquinoline-3-carboxylic acid methylamide 1-[7-difluoromethyl-6-(1-methyl-1H-pyrazol-4-yl)-3,4-dihydro-2H-quinolin-1-yl]-7-(3,6-dihy dr o-2H-pyran-4-yl)-isoquinoline-3-carboxylic acid methylamide (197.0 mg, 548.8 μmol, 1.0 eq.) was dissolved in THF (20 mL), 10% Pd/C (4.5 mg, 37.2 μmol, 0.1 eq.) was added, and the reaction mixture was purged with H₂ three times and reacted at room temperature for 12 h. The reaction liquid was filtered by suction, and the filtrate was rotary evaporated to dryness to give the title compound as an off-white solid (150.0 mg, 76%). ¹H NMR (400 MHz, DMSO) 0.5-8.57 (d, 1H), 8.34 (s, 1H), 8.15 (d, 1H), 7.77 (d, 2H), 7.55 (d, 2H), 7.31 (s, 1H), 6.66 (t, 1H), 6.34 (s, 1H), 4.03 (dd, 2H), 3.92-3.74 (m, 5H), 3.39 (d, 2H), 3.01 (t, 2H), 2.92-2.77 (m, 4H), 2.24-2.06 (m, 2H), 1.68-1.41 (m, 4H). MS (m/z)=532.25 [M+H]⁺.

Examples 18 to 23 were prepared in a method similar to the method in Example 17.

| Example No. | Structure | Chemical name | ¹HNMR | MS (m/z) [M + H]⁺ |
|---|---|---|---|---|
| Example 18 | (structure shown) | 1-[7-difluoromethyl-6-(1-methyl-1H-pyrazol-4-yl)-3,4-dihydro-2H-quinolin-1-yl]-7-(2,5-dihydro-furan-3-yl)-isoquinoline-3-carboxylic acid methylamide | ¹H NMR (400 MHz, DMSO) δ 8.56 (d, 1H), 8.33 (s, 1H), 8.19 (d, 1H), 8.07 (dd, 1H), 7.81 (s, 1H), 7.56 (s, 1H), 7.37 (d, 2H), 6.69 (dd, 2H), 6.44 (s, 1H), 4.72 (s, 2H), 4.60 (s, 2H), 4.01 (t, 2H), 3.88 (s, 3H), 3.00 (t, 2H), 2.88 (d, 3H), 2.22-2.06 (m, 2H). | 516.22 |

| Example No. | Structure | Chemical name | ¹HNMR | MS (m/z) [M + H]⁺ |
|---|---|---|---|---|
| Example 19 | | 1-[7-difluoromethyl-6-(1-methyl-1H-pyrazol-4-yl)-3,4-dihydro-2H-quinolin-1-yl]-7-(tetrahydrofuran-3-yl)-isoquinoline-3-carboxylic acid methylamide | ¹H NMR (400 MHz, DMSO) δ 8.56 (d, 1H), 8.33 (s, 1H), 8.16 (d, 1H), 7.81-7.70 (m, 2H), 7.58 (d, 2H), 7.31 (s, 1H), 6.67 (t, 1H), 6.34 (s, 1H), 3.97 (ddd, 3H), 3.88 (s, 3H), 3.79-3.66 (m, 2H), 3.45 (td, 2H), 3.00 (t, 2H), 2.88 (d, 3H), 2.28-2.05 (m, 3H), 1.75 (dt, 1H). | 518.24 |
| Example 20 | | 1-[7-difluoromethyl-6-(1-methyl-1H-pyrazol-4-yl)-3,4-dihydro-2H-quinolin-1-yl]-6-(3,6-dihydro-2H-pyran-4-yl)-isoquinoline-3-carboxylic acid methylamide | ¹H NMR (400 MHz, DMSO) δ 8.60 (d, 1H), 8.39 (s, 1H), 8.21 (s, 1H), 7.85 (dd, 1H), 7.77 (d, 2H), 7.54 (s, 1H), 7.28 (s, 1H), 6.65 (dd, 2H), 6.29 (s, 1H), 4.29 (d, 2H), 3.96 (s, 2H), 3.91-3.80 (m, 5H), 3.00 (t, 2H), 2.87 (d, 3H), 2.59 (s, 2H), 2.24-2.11 (m, 2H). | 530.24 |
| Example 21 | | 1-[7-difluoromethyl-6-(1-methyl-1H-pyrazol-4-yl)-3,4-dihydro-2H-quinolin-1-yl]-6-(tetrahydro-pyran-4-yl)-isoquinoline-3-carboxylic acid methylamide | ¹H NMR (400 MHz, DMSO) δ 8.55 (d, 1H), 8.37 (s, 1H), 8.07 (s, 1H), 7.88-7.73 (m, 2H), 7.61 (d, 1H), 7.53 (s, 1H), 7.26 (s, 1H), 6.67 (t, 1H), 6.28 (s, 1H), 3.99 (d, 2H), 3.92 (s, 2H), 3.87 (s, 3H), 3.56-3.39 (m, 2H), 3.00 (s, 3H), 2.87 (d, 3H), 2.27-2.07 (m, 2H), 1.79 (m, 4H). | 532.25 |
| Example 22 | | 1-[7-difluoromethyl-6-(1-methyl-1H-pyrazol-4-yl)-3,4-dihydro-2H-quinolin-1-yl]-6-(2,5-dihydro-furan-3-yl)-isoquinoline-3-carboxylic acid methylamide | ¹H NMR (400 MHz, DMSO) δ 8.60 (d, 1H), 8.36 (s, 1H), 8.05 (s, 1H), 7.89 (d, 1H), 7.78 (d, 2H), 7.54 (s, 1H), 7.29 (s, 1H), 6.86-6.50 (m, 2H), 6.31 (s, 1H), 5.03 (s, 2H), 4.80 (s, 2H), 3.97 (s, 2H), 3.87 (s, 3H), 3.00 (s, 2H), 2.88 (d, 3H), 2.17 (s, 2H). | 516.22 |

| Example No. | Structure | Chemical name | $^1$HNMR | MS (m/z) [M + H]$^+$ |
|---|---|---|---|---|
| Example 23 | | 1-[7-difluoromethyl-6-(1-methyl-1H-pyrazol-4-yl)-3,4-dihydro-2H-quinolin-1-yl]-6-(tetrahydrofuran-3-yl)-isoquinoline-3-carboxylic acid methylamide | $^1$H NMR (400 MHz, DMSO) δ 8.56 (q, 1H), 8.36 (s, 1H), 8.11 (d, 1H), 7.82 (d, 1H), 7.78 (s, 1H), 7.59 (dd, 1H), 7.54 (s, 1H), 7.27 (s, 1H), 6.67 (t, 1H), 6.29 (s, 1H), 4.11 (t, 1H), 4.05-3.95 (m, 1H), 3.94 (s, 3H), 3.87 (s, 3H), 3.86-3.79 (m, 1H), 3.64 (dt, 2H), 3.00 (t, 2H), 2.87 (d, 3H), 2.40 (m, 1H), 2.16 (dt, 2H), 2.08-1.96 (m, 1H). | 518.24 |

Example 24 1-[7-difluoromethyl-6-(1-methyl-1H-pyrazol-4-yl)-3,4-dihydro-2H-quinolin-1-yl]-7-(2-oxo-oxa zolidin-3-yl)-isoquinoline-3-carboxylic acid methylamide

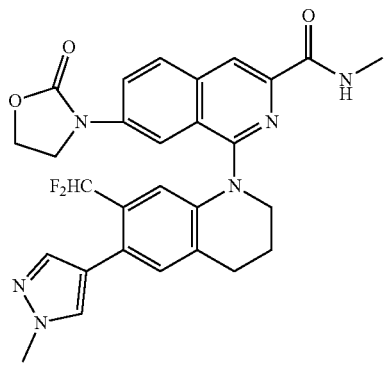 [SMILES: CNC(=O)c1cc2ccc(N3CCOC3=O)cc2c(N2CCCc3cc(-c4cnn(C)c4)c(C(F)F)cc32)n1]

Step 1: Preparation of 2-tert-butyl 3-methyl 1-oxo-7-(2-oxo-oxazolidin-3-yl)-1H-isoquinoline-2,3-dicarboxylate 2-oxazolidinone (150.4 mg, 1.7 mmol, 1.1 eq.), 2-tert-butyl 3-methyl 7-bromo-1-oxo-1H-isoquinoline-2,3-dicarboxylate (0.6 g, 1.6 mmol, 1.0 eq.), Pd$_2$(dba)$_3$ (143.8 mg, 157.0 gm', 0.1 eq.), Xantphos (150.0 mg, 314.0 μmol, 0.2 eq.) and Cs$_2$CO$_3$ (1.0 g, 3.1 mmol, 2.0 eq.) were dissolved in 1,4-dioxane (15 mL) and reacted at 95° C. for 14 h under nitrogen protection. The reaction liquid was filtered by suction, the filtrate was rotary evaporated to dryness, and the crude product was purified by column chromatography (PE/EtOAc=2:1-0:1, gradient elution) to give the title compound as a yellow solid (550.0 mg, yield of 90%). MS (m/z)=389.13 [M+H]$^+$.

Step 2: Preparation of methyl 1-oxo-7-(2-oxo-oxazolidin-3-yl)-1,2-dihydro-isoquinoline-3-carboxylate 2-ter t-butyl 3-methyl 1-oxo-7-(2-oxo-oxazolidin-3-yl)-1H-isoquinoline-2,3-dicarboxylate (550.0 mg, 1.4 mmol, 1.0 eq.) was dissolved in 20 mL of dioxane hydrochloride solution (4.0 M), and the reaction mixture was stirred at room temperature for 12 h. After the reaction was completed, the reaction mixture was directly concentrated under vacuum to give the title compound as a white solid (350.0 g, 86%). MS (m/z)=289.08 [M+14]$^+$.

Step 3: Preparation of methyl 1-chloro-7-(2-oxo-oxazolidin-3-yl)-isoquinoline-3-carboxylate A mixture of methyl 1-oxo-7-(2-oxo-oxazolidin-3-yl)-1,2-dihydro-isoquinoline-3-carboxylate (350.0 mg, 1.2 mmol, 1.0 eq.) and POCl$_3$ (10 mL) was heated at 110° C. for 2 h. The reaction mixture was placed in an ice bath, and ice water and NaHCO$_3$ solid were added successively with stirring until no bubbles emerged violently while ensuring that the PH of the mixture was about 8. The reaction mixture was extracted with CH$_2$Cl$_2$, and the organic phase was washed with saturated brine, dried with anhydrous magnesium sulfate, filtered and concentrated to give the title compound as a white solid (300.0 mg, 80%), which was used in the next step without further purification. MS (m/z)=307.05 [M+H]$^+$.

Step 4: Preparation of methyl 1-[7-difluoromethyl-6-(1-methyl-1H-pyrazol-4-yl)-3,4-dihydro-2H-quinolin-1-yl]-7-(2-oxo-oxa zolidin-3-yl)-isoquinoline-3-carboxylate Methyl 1-chloro-7-(2-oxo-oxazolidin-3-yl)-isoquinoline-3-carboxylate (200.0 mg, 652.1 μmol, 1.0 eq.), 6-bromo-7-difluoromethyl-1,2,3,4-tetrahydroquinoline (Intermediate IX) (188.9 mg, 717.3 μmol, 1.1 eq.), Pd(OAc)$_2$ (14.6 mg, 65.2 μmol, 0.1 eq.), BINAP (81.2 mg, 130.4 μmol, 0.2 eq.) and Cs$_2$CO$_3$ (255.0 mg, 782.5 μmol, 1.2 eq.) were dissolved in toluene (20 mL) and reacted at 90° C. for 15 h under nitrogen protection. The reaction liquid was directly rotary evaporated to dryness, and the crude product was purified by column chromatography (PE/EtOAc=2:1-0:1, gradient elution) to give the title compound as a yellow solid (100.0 mg, yield of 29%). MS (m/z)=534.19 [M+H]$^+$.

Step 5: Preparation of 1-[7-difluoromethyl-6-(1-methyl-1H-pyrazol-4-yl)-3,4-dihydro-2H-quinolin-1-yl]-7-(2-oxo-oxa zolidin-3-yl)-isoquinoline-3-carboxylic acid methylamide Methyl 1-[7-difluoromethyl-6-(1-methyl-1H-pyrazol-4-yl)-3,4-dihydro-2H-quinolin-1-yl]-7-(2-oxo-oxa zolidin-3- yl)-isoquinoline-3-carboxylate (100.0 mg, 187.4 μmol, 1.0 eq.) was dissolved in a solution of methylamine in ethanol (8 mL) and reacted at 80° C. for 2 h. The reaction liquid was rotary evaporated to dryness, and the crude product was purified on a thick preparation plate (CH$_2$Cl$_2$/MeOH=20:1) to give the title compound as a yellow solid (50.0 mg, yield of 50%). $^1$H NMR (400 MHz, DMSO) δ 8.49 (d, 1H), 8.40 (s, 1H), 8.24 (dt, 2H), 7.88 (s, 1H), 7.78 (s, 1H), 7.54 (s, 1H), 7.27 (s, 1H), 6.69 (t, 1H), 6.35 (s, 1H), 4.43 (t, 2H), 4.03-3.79 (m, 7H), 3.00 (t, 2H), 2.87 (d, 3H), 2.23-2.06 (m, 2H). MS (m/z)=533.21 [M+1-1]$^+$.

Examples 25 to 28 were prepared in a method similar to the method in Example 24.

| Example No. | Structure | Chemical name | $^1$HNMR | MS (m/z) [M + H]$^+$ |
|---|---|---|---|---|
| Example 25 | | 1-[7-difluoromethyl-6-(1-methyl-1H-pyrazol-4-yl)-3,4-dihydro-2H-quinolin-1-yl]-6-(2-oxo-oxazolidin-3-yl)-isoquinoline-3-carboxylic acid methylamide | $^1$H NMR (400 MHz, DMSO) δ 8.57 (d, 1H), 8.35 (s, 1H), 8.24-8.14 (m, 1H), 8.06 (s, 1H), 7.88 (d, 1H), 7.78 (s, 1H), 7.54 (s, 1H), 7.28 (s, 1H), 6.67 (t, 1H), 6.30 (s, 1H), 4.52 (t, 2H), 4.21 (t, 2H), 3.95 (t, 2H), 3.87 (s, 3H), 3.00 (d, 2H), 2.88 (d, 3H), 2.26-2.05 (m, 2H). | 533.21 |
| Example 26 | | 1-(7-(difluoromethyl)-6-(1-methyl-1H-pyrazol-4-yl)-3,4-dihydroquinolin-1(2H)-yl)-6-(1,1-dioxyisothiazolidin-2-yl)-N-methylisoquinoline-3-carboxamide | $^1$H NMR (400 MHz, DMSO) δ 8.55 (d, 1H), 8.32 (s, 1H), 7.87 (d, 1H), 7.78 (s, 1H), 7.73 (s, 1H), 7.68-7.58 (m, 1H), 7.53 (s, 1H), 7.27 (s, 1H), 6.67 (t, 1H), 6.28 (s, 1H), 3.93 (d, 3H), 3.87 (d, 3H), 3.64 (t, 2H), 2.99 (s, 2H), 2.87 (d, 3H), 2.48 (d, 2H), 2.23-2.06 (m, 2H). | 567.20 |
| Example 27 | | 1-[7-difluoromethyl-6-(1-methyl-1H-pyrazol-4-yl)-3,4-dihydro-2H-quinolin-1-yl]-6-(4-methyl-2-oxo-piperazin-1-yl)-isoquinoline-3-carboxylic acid methylamide | $^1$H NMR (400 MHz, DMSO) δ 8.58 (d, 1H), 8.38 (s, 1H), 8.20 (s, 1H), 7.85 (d, 1H), 7.78 (s, 1H), 7.72 (d, 1H), 7.54 (s, 1H), 7.28 (s, 1H), 6.68 (t, 1H), 6.31 (s, 1H), 3.93 (s, 2H), 3.87 (s, 3H), 3.82 (d, 2H), 3.19 (s, 2H), 3.00 (s, 2H), 2.87 (d, 3H), 2.82-2.73 (m, 2H), 2.31 (s, 3H), 2.23-2.08 (m, 2H). | 560.26 |

| Example No. | Structure | Chemical name | ¹HNMR | MS (m/z) [M + H]⁺ |
|---|---|---|---|---|
| Example 28 | | 1-[7-difluoromethyl-6-(1-methyl-1H-pyrazol-4-yl)-3,4-dihydro-2H-quinolin-1-yl]-6-(3-oxo-morpholin-4-yl)-isoquinoline-3-carboxylic acid methylamide | ¹H NMR (400 MHz, DMSO) δ 8.58 (d, 1H), 8.38 (s, 1H), 8.25 (s, 1H), 7.88 (d, 1H), 7.80 (d, 2H), 7.54 (s, 1H), 7.28 (s, 1H), 6.68 (t, 1H), 6.32 (s, 1H), 4.28 (s, 2H), 4.04 (d, 2H), 3.91 (dd, 7H), 3.00 (s, 2H), 2.88 (d, 3H), 2.17 (s, 2H). | 547.23 |

Example 29 1-[7-difluoromethyl-6-(1-methyl-1H-pyrazol-4-yl)-3,4-dihydro-2H-quinolin-1-yl]-6-(tetrahydro furan-2-yl)-isoquinoline-3-carboxylic acid methylamide

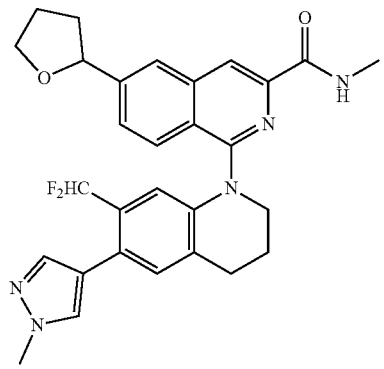 [SMILES: CNC(=O)c1cc2cc(C3CCCO3)ccc2c(N2CCCc3cc(-c4cnn(C)c4)c(C(F)F)cc32)n1]

Step 1: Preparation of 2-tert-butyl 3-methyl 6-(4,5-dihydrofuran-2-yl)-1-oxo-1H-isoquinoline-2,3-di carboxylate 2,3-dihydrofuran (1.0 mmol, 2.6 mmol, 1.0 eq.), 2-tert-butyl 3-methyl 6-bromo-1-oxo-1H-isoquinoline-2,3-dicarboxylate (366.8 mg, 5.2 mmol, 2.0 eq.), (o-MePh)₃P (159.1 mg, 523.3 μmol, 0.2 eq.) and Pd(OAc)₂ (58.6 mg, 261.6 μmol, 0.1 eq.) were dissolved in DMF (20 mL) and reacted at 80° C. for 1 h under nitrogen protection. The reaction liquid was filtered by suction, the filtrate was rotary evaporated to dryness, and the crude product was purified by column chromatography (PE/EtOAc=10:1-3:1, gradient elution) to give the title compound as an off-white solid (0.8 g, yield of 82%). MS (m/z)=372.14 [M+H]⁺.

Step 2: Preparation of 2-tert-butyl 3-methyl 1-oxo-6-(tetrahydrofuran-2-yl)-1H-isoquinoline-2,3-dicarboxylate 2-tert-butyl 3-methyl 6-(4,5-dihydrofuran-2-yl)-1-oxo-1H-isoquinoline-2,3-dicarboxylate (0.8 g, 2.2 mmol, 1.0 eq.) and Pd/C (261.6 mg, 2.2 mmol, 0.1 eq.) were dissolved in methanol (50 mL) and reacted at room temperature for 16 h. The reaction liquid was carefully filtered by suction, and the filtrate was rotary evaporated to dryness to give the title compound as an off-white solid (0.8 g, quantitative yield). MS (m/z)=374.16 [M+H]⁺.

Step 3: Preparation of methyl 1-oxo-6-(tetrahydrofuran-2-yl)-1,2-dihydroisoquinoline-3-carboxylate 2-tert-butyl 3-methyl 1-oxo-6-(tetrahydrofuran-2-yl)-1H-isoquinoline-2,3-dicarboxylate (0.8 g, 2.1 mmol, 1.0 eq.) was dissolved in 20 mL of dioxane hydrochloride solution (4.0 M), and the reaction mixture was stirred at room temperature for 12 h. After the reaction was completed, the reaction mixture was directly concentrated under vacuum to give the title compound as an off-white solid (0.5 g, 85%). MS (m/z)=274.11 [M+14]⁺.

Step 4: Preparation of methyl 1-chloro-6-(tetrahydrofuran-2-yl)-isoquinoline-3-carboxylate A mixture of methyl 1-oxo-6-(tetrahydrofuran-2-yl)-1,2-dihydroisoquinoline-3-carboxylate (0.5 g, 1.8 mmol, 1.0 eq.) and POCl₃ (10 mL) was heated at 110° C. for 2 h. The reaction mixture was placed in an ice bath, and ice water and NaHCO₃ solid were added successively with stirring until no bubbles emerged violently while ensuring that the PH of the mixture was about 8. The reaction mixture was extracted with CH₂Cl₂, and the organic phase was washed with saturated brine, dried with anhydrous magnesium sulfate, filtered and concentrated to give the title compound as an off-white solid (0.4 g, 75%), which was used in the next step without further purification. MS (m/z)=292.07 [M+1-1]⁺.

Step 5: Preparation of methyl 1-[7-difluoromethyl-6-(1-methyl-1H-pyrazol-4-yl)-3,4-dihydro-2H-quinolin-1-yl]-6-(tetrahydro furan-2-yl)-isoquinoline-3-carboxylate Methyl 1-chloro-6-(tetrahydrofuran-2-yl)-isoquinoline-3-carboxylate (0.4 g, 1.4 mmol, 1.0 eq.), 7-difluoromethyl-6-(1-methyl-1H-pyrazol-4-yl)-1,2,3,4-tetrahydroquinoline (Intermediate IX) (541.5 mg, 2.1 mmol, 1.5 eq.), Pd(OAc)₂ (30.8 mg, 137.1 μmol, 0.1 eq.), BINAP (170.7 mg, 274.2

µmol 0.2 eq.) and Cs₂CO₃ (536.1 mg, 1.6 mmol, 1.2 eq.) were dissolved in toluene (20 mL) and reacted at 90° C. for 3 h under nitrogen protection. The reaction liquid was directly rotary evaporated to dryness, and the crude product was purified by column chromatography (PE/EtOAc=2:1-0:1, gradient elution) to give the title compound as a yellow solid (0.23 g, yield of 36%). MS (m/z)=519.22 [M+I-1]⁺.

Step 6: Preparation of 1-[7-difluoromethyl-6-(1-methyl-1H-pyrazol-4-yl)-3,4-dihydro-2H-quinolin-1-yl]-6-(tetrahydro furan-2-yl)-isoquinoline-3-carboxylic acid methylamide Methyl 1-[7-difluoromethyl-6-(1-methyl-1H-pyrazol-4-yl)-3,4-dihydro-2H-quinolin-1-yl]-6-(tetrahydro furan-2-yl)-isoquinoline-3-carboxylate (0.23 g, 433.5 µmol 1.0 eq.) was dissolved in a solution of methylamine in ethanol (10 mL) and reacted at 80° C. for 2 h. The reaction liquid was rotary evaporated to dryness, and the crude product was purified on a thick preparation plate (CH₂Cl₂/MeOH=20:1) to give the title compound as a yellow solid (0.1 g, yield of 44%). ¹H NMR (400 MHz, DMSO) δ 8.58 (q, 1H), 8.37 (s, 1H), 8.12 (s, 1H), 7.84 (d, 1H), 7.78 (s, 1H), 7.62-7.53 (m, 1H), 7.54 (s, 114), 7.27 (s, 1H), 6.67 (t, 1H), 6.28 (s, 1H), 5.02 (t, 1H), 4.07 (dd, 1H), 4.00-3.80 (m, 6H), 3.00 (t, 2H), 2.87 (d, 3H), 2.40 (td, 1H), 2.22-2.09 (m, 2H), 2.03-1.91 (m, 2H), 1.72 (ddd, 1H). MS (m/z)=518.24 [M+H]⁺.

Example 30: 1-(7-difluoromethyl-6-pyrimidine-5-yl-3,4-dihydro-2H-quinolin-1-yl)-isoquinoline-3-carboxylic acid methylamide

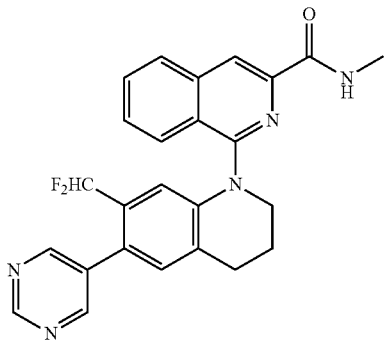 [SMILES: CNC(=O)c1cc2ccccc2c(N2CCCc3cc(-c4cncnc4)c(C(F)F)cc32)n1]

Step 1: Preparation of 7-difluoromethyl-6-pyrimidin-5-yl-1,2,3,4-tetrahydroquinoline 5-pyrimidineboronic acid pinacol ester (283.0 mg, 1.4 mmol, 1.2 eq.), 6-bromo-7-difluoromethyl-1,2,3,4-tetrahydroquinoline (step 3 of Intermediate IX) (300.0 mg, 1.1 mmol, 1.0 eq.), Pd(dppf)Cl₂ (83.7 mg, 114.5 µmol, 0.1 eq.) and K₂CO₃ (474.6 mg, 3.43 mmol, 3.0 eq.) were dissolved in 1,4-dioxane (50 mL) and water (10 mL) and reacted at 110° C. for 18 h under nitrogen protection. The reaction liquid was filtered by suction, the filtrate was rotary evaporated to dryness, and the crude product was purified by column chromatography (PE/EtOAc=5:1-1:1, gradient elution) to give the title compound as an off-white solid (290.0 mg, yield of 97%). MS (m/z)=262.12 [M+H]⁺.

Step 2: Preparation of methyl 1-(7-difluoromethyl-6-pyrimidin-5-yl-3,4-dihydro-2H-quinolin-1-yl)-isoquinoline-3-carboxylate Methyl 1-chloroisoquinoline-3-carboxylate (Intermediate I) (205.0 mg, 925.0 µmol, 1.0 eq.), 7-difluoromethyl-6-pyrimidin-5-yl-1,2,3,4-tetrahydroquinoline (290.0 mg, 1.1 mmol, 1.2 eq.), Pd(OAc)₂ (20.8 mg, 92.5 µmol, 0.1 eq.), BINAP (115.2 mg, 185.0 µmol, 0.2 eq.) and Cs₂CO₃ (361.6 mg, 1.1 mmol, 1.2 eq.) were dissolved in toluene (20 mL) and reacted at 90° C. for 3 h under nitrogen protection. The reaction liquid was directly rotary evaporated to dryness, and the crude product was purified by column chromatography (PE/EtOAc=2:1-0:1, gradient elution) to give the title compound as a yellow solid (0.3 g, yield of 73%). MS (m/z)=447.16 [M+1-1]⁺.

Step 3: Preparation of 1-(7-difluoromethyl-6-pyrimidin-5-yl-3,4-dihydro-2H-quinolin-1-yl)-isoquinoline-3-carboxylic acid methylamide Methyl 1-(7-difluoromethyl-6-pyrimidin-5-yl-3,4-dihydro-2H-quinolin-1-yl)-isoquinoline-3-carboxylate (0.3 g, 672.0 µmol, 1.0 eq.) was dissolved in a solution of methylamine in ethanol (10 mL) and reacted at 80° C. for 2 h. The reaction liquid was rotary evaporated to dryness, and the crude product was purified on a thick preparation plate (CH₂Cl₂/MeOH=20:1) to give the title compound as a yellow solid (0.1 g, yield of 33%). ¹H NMR (400 MHz, DMSO) 0.5-9.19 (s, 1H), 8.77 (s, 214), 8.62 (d, 1H), 8.49 (s, 1H), 8.28 (d, 1H), 7.95 (d, 1H), 7.87 (t, 1H), 7.77-7.66 (m, 1H), 7.29 (s, 1H), 6.64 (t, 1H), 6.30 (s, 1H), 3.96 (s, 2H), 3.05 (t, 2H), 2.88 (d, 3H), 2.27-2.10 (m, 2H). MS (m/z)=446.18 [M+H]⁺.

Examples 31 to 39 were prepared in a method similar to the method in Example 30.

| Example No. | Structure | Chemical name | HNMR | MS (m/z) [M + H]⁺ |
|---|---|---|---|---|
| Example 31 | ![structure] | 1-[7-difluoromethyl-6-(3,6-dihydro-2H-pyran-4-yl)-3,4-dihydro-2H-quinolin-1-yl]-isoquinoline-3-carboxylic acid methylamide | ¹H NMR (400 MHz, DMSO) δ 8.58 (d, 1H), 8.42 (s, 1H), 8.24 (d, 1H), 7.84 (ddd, 2H), 7.71-7.59 (m, 1H), 7.13 (s, 1H), 6.69 (t, 2H), 6.19 (s, 1H), 5.57 (s, 1H), 4.15 (d, 2H), 3.93 (t, 2H), 3.80 (t, 2H), 2.99 (t, 2H), 2.88 (d, 3H), 2.30 (s, 2H), 2.17 (dd, 2H). | 450.20 |

-continued

| Example No. | Structure | Chemical name | HNMR | MS (m/z) [M + H]+ |
|---|---|---|---|---|
| Example 32 | 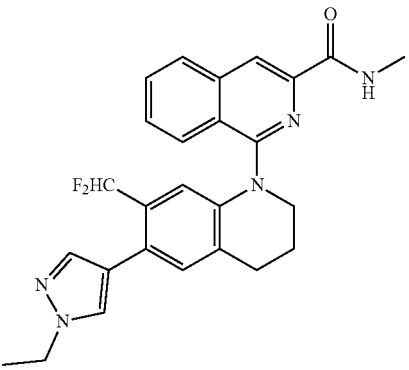 [SMILES: CCn1cc(-c2cc3c(cc2C(F)F)N(c2nc(C(=O)NC)cc4ccccc24)CCC3)cn1] | 1-[7-difluoro-methyl-6-(1-ethyl-1H-pyrazol-4-yl)-3,4-dihydro-2H-quinolin-1-yl]-isoquinoline-3-carboxylic acid methylamide | $^1$H NMR (400 MHz, DMSO) δ 8.60 (s, 1H), 8.41 (s, 1H), 8.23 (d, 1H), 7.85 (d, 3H), 7.65 (d, 1H), 7.55 (s, 1H), 7.30 (s, 1H), 6.67 (t, 1H), 6.28 (s, 1H), 4.16 (d, 2H), 3.97 (s, 2H), 3.01 (s, 2H), 2.88 (d, 3H), 2.17 (s, 2H), 1.40 (t, 3H). | 462.21 |
| Example 33 | 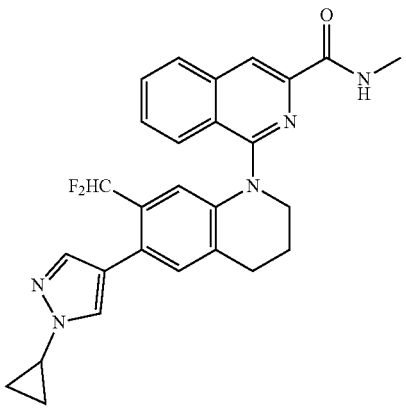 [SMILES: CNC(=O)c1cc2ccccc2c(N2CCCc3cc(-c4cnn(C5CC5)c4)c(C(F)F)cc32)n1] | 1-[6-(1-cyclo-propyl-1H-pyrazol-4-yl)-7-difluoromethyl-3,4-dihydro-2H-quinolin-1-yl]-isoquinoline-3-carboxylic acid methylamide | $^1$H NMR (400 MHz, DMSO) δ 8.65-8.54 (m, 1H), 8.41 (s, 1H), 8.23 (d, 1H), 7.89-7.78 (m, 3H), 7.68-7.59 (m, 1H), 7.53 (s, 1H), 7.29 (s, 1H), 6.69 (t, 1H), 6.27 (s, 1H), 3.97 (t, 2H), 3.76 (ddd, 1H), 3.00 (t, 2H), 2.88 (d, 3H), 2.18 (dd, 2H), 1.11-1.04 (m, 2H), 0.98 (m, 2H). | 474.21 |
| Example 34 | 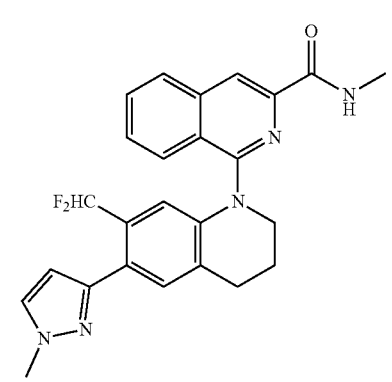 [SMILES: CNC(=O)c1cc2ccccc2c(N2CCCc3cc(-c4ccn(C)n4)c(C(F)F)cc32)n1] | 1-[7-difluoro-methyl-6-(1-methyl-1H-pyrazol-3-yl)-3,4-dihydro-2H-quinolin-1-yl]-isoquinoline-3-carboxylic acid methylamide | $^1$H NMR (400 MHz, DMSO) δ 8.61 (q, 1H), 8.42 (s, 1H), 8.24 (d, 1H), 7.92-7.80 (m, 2H), 7.75 (d, 1H), 7.64 (ddd, 1H), 7.50 (s, 1H), 7.31 (t, 1H), 6.52 (d, 1H), 6.29 (s, 1H), 3.98 (dd, 2H), 3.87 (s, 3H), 3.03 (t, 2H), 2.88 (d, 3H), 2.27-2.10 (m, 2H). | 448.19 |

-continued

| Example No. | Structure | Chemical name | HNMR | MS (m/z) [M + H]+ |
|---|---|---|---|---|
| Example 35 | | 1-{7-difluoro-methyl-6-[1-(2-hydroxyethyl)-1H-pyrazol-3-yl]-3,4-dihydro-2H-quinolin-1-yl}-isoquinoline-3-carboxylic acid methylamide | $^1$H NMR (400 MHz, DMSO) δ 8.60 (d, 1H), 8.41 (s, 1H), 8.23 (d, 1H), 7.84 (dd, 2H), 7.79 (s, 1H), 7.64 (t, 1H), 7.57 (s, 1H), 7.30 (s, 1H), 6.67 (t, 1H), 6.28 (s, 1H), 4.91 (t, 1H), 4.17 (t, 2H), 3.97 (t, 2H), 3.75 (q, 2H), 3.01 (t, 2H), 2.88 (d, 3H), 2.25-2.09 (m, 2H). | 478.20 |
| Example 36 | | 1-{7-difluoro-methyl-6-[1-(2-dimethylamino-ethyl)-1H-pyrazol-3-yl]-3,4-dihydro-2H-quinolin-1-yl}-isoquinoline-3-carboxylic acid methylamide | $^1$H NMR (400 MHz, DMSO) δ 8.59 (d, 1H), 8.40 (s, 1H), 8.22 (d, 1H), 7.90-7.76 (m, 2H), 7.69-7.60 (m, 1H), 7.55 (s, 1H), 7.29 (s, 1H), 6.65 (t, 1H), 6.28 (s, 1H), 4.22 (t, 2H), 4.03-3.88 (m, 2H), 3.50-3.46 (m, 3H), 3.01 (t, 2H), 2.88 (d, 3H), 2.76-2.61 (m, 2H), 2.19 (s, 6H). | 505.25 |
| Example 37 | | 8-(7-difluoro-methyl-6-pyrimidine-5-yl-3,4-dihydro-2H-quinolin-1-yl)-[1,7]naphthyridine-6-carboxylic acid methylamide | $^1$H NMR (400 MHz, DMSO) δ 9.20 (s, 1H), 8.88 (dd, 1H), 8.80 (s, 2H), 8.63 (dd, 1H), 8.52 (q, 1H), 8.36 (s, 1H), 7.81 (dd, 1H), 7.27 (s, 1H), 6.82-6.51 (m, 2H), 4.21-4.12 (m, 2H), 3.00 (t, 2H), 2.89 (d, 3H), 2.18-2.03 (m, 2H). | 447.17 |

| Example No. | Structure | Chemical name | HNMR | MS (m/z) [M + H]+ |
|---|---|---|---|---|
| Example 38 | | 8-[7-difluoro-methyl-6-(1-methanesulfonyl-methyl-1H-pyrazol-4-yl)-3,4-dihydro-2H-quinolin-1-yl]-[1,7]naphthyridine-6-carboxylic acid methylamide | $^1$H NMR (400 MHz, DMSO) δ 8.84 (dd, 1H), 8.60 (dd, 1H), 8.49 (d, 1H), 8.30 (s, 1H), 7.99 (s, 1H), 7.83 (s, 1H), 7.78 (dd, 1H), 7.30 (s, 1H), 6.84-6.50 (m, 2H), 5.79 (s, 2H), 4.21-4.10 (m, 2H), 3.05 (s, 3H), 2.97 (t, 2H), 2.88 (d, 3H), 2.15-2.04 (m, 2H). | 527.17 |
| Example 39 | | 8-(7-difluoro-methyl-6-pyrida-zine-4-yl-3,4-dihydro-2H-quinolin-1-yl)-[1,7]naphthyridine-6-carboxylic acid methylamide | $^1$H NMR (400 MHz, DMSO) δ 9.27 (d, 2H), 8.89 (dd, 1H), 8.64 (dd, 1H), 8.54 (d, 1H), 8.38 (s, 1H), 7.82 (dd, 1H), 7.66 (dd, 1H), 7.32 (s, 1H), 6.87-6.56 (m, 2H), 4.25-4.09 (m, 2H), 3.01 (t, 2H), 2.89 (d, 3H), 2.12 (dt, 2H). | 447.17 |

Example 40: 1-[4-methylamino-6-(1-methyl-1H-pyrazol-4-yl)-3,4-dihydro-2H-quinolin-1-yl]-isoquinoline-3-carboxylic acid methylamide

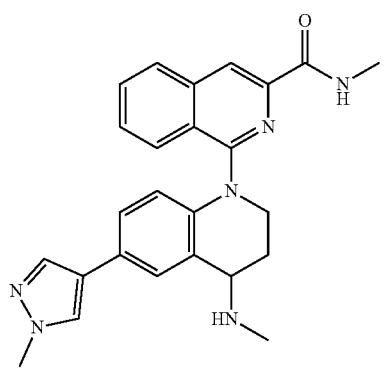 [SMILES: CNC(=O)c1cc2ccccc2c(N2CCC(NC)c3cc(-c4cnn(C)c4)ccc32)n1]

Step 1: Preparation of 6-(1-methyl-1H-pyrazol-4-yl)-2,3-dihydro-1H-quinolin-4-one 1-methylpyrazole-4-boronic acid pinacol ester (552.2 mg, 2.6 mmol, 1.2 eq.), 6-bromo-2,3-dihydroquinolin-4(1H)-one (0.5 g, 2.2 mmol, 1.0 eq.), Pd(dppf)Cl$_2$ (161.8 mg, 221.2 μmol, 0.1 eq.) and K$_2$CO$_3$ (917.0 mg, 6.6 mmol, 3.0 eq.) were dissolved in 1,4-dioxane (50 mL) and water (10 mL) and reacted at 110° C. for 18 h under nitrogen protection. The reaction liquid was filtered by suction, the filtrate was rotary evaporated to dryness, and the crude product was purified by column chromatography (PE/EtOAc=5:1-1:1, gradient elution) to give the title compound as an off-white solid (0.3 g, yield of 60%). MS (m/z)=228.11 [M+H]$^+$.

Step 2: Preparation of methyl 1-[6-(1-methyl-1H-pyrazol-4-yl)-4-oxo-3,4-dihydro-2H-quinolin-1-yl]-isoquinoline-3-carboxylate Methyl 1-chloroisoquinoline-3-carboxylate (Intermediate I) (292.6 mg, 1.3 mmol, 1.0 eq.), 6-(1-methyl-1H-pyrazol-4-yl)-2,3-dihydro-1H-quinolin-4-one (300.0 mg, 1.3 mmol, 1.2 eq.), Pd(OAc)$_2$ (29.6 mg, 132.0 μmol, 0.1 eq.), BINAP (164.4 mg, 264.0 μmol 0.2 eq.) and Cs$_2$CO$_3$ (516.1 mg, 1.6 mmol, 1.2 eq.) were dissolved in toluene (20 mL) and reacted at 90° C. for 15 h under nitrogen protection. The reaction liquid was directly rotary evaporated to dryness, and the crude product was purified by column chromatography (PE/EtOAc=2:1-0:1, gradient elution) to give the title compound as a yellow solid (0.3 g, yield of 55%). MS (m/z)=413.16 [M+H]$^+$.

Step 3: Preparation of 1-[4-methylimino-6-(1-methyl-1H-pyrazol-4-yl)-3,4-dihydro-2H-quinolin-1-yl]isoquinoline-3-carboxylic acid methylamide 1-[6-(1-methyl-1H-pyrazol-4-yl)-4-oxo-3,4-dihydro-2H-quinolin-1-yl]-isoquinoline-3-carboxylate (0.3 g, 727.4 μmol, 1.0 eq.) was dissolved in a solution of methylamine in ethanol (10 mL) and reacted at 80° C. for 2 h. The reaction liquid was rotary evaporated to dryness, and the crude product was purified on a thick preparation plate (CH$_2$Cl$_2$/MeOH=20:1) to give the title compound as a yellow solid (0.1 g, yield of 32%). MS (m/z)=425.21 [M+H]$^+$.

Step 4: Preparation of 1-[4-methylamino-6-(1-methyl-1H-pyrazol-4-yl)-3,4-dihydro-2H-quinolin-1-yl]-isoquinoline-3-carboxylic acid methylamide 1-[4-methylimino-6-(1-methyl-1H-pyrazol-4-yl)-3,4-dihydro-2H-quinolin-1-yl]-isoquinoline-3-carboxylic acid methylamide (0.1 g, 235.6 μmol, 1.0 eq.) was dissolved in methanol (20 mL), and NaBH$_4$ (8.9 mg, 235.6 μmol, 1.0 eq.) was added in batches and reacted at room temperature for 14 h. 20 mL of water and 20 mL of EtOAc were added to the reaction liquid, and the organic phase was washed with saturated brine, dried with anhydrous magnesium sulfate, filtered and concentrated to give the title compound as a colorless oil (50.0 mg, yield of 50%). $^1$H NMR (400 MHz, DMSO) δ 8.61 (d, 1H), 8.34 (s, 1H), 8.18 (d, 1H), 7.96 (s, 1H), 7.86-7.73 (m, 2H), 7.71 (s, 1H), 7.61-7.50 (m, 1H), 7.01 (dd, 114), 6.03 (d, 1H), 4.03 (dd, 114), 3.92 (s, 1H), 3.83 (s, 4H), 2.88 (d, 3H), 2.48 (s, 3H), 2.19 (s, 1H), 2.10 (s, 1H). MS (m/z)=427.22 [M+I-1]$^+$.

Example 41: 1-[4-hydroxy-6-(1-methyl-1H-pyrazol-4-yl)-3,4-dihydro-2H-quinolin-1-yl]isoquinoline-3-carboxylic acid methylamide

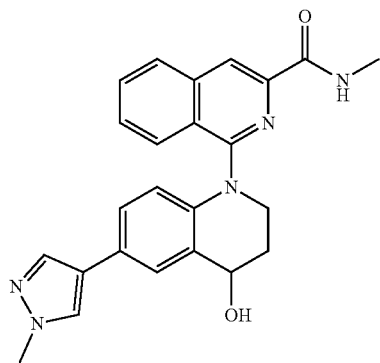 [SMILES: CNC(=O)c1cc2ccccc2c(N2CCC(O)c3cc(-c4cnn(C)c4)ccc32)n1]

Step 1: Preparation of methyl 1-[4-hydroxy-6-(1-methyl-1H-pyrazol-4-yl)-3,4-dihydro-2H-quinolin-1-yl]isoquinoline-3-carboxylate Methyl 1-[6-(1-methyl-1H-pyrazol-4-yl)-4-oxo-3,4-dihydro-2H-quinolin-1-yl]-isoquinoline-3-carboxylate was dissolved in methanol (10 mL), and NaBH$_4$ (12.8 mg, 339.4 μmol, 1.0 eq.) was added in batches and reacted at room temperature for 14 h. 20 mL of water and 20 mL of EtOAc were added to the reaction liquid, the organic phase was washed with saturated brine, dried with anhydrous magnesium sulfate, filtered and concentrated, and the crude product was purified by column chromatography (PE/EtOAc=1:1-0:1, gradient elution) to give the title compound as a yellow solid (90.0 mg, yield of 64%). MS (m/z)=415.18 [M+H]$^+$.

Step 2: Preparation of 1-[4-hydroxy-6-(1-methyl-1H-pyrazol-4-yl)-3,4-dihydro-2H-quinolin-1-yl]isoquinoline-3-carb oxylic acid methylamide Methyl 1-[4-hydroxy-6-(1-methyl-1H-pyrazol-4-yl)-3,4-dihydro-2H-quinolin-1-yl]isoquinoline-3-carboxylate (90.0 mg, 217.1 μmol, 1.0 eq.) was dissolved in a solution of methylamine in ethanol (6 mL) and reacted at 80° C. for 2 h. The reaction liquid was rotary evaporated to dryness, and the crude product was purified on a thick preparation plate (CH$_2$Cl$_2$/MeOH=20:1) to give the title compound as a yellow solid (65.0 mg, yield of 72%). $^1$H NMR (400 MHz, DMSO) δ 8.60 (q, 1H), 8.36 (s, 1H), 8.19 (d, 1H), 7.95 (s, 1H), 7.84 (d, 1H), 7.81-7.74 (m, 1H), 7.69 (d, 1H), 7.59 (dt, 2H), 7.03 (dd, 1H), 6.03 (d, 1H), 5.45 (d, 1H), 4.83 (dd, 1H), 4.06 (s, 1H), 3.83 (s, 4H), 2.88 (d, 3H), 2.35-2.20 (m, 1H), 2.15-2.01 (m, 1H). MS (m/z)=414.19 [M+H]$^+$.

Example 42: 8-[7-difluoromethyl-6-(1,2,3,6-tetrahydropyridin-4-yl)-3,4-dihydro-2H-quinolin-1-yl]-[1,7]naphthyridine-6-carboxylic acid methylamide

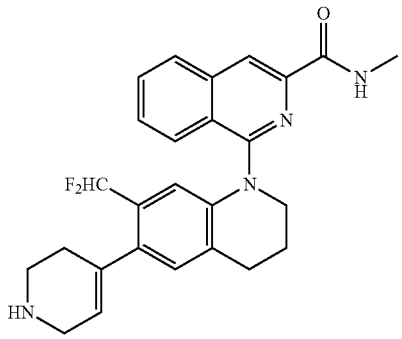 [SMILES: CNC(=O)c1cc2ccccc2c(N2CCCc3cc(C4=CCNCC4)c(C(F)F)cc32)n1]

Step 1: Preparation of ter t-butyl 4-(7-difluoromethyl-1,2,3,4-tetrahydroquinoline-6-yl)-3,6-dihydro-2H-pyridine-1-carboxylate N-Boc-1,2,5,6-tetrahydropyridine-4-boronic acid pinacol ester (3.3 g, 10.8 mmol, 2.8 eq.), 6-bromo-7-difluoromethyl-1,2,3,4-tetrahydroquinoline (step 3 of Intermediate IX) (300.0 mg, 1.1 mmol, 1.0 eq.), Pd(dppf)Cl$_2$ (279.2 mg, 381.5 μmol, 0.1 eq.) and K$_2$CO$_3$ (1.6 g, 11.5 mmol, 3.0 eq.) were dissolved in 1,4-dioxane (20 mL) and water (4 mL) and reacted at 110° C. for 14 h under nitrogen protection. The reaction liquid was filtered by suction, the filtrate was rotary evaporated to dryness, and the crude product was purified by column chromatography (PE/EtOAc=3:1-1:1, gradient elution) to give the title compound as a yellow solid (1.0 g, yield of 75%). MS (m/z)=365.20 [M+H]$^+$.

Step 2: Preparation of ethyl 8-[6-(1-ter t-butoxy carbonyl-1,2,3,6-tetrahydropyridin-4-yl)-7-difluoromethyl-3,4-dihydro-2H-quinolin-1-yl]-[1,7]naphthyridine-6-carboxylate Ethyl 8-chloro-1,7-naphthyridine-carboxylate (Intermediate IV) (762.4 mg, 3.4 mmol, 1.2 eq.), tert-butyl 4-(7-difluoromethyl-1,2,3,4-tetrahydroquinoline-6-yl)-3,6-dihydro-2H-pyridine-1-carboxylate (1.0 g, 2.8 mmol, 1.0 eq.), Pd(OAc)$_2$ (64.1 mg, 285.4 μmol, 0.1 eq.), BINAP (355.4 mg, 570.8 μmol, 0.2 eq.) and Cs$_2$CO$_3$ (1.1 g, 3.4 mmol, 1.2 eq.) were dissolved in toluene (20 mL) and reacted at 90° C. for 3 h under nitrogen protection. The reaction liquid was directly rotary evaporated to dryness, and the crude product was purified by column chromatography (PE/EtOAc=2:1-0:1, gradient elution) to give the title compound as a yellow solid (1.1 g, yield of 67%). MS (m/z)=565.26 [M+H]$^+$.

Step 3: ethyl 8-[6-(1-ter t-butoxycarbonyl-1,2,3,6-tetrahydropyridin-4-yl)-7-difluoromethyl-3,4-dihydro-2H-quinolin-1-yl]-[1,7]naphthyridine-6-carboxylate (1.1 g, 1.9 mmol, 1.0 eq.) was dissolved in 20 mL of dioxane hydrochloride solution (4.0 M), and the reaction mixture was stirred at room temperature for 12 h. After the reaction was completed, the reaction liquid was directly concentrated, 30 mL of saturated sodium bicarbonate and 30 mL of dichloromethane were added to the concentrated reaction liquid, and the organic phase was washed with saturated brine, dried with anhydrous magnesium sulfate, filtered and concentrated to give the title compound as a yellow solid (0.8 g, 92%). MS (m/z)=465.21 [M+1-1]$^+$.

Step 4: Preparation of 8-[7-difluoromethyl-6-(1,2,3,6-tetrahydropyridin-4-yl)-3,4-dihydro-2H-quinolin-1-yl]-[1,7]naphthyridine-6-carboxylic acid methylamide Ethyl 8-[7-difluoromethyl-6-(1,2,3,6-tetrahydropyridin-4-yl)-3,4-dihydro-2H-quinoline-1-yl]-[1,7]naphthyridine-6-carboxylate (100 mg, 215.0 μmol, 1.0 eq.) was dissolved in a solution of methylamine in ethanol (10 mL) and reacted at 80° C. for 2 h. The reaction liquid was rotary evaporated to dryness, and the crude product was purified on a thick preparation plate (CH$_2$Cl$_2$/MeOH=20:1) to give the title compound as a yellow solid (50.0 mg, yield of 50%). $^1$H NMR (400 MHz, DMSO) δ 8.56 (d, 1H), 8.44 (s, 1H), 8.25 (d, 1H), 7.86 (dd, 2H), 7.71-7.61 (m, 1H), 7.10 (s, 1H), 6.74 (t, 1H), 6.19 (s, 1H), 5.51 (s, 1H), 3.94 (s, 2H), 3.66 (s, 2H), 3.28 (d, 2H), 2.99 (d, 2H), 2.88 (d, 3H), 2.50 (s, 2H), 2.22-2.08 (m, 2H). MS (m/z)=449.21 [M+H]$^+$.

Example 43 8-[6-(1-acetyl-1,2,3,6-tetrahydropyridin-4-yl)-7-difluoromethyl-3,4-dihydro-2H-quinolin-1-yl]-[1,7]naphthyridine-6-carboxylic acid methylamide

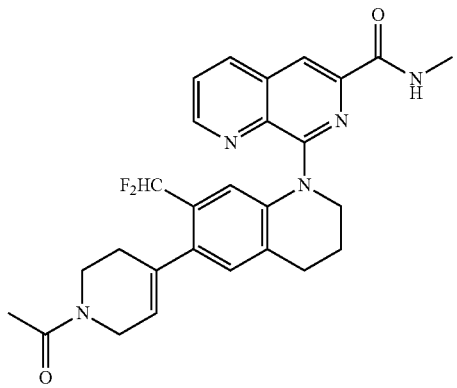 [SMILES: CNC(=O)c1cc2cccnc2c(N2CCCc3cc(C4=CCN(C(C)=O)CC4)c(C(F)F)cc32)n1]

Step 1: Preparation of ethyl 8-[6-(1-acetyl-1,2,3,6-tetrahydropyridin-4-yl)-7-difluoromethyl-3,4-dihydro-2H-quinolin-1-yl]-[1,7]naphthyridine-6-carboxylate Ethyl 8-[7-difluoromethyl-6-(1,2,3,6-tetrahydropyridin-4-yl)-3,4-dihydro-2H-quinoline-1-yl]-[1,7]naphthyridine-6-carboxylate (0.4 g, 887.9 μmol, 1.0 eq.) and trimethylamine (89.8 mg, 887.9 μmol, 1.0 eq.) were dissolved in dichloromethane (20 mL), a solution of acetyl chloride (69.7 mg, 887.9 wok 1.0 eq.) in dichloromethane was added to the reaction mixture, and the reaction mixture was reacted at room temperature for 1 h. The reaction system was diluted with 50 mL of water and extracted with dichloromethane, and the organic phase was washed with saturated brine, dried with anhydrous magnesium sulfate, filtered and concentrated to give the title compound as a yellow solid (230.0 mg, 53%). MS (m/z)=507.22 [M+14]$^+$.

Step 2: Preparation of 8-[6-(1-acetyl-1,2,3,6-tetrahydropyridin-4-yl)-7-difluoromethyl-3,4-dihydro-2H-quinolin-1-yl]-[1,7]naphthyridine-6-carboxylic acid methylamide Ethyl 8-[6-(1-acetyl-1,2,3,6-tetrahydropyridin-4-yl)-7-difluoromethyl-3,4-dihydro-2H-quinolin-1-yl]-[1,7]naphthyridine-6-carboxylate (230.0 mg, 467.0 μmol, 1.0 eq.) was dissolved in a solution of methylamine in ethanol (10 mL) and reacted at 80° C. for 2 h. The reaction liquid was rotary evaporated to dryness, and the crude product was purified on a thick preparation plate (CH$_2$Cl$_2$/MeOH=20:1) to give the title compound as a yellow solid (200.0 mg, yield of 87%). $^1$H NMR (400 MHz, DMSO) δ 8.83 (dd, 1H), 8.59 (dd, 1H), 8.44 (d, 1H), 8.29 (s, 1H), 7.78 (dd, 1H), 7.10 (d, 1H), 6.77 (dt, 1H), 6.59 (s, 1H), 5.56 (s, 1H), 4.19-3.98 (m, 4H), 3.64 (dt, 2H), 2.92 (t, 2H), 2.87 (d, 3H), 2.41 (s, 1H), 2.32 (s, 1H), 2.11-1.99 (m, 5H). MS (m/z)=492.22 [M+H]$^+$.

Example 44: 8-[7-difluoromethyl-6-(1-methyl-1,2,3,6-tetrahydropyridin-4-yl)-3,4-dihydro-2H-quinolin-1-yl]-[1,7]naphthyridine-6-carboxylic acid methylamide

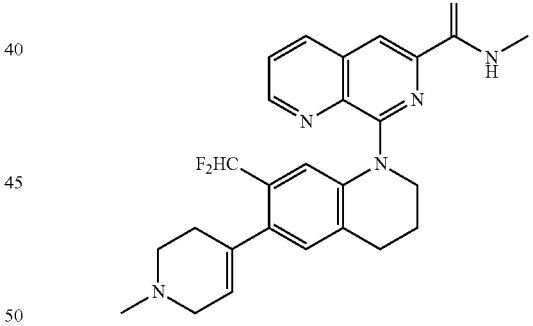

Step 1: Preparation of ethyl 8-[7-difluoromethyl-6-(1-methyl-1,2,3,6-tetrahydropyridin-4-yl)-3,4-dihydro-2H-quinolin-1-yl]-[1,7]naphthyridine-6-carboxylate Ethyl 8-[7-difluoromethyl-6-(1,2,3,6-tetrahydropyridin-4-yl)-3,4-dihydro-2H-quinolin-1-yl]-[1,7]naphthyridine-6-carboxylate (0.4 g, 887.9 μmol, 1.0 eq.) was dissolved in dichloromethane (50 mL), a solution of formaldehyde (2 mL, 887.9 μmol, 1.0 eq.) in water was added at room temperature and reacted for 1 h, and STAB (376.4 mg, 1.8 mmol, 2.0 eq.) was added and reacted at room temperature for 20 h. The reaction system was diluted with 50 mL of saturated sodium carbonate aqueous solution and extracted with dichloromethane, and the organic phase was washed with saturated brine, dried with anhydrous magnesium sulfate, filtered and concentrated to give the title compound as a yellow solid (0.4 g, 97%). MS (m/z)=479.23 [M+1-1]$^+$.

Step 2: Preparation of 8-[7-difluoromethyl-6-(1-methyl-1,2,3,6-tetrahydropyridin-4-yl)-3,4-dihydro-2H-quinolin-1-yl]-[1,7]naphthyridine-6-carboxylic acid methylamide Ethyl 8-[7-difluoromethyl-6-(1-methyl-1,2,3,6-tetrahydropyridin-4-yl)-3,4-dihydro-2H-quinolin-1-yl]-[1,7]naphthyridine-6-carboxylate (216.9 mg, 467.0 μmol, 1.0 eq.) was dissolved in a solution of methylamine in ethanol (10 mL) and reacted at 80° C. for 2 h. The reaction liquid was rotary evaporated to dryness, and the crude product was purified on a thick preparation plate (CH$_2$Cl$_2$/MeOH=20:1) to give the title compound as a yellow solid (200.0 mg, yield of 92%). $^1$H NMR (400 MHz, DMSO) δ 8.83 (dd, 1H), 8.58 (dd, 1H), 8.42 (d, 1H), 8.28 (s, 1H), 7.78 (dd, 1H), 7.07 (s, 1H), 6.74 (t, 1H), 6.58 (s, 1H), 5.58 (s, 1H), 4.14-4.11 (m, 2H), 3.00-2.90 (m, 7H), 2.58-2.53 (m, 2H), 2.35 (s, 2H), 2.30 (s, 3H), 2.12-2.01 (m, 2H). MS (m/z)=464.23 [M+H]$^+$.

Example 45: 8-[7-difluoromethyl-6-(1-methanesulfonyl-1,2,3,6-tetrahydropyridin-4-yl)-3,4-dihydro-2H-quinolin-1-yl]-[1,7]naphthyridine-6-carboxylic acid methylamide

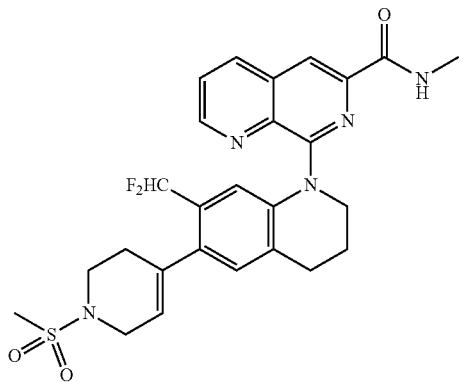

Step 1: Preparation of ethyl 8-[7-difluoromethyl-6-(1-methanesulfonyl-1,2,3,6-tetrahydropyridin-4-yl)-3,4-dihydro-2H-quinolin-1-yl]-[1,7]naphthyridine-6-carboxylate Ethyl 8-[7-difluoromethyl-6-(1,2,3,6-tetrahydropyridin-4-yl)-3,4-dihydro-2H-quinolin-1-yl]-[1,7]naphthyridine-6-carboxylate (step 3 of PB24-079-01) (0.2 g, 430.6 μmol, 1.0 eq.) and trimethylamine (43.6 mg, 430.6 μmol, 1.0 eq.) were dissolved in dichloromethane (20 mL), a solution of methanesulfonyl chloride (49.3 mg, 430.6 μmol, 1.0 eq.) in dichloromethane was added to the reaction mixture, and the reaction mixture was reacted at room temperature for 1 h. The reaction system was diluted with 50 mL of water and extracted with dichloromethane, and the organic phase was washed with saturated brine, dried with anhydrous magnesium sulfate, filtered and concentrated to give the title compound as a yellow solid (150.0 mg, 64%). MS (m/z)=543.19 [M+H]$^+$.

Step 2: Preparation of 8-[7-difluoromethyl-6-(1-methanesulfonyl-1,2,3,6-tetrahydropyridin-4-yl)-3,4-dihydro-2H-quinolin-1-yl]-[1,7]naphthyridine-6-carboxylic acid methylamide Ethyl 8-[7-difluoromethyl-6-(1-methanesulfonyl-1,2,3,6-tetrahydropyridin-4-yl)-3,4-dihydro-2H-quinolin-1-yl]-[1, 7]naphthyridine-6-carboxylate (150.0 mg, 276.5 μmol, 1.0 eq.) was dissolved in a solution of methylamine in ethanol (10 mL) and reacted at 80° C. for 2 h. The reaction liquid was rotary evaporated to dryness, and the crude product was purified on a thick preparation plate (CH$_2$Cl$_2$/MeOH=20:1) to give the title compound as a yellow solid (130.0 mg, yield of 89%). $^1$H NMR (400 MHz, DMSO) δ 8.83 (dd, 1H), 8.60 (dd, 1H), 8.45 (d, 1H), 8.29 (s, 1H), 7.78 (dd, 1H), 7.12 (s, 1H), 6.74 (t, 1H), 6.58 (s, 1H), 5.58 (s, 1H), 4.16-4.07 (m, 2H), 3.83 (d, 2H), 3.39 (t, 2H), 3.00-2.90 (m, 5H), 2.89-2.82 (m, 3H), 2.47 (s, 1H), 2.12-2.01 (m, 2H). MS (m/z)=528.19 [M+1-1]$^+$.

Example 46: 8-[6-(1-acetylpiperidin-4-yl)-7-difluoromethyl-3,4-dihydro-2H-quinolin-1-yl]-[1,7]naphthyridin e-6-carboxylic acid methylamide

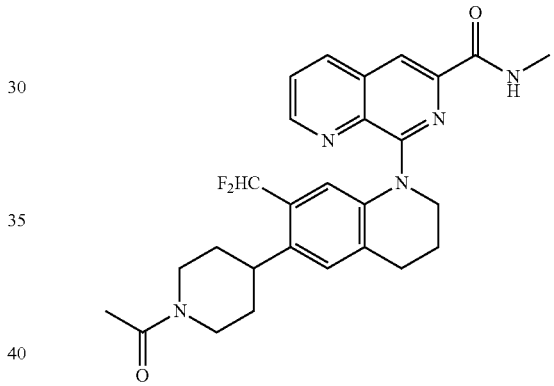

Step 1: Preparation of ter t-butyl 4-(7-difluoromethyl-1,2,3,4-tetrahydroquinolin-6-yl)-piperidine-1-carboxylate Tert-butyl 4-(7-difluoromethyl-1,2,3,4-tetrahy dro quinolin-6-yl)-3,6-dihydro-2H-pyridine-1-carboxylate (200.0 mg, 548.8 μmol, 1.0 eq.) was dissolved in methanol (20 mL), 5% Pd/C (10.0 mg) was added, and the reaction mixture was purged with H$_2$ three times and reacted at room temperature for 16 h. The reaction liquid was filtered by suction, and the filtrate was rotary evaporated to dryness to give the title compound as an off-white solid (0.2 g, quantitative yield). MS (m/z)=367.22 [M+1-1]$^+$.

Step 2: Preparation of ethyl 8-[6-(1-tert-butoxycarbonylpiperidin-4-yl)-7-difluoromethyl-3,4-dihydro-2H-quinolin-1-yl]-[1, 7]naphthyridine-6-carboxylate Ethyl 8-chloro-1,7-naphthyridine-carboxylate (Intermediate IV) (129.2 mg, 545.8 mmol, 1.0 eq.), tert-butyl 4-(7-difluoromethyl-1,2,3,4-tetrahydroquinolin-6-yl)-piperidine-1-carboxylate (0.2 g, 545.8 mmol, 1.0 eq.), Pd(OAc)$_2$ (12.2 mg, 54.6 μmol, 0.1 eq.), BINAP (68.0 mg, 109.2 μmol, 0.2 eq.) and Cs$_2$CO$_3$ (213.4 mg, 3.4 mmol, 1.2 eq.) were dissolved in toluene (20 mL) and reacted at 90° C. for 3 h under nitrogen protection. The reaction liquid was directly rotary evaporated to dryness, and the crude product was purified by column chromatography (PE/EtOAc=2:1-0:1, gradient elution) to give the title compound as a yellow solid (150.0 mg, yield of 50%). MS (m/z)=567.28 [M+H]$^+$.

Step 3: Preparation of ethyl 8-(7-difluoromethyl-6-piperidin-4-yl-3,4-dihydro-2H-quinolin-1-yl)-[1,7]naphthyridine-carboxy late Ethyl 8-[6-(1-tert-butoxycarbonylpiperidin-4-yl)-7-difluoromethyl-3,4-dihydro-2H-quinolin-1-yl]-[1, 7]naphthyridine-6-carboxylate (150.0 mg, 264.7 µmol, 1.0 eq.) was dissolved in 20 mL of dioxane hydrochloride solution (4.0 M), and the reaction mixture was stirred at room temperature for 12 h. After the reaction was completed, the reaction liquid was directly concentrated, 30 mL of saturated sodium bicarbonate and 30 mL of dichloromethane were added to the concentrated reaction liquid, and the organic phase was washed with saturated brine, dried with anhydrous magnesium sulfate, filtered and concentrated to give the title compound as a yellow solid (0.1 g, 81%). MS (m/z)=467.23 [M+1-1]$^+$.

Step 4: Preparation of ethyl 8-[6-(1-acetylpiperidin-4-yl)-7-difluoromethyl-3,4-dihydro-2H-quinolin-1-yl]-[1,7]naphthyridin e-6-carboxylate Ethyl 8-(7-difluoromethyl-6-piperidin-4-yl-3,4-dihydro-2H-quinoline-1-yl)-[1,7]naphthyridine-6-carboxylate (100.4 mg, 215.3 µmol, 1.0 eq.) and trimethylamine (21.2 mg, 215.3 µmol, 1.0 eq.) were dissolved in dichloromethane (20 mL), a solution of acetyl chloride (16.9 mg, 215.3 µmol, 1.0 eq.) in dichloromethane was added to the reaction mixture, and the reaction mixture was reacted at room temperature for 1 h. The reaction system was diluted with 50 mL of water and extracted with dichloromethane, and the organic phase was washed with saturated brine, dried with anhydrous magnesium sulfate, filtered and concentrated to give the title compound as a yellow solid (50.0 mg, 46%). MS (m/z)=509.24 [M+1-1]$^+$.

Step 5: Preparation of 8-[6-(1-acetylpiperidin-4-yl)-7-difluoromethyl-3,4-dihydro-2H-quinolin-1-yl]-[1, 7]naphthyridin e-6-carboxylic acid methylamide Ethyl 8-[6-(1-acetylpiperidin-4-yl)-7-difluoromethyl-3,4-dihydro-2H-quinolin-1-yl]-[1,7]naphthyridin e-6-carboxylate (50.0 mg, 98.3 µmol, 1.0 eq.) was dissolved in a solution of methylamine in ethanol (10 mL) and reacted at 80° C. for 2 h. The reaction liquid was rotary evaporated to dryness, and the crude product was purified on a thick preparation plate (CH$_2$Cl$_2$/MeOH=20:1) to give the title compound as a yellow solid (20.0 mg, yield of 41%). $^1$H NMR (400 MHz, DMSO) δ 8.81 (dd, 1H), 8.58 (dd, 1H), 8.40 (d, 1H), 8.25 (s, 1H), 7.77 (dd, 1H), 7.20 (s, 1H), 6.93 (t, 1H), 6.57 (s, 1H), 4.54 (d, 1H), 4.16-4.04 (m, 2H), 3.93 (d, 1H), 3.15-2.96 (m, 2H), 2.91 (t, 2H), 2.86 (d, 3H), 2.62-2.53 (m, 1H), 2.09-1.98 (m, 4H), 1.68 (m, 3H), 1.51 (dt, 1H). MS (m/z)=494.24 [M+14]$^+$.

Examples 47 to 52 were prepared in a method similar to the method in Example 46.

| Example No. | Structure | Chemical name | $^1$HNMR | MS (m/z) [M + H]$^+$ |
|---|---|---|---|---|
| Example 47 | | 5-[6-(1-acetylpiperidin-4-yl)-7-difluoromethyl-3,4-dihydro-2H-quinolin-1-yl]-[1,6]naphthyridine-7-carboxylic acid methylamide | $^1$H NMR (400 MHz, DMSO) δ 9.13 (dd, 1H), 8.63 (d, 1H), 8.24 (d, 1H), 8.16 (d, 1H), 7.58 (dd, 1H), 7.28 (s, 1H), 6.89 (t, 1H), 6.34 (s, 1H), 4.54 (d, 1H), 3.94 (dd, 3H), 3.14-3.04 (m, 1H), 2.96 (t, 3H), 2.88 (d, 3H), 2.57 (s, 1H), 2.12 (dd, 2H), 2.04 (s, 3H), 1.65 (d, 3H), 1.51 (d, 1H). | 494.24 |

| Example No. | Structure | Chemical name | ¹HNMR | MS (m/z) [M + H]⁺ |
|---|---|---|---|---|
| Example 48 | | 1-[6-(1-acetylpiperidin-4-yl)-7-difluoromethyl-3,4-dihydro-2H-quinolin-1-yl]-[2,6]naphthyridine-3-carboxylic acid methylamide | ¹H NMR (400 MHz, DMSO) δ 9.60 (d, 1H), 8.59 (dd, 2H), 8.45 (s, 1H), 7.47 (d, 1H), 7.30 (s, 1H), 6.91 (t, 1H), 6.39 (s, 1H), 4.54 (d, 1H), 4.07-3.84 (m, 3H), 3.03 (ddd, 4H), 2.88 (d, 3H), 2.56 (d, 1H), 2.12 (dd, 2H), 2.05 (s, 3H), 1.67 (d, 3H), 1.51 (d, 1H). | 494.24 |
| Example 49 | | 1-[6-(1-acetylpiperidin-4-yl)-7-difluoromethyl-3,4-dihydro-2H-quinolin-1-yl]-[2,7]naphthyridine-3-carboxylic acid methylamide | ¹H NMR (400 MHz, DMSO) δ 9.09 (s, 1H), 8.70 (d, 1H), 8.62 (d, 1H), 8.25 (s, 1H), 8.05 (d, 1H), 7.32 (s, 1H), 6.93 (t, 1H), 6.51 (s, 1H), 4.54 (d, 1H), 4.06-3.97 (m, 2H), 3.92 (d, 1H), 3.00 (dd, 4H), 2.88 (d, 3H), 2.58 (d, 1H), 2.17-2.08 (m, 2H), 2.05 (s, 3H), 1.69 (s, 3H), 1.52 (d, 1H). | 494.24 |
| Example 50 | | 8-[6-(1-acetylpiperidin-4-yl)-7-difluoromethyl-3,4-dihydro-2H-quinolin-1-yl]-3-chloro-[1,7]naphthyridine-6-carboxylic acid methylamide | ¹H NMR (400 MHz, DMSO) δ 8.83-8.73 (m, 2H), 8.42 (d, 1H), 8.21 (s, 1H), 7.21 (s, 1H), 6.94 (t, 1H), 6.62 (s, 1H), 4.55 (d, 1H), 4.13-4.05 (m, 2H), 3.93 (d, 1H), 3.19-2.98 (m, 2H), 2.95-2.79 (m, 5H), 2.57 (d, 1H), 2.11-1.97 (m, 5H), 1.68 (d, 3H), 1.52 (dd, 1H). | 528.20 |
| Example 51 | | 8-[6-(1-acetylpiperidin-4-yl)-7-difluoromethyl-3,4-dihydro-2H-quinolin-1-yl]-3-methoxy-[1,7]naphthyridine-6-carboxylic acid methylamide | ¹H NMR (400 MHz, DMSO) δ 8.53 (d, 1H), 8.39 (d, 1H), 8.19 (s, 1H), 7.98 (d, 1H), 7.17 (s, 1H), 6.94 (t, 1H), 6.52 (s, 1H), 4.54 (d, 1H), 4.09-4.02 (m, 2H), 3.97 (s, 3H), 3.92 (d, 1H), 3.15-3.05 (m, 1H), 3.00 (s, 1H), 2.89 (t, 2H), 2.85 (d, 3H), 2.57 (d, 1H), 2.10-1.98 (m, 5H), 1.67 (d, 3H), 1.50 (dt, 1H). | 524.25 |

| Example No. | Structure | Chemical name | ¹HNMR | MS (m/z) [M + H]⁺ |
|---|---|---|---|---|
| Example 52 | | 8-[6-(1-acetylpiperidin-4-yl)-7-difluoromethyl-3,4-dihydro-2H-quinolin-1-yl]-3-fluoro-[1,7]naphthyridine-6-carboxylic acid methylamide | ¹H NMR (400 MHz, DMSO) δ 8.84 (d, 1H), 8.47 (dd, 1H), 8.42 (d, 1H), 8.25 (s, 1H), 7.21 (s, 1H), 6.93 (t, 1H), 6.59 (s, 1H), 4.55 (d, 1H), 4.10 (dd, 2H), 3.93 (d, 1H), 3.14-2.98 (m, 2H), 2.94-2.82 (m, 5H), 2.57 (d, 1H), 2.10-1.99 (m, 5H), 1.68 (d, 3H), 1.52 (dd, 1H). | 512.23 |

Example 53: 8-[6-(1-azetidin-3-yl-1H-pyrazol-4-yl)-7-difluoromethyl-3,4-dihydro-2H-quinolin-1-yl]-[1,7]naphthyridine-6-carboxylic acid methylamide

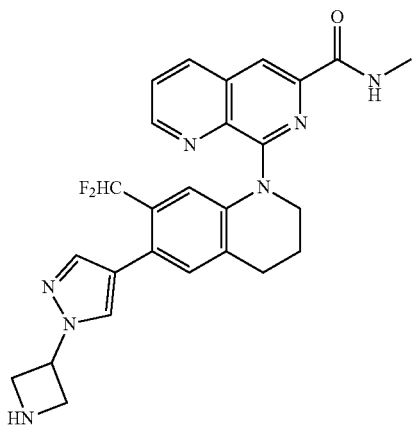 [SMILES: CNC(=O)c1cc2cccnc2c(N2CCCc3cc(-c4cnn(C5CNC5)c4)c(C(F)F)cc32)n1]

Step 1: Preparation of ter t-butyl 3-[4-(7-difluoromethyl-1,2,3,4-tetrahydroquinolin-6-yl)-pyrazol-1-yl]-azetidin-1-carboxylate 1-(1-Boc-3-azetidinyl)pyrazole-4-boronic acid pinacol ester (799.5 mg, 2.3 mmol, 1.2 eq.), 6-bromo-7-difluoromethyl-1,2,3,4-tetrahydroquinoline (0.5 g, 1.9 mmol, 1.0 eq.), Pd(dppf)Cl₂ (139.6 mg, 190.8 μmol, 0.1 eq.) and K₂CO₃ (791.0 mg, 5.7 mmol, 3.0 eq.) were dissolved in 1,4-dioxane (20 mL) and water (4 mL) and reacted at 110° C. for 14 h under nitrogen protection. The reaction liquid was filtered by suction, the filtrate was rotary evaporated to dryness, and the crude product was purified by column chromatography (PE/EtOAc=3:1-1:1, gradient elution) to give the title compound as a yellow solid (0.7 g, yield of 91%). MS (m/z)=405.21 [M+1-1]⁺.

Step 2: Preparation of ethyl 8-{6-[1-(1-tert-butoxy carbonyl-azetidin-3-yl)-1H-pyrazol-4-yl]-7-difluoromethyl-3,4-dihydro-2H-quinolin-1-yl]-[1,7]naphthyridine-6-carboxylate Ethyl 8-chloro-1,7-naphthyridine-carboxylate (Intermediate IV) (409.6 mg, 1.7 mmol, 1.2 eq.), tert-butyl 3-[4-(7-difluoromethyl-1,2,3,4-tetrahydroquinolin-6-yl)-pyrazol-1-yl]-azetidin-1-carboxylate (0.7 g, 1.7 mmol, 1.0 eq.), Pd(OAc)₂ (38.9 mg, 173.1 μmol, 0.1 eq.), BINAP (215.5 mg, 346.1 μmol, 0.2 eq.) and Cs₂CO₃ (676.7 mg, 2.1 mmol, 1.2 eq.) were dissolved in toluene (20 mL) and reacted at 90° C. for 3 h under nitrogen protection. The reaction liquid was directly rotary evaporated to dryness, and the crude product was purified by column chromatography (PE/EtOAc=2:1-0:1, gradient elution) to give the title compound as a yellow solid (0.8 g, yield of 76%). MS (m/z)=605.27 [M+H]⁺.

Step 3: Preparation of ethyl 8-[6-(1-azetidin-3-yl-1H-pyrazol-4-yl)-7-difluoromethyl-3,4-dihydro-2H-quinolin-1-yl]-[1,7]naphthyridine-6-carboxylate Ethyl 8-{6-[1-(1-tert-butoxy carbonyl-azetidin-3-yl)-1H-pyrazol-4-yl]-7-difluoromethyl-3,4-dihydro-2H-quinolin-1-yl]-[1,7]naphthyridine-6-carboxylate (0.8 g, 1.3 mmol, 1.0 eq.) was dissolved in 20 mL of dioxane hydrochloride solution (4.0 M), and the reaction mixture was stirred at room temperature for 12 h. After the reaction was completed, the reaction liquid was directly concentrated, 30 mL of saturated sodium bicarbonate and 30 mL of dichloromethane were added to the concentrated reaction liquid, and the organic phase was washed with saturated brine, dried with anhydrous magnesium sulfate, filtered and concentrated to give the title compound as a yellow solid (0.6 g, 90%). MS (m/z)=505.22 [M+1-1]⁺.

Step 4: Preparation of 8-[6-(1-azetidin-3-yl-1H-pyrazol-4-yl)-7-difluoromethyl-3,4-dihydro-2H-quinolin-1-yl]-[1,7]naphthyridine-6-carboxylic acid methylamide Ethyl 8-[6-(1-azetidin-3-yl-1H-pyrazol-4-yl)-7-difluoromethyl-3,4-dihydro-2H-quinolin-1-yl]-[1,7]naphthyridine-6-carboxylate (0.3 g, 594.6 μmol, 1.0 eq.) was dissolved in a solution of methylamine in ethanol (10 mL) and reacted at 80° C. for 2 h. The reaction liquid was rotary evaporated to dryness, and the crude product was purified on a thick preparation plate (CH$_2$Cl$_2$/MeOH=20:1) to give the title compound as a yellow solid (50.0 mg, yield of 17%). $^1$H NMR (400 MHz, DMSO) δ 8.89-8.77 (m, 1H), 8.65-8.55 (m, 1H), 8.48 (d, 1H), 8.30 (s, 1H), 8.00 (s, 1H), 7.78 (t, 2H), 7.27 (s, 1H), 6.91-6.55 (m, 2H), 5.48-5.33 (m, 1H), 4.35-3.96 (m, 6H), 2.91 (dd, 5H), 2.18-2.02 (m, 2H). MS (m/z)=490.22 [M+H]$^+$.

Example 54: 8-{7-difluoromethyl-6-[1-(1-methyl-azetidin-3-yl)-1H-pyrazol-4-yl]-3,4-dihydro-2H-quinolin-1-yl}-[1,7]naphthyridine-6-carboxylic acid methylamide

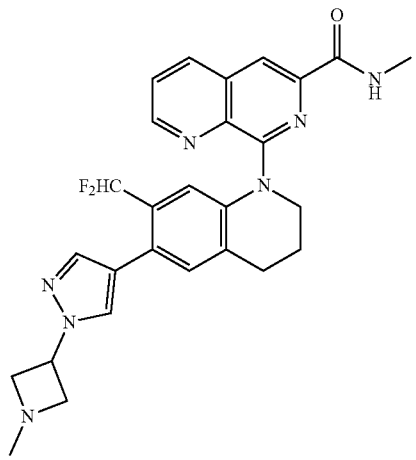

Step 1: Preparation of ethyl 8-{7-difluoromethyl-6-[1-(1-methyl-azetidin-3-yl)-1H-pyrazol-4-yl]-3,4-dihydro-2H-quinolin-1-yl}-[1,7]naphthyridine-6-carboxylate Ethyl 8-[6-(1-azetidin-3-yl-1H-pyrazol-4-yl)-7-difluoromethyl-3,4-dihydro-2H-quinolin-1-yl]-[1,7]naphthyridine-6-carboxylate (0.3 g, 594.6 µmol, 1.0 eq.) was dissolved in dichloromethane (50 mL), a solution of formaldehyde (2 mL, 594.6 µmol, 1.0 eq.) in water was added at room temperature and reacted for 1 h, and STAB (376.4 mg, 1.2 mmol, 2.0 eq.) was added and reacted at room temperature for 20 h. The reaction system was diluted with 50 mL of saturated sodium carbonate aqueous solution and extracted with dichloromethane, and the organic phase was washed with saturated brine, dried with anhydrous magnesium sulfate, filtered and concentrated to give the title compound as a yellow solid (0.3 g, 97%). MS (m/z)=519.23 [M+H]$^+$.

Step 2: Preparation of 8-{7-difluoromethyl-6-[1-(1-methyl-azetidin-3-yl)-1H-pyrazol-4-yl]-3,4-dihydro-2H-quinolin-1-yl}-[1,7]naphthyridine-6-carboxylic acid methylamide Ethyl 8-{7-difluoromethyl-6-[1-(1-methyl-azetidin-3-yl)-1H-pyrazol-4-yl]-3,4-dihydro-2H-quinolin-1-yl}-[1,7]naphthyridine-6-carboxylate (0.3 g, 578.5 µmol, 1.0 eq.) was dissolved in a solution of methylamine in ethanol (10 mL) and reacted at 80° C. for 2 h. The reaction liquid was rotary evaporated to dryness, and the crude product was purified on a thick preparation plate (CH$_2$Cl$_2$/MeOH=20:1) to give the title compound as a yellow solid (0.2 g, yield of 69%). $^1$H NMR (400 MHz, DMSO) δ 8.83 (dd, 1H), 8.59 (dd, 1H), 8.48 (q, 1H), 8.29 (s, 1H), 7.99 (s, 1H), 7.78 (dd, 1H), 7.65 (s, 1H), 7.28 (s, 1H), 6.90-6.56 (m, 2H), 5.00 (p, 1H), 4.20-4.10 (m, 2H), 3.79-3.67 (m, 2H), 3.42 (td, 2H), 2.95 (t, 2H), 2.88 (d, 3H), 2.34 (s, 3H), 2.14-2.03 (m, 2H). MS (m/z)=504.23 [M+1-1]$^+$.

Example 55 8-[6-(1-cyanomethyl-1H-pyrazol-4-yl)-7-difluoromethyl-3,4-dihydro-2H-quinolin-1-yl]-[1,7]naphthyridine-6-carboxylic acid methylamide

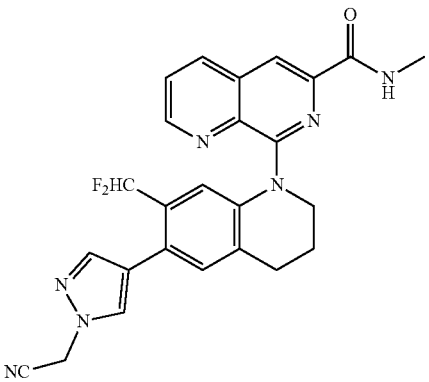 [SMILES: CNC(=O)c1cc2cccnc2c(N2CCCc3cc(-c4cnn(CC#N)c4)c(C(F)F)cc32)n1]

Step 1: Preparation of [4-(7-difluoromethyl-1,2,3,4-tetrahydroquinolin-6-yl)-pyrazol-1-yl]-acetonitrile

[4-(4,4,5,5-tetramethyl-[1,3,2]dioxin-2-yl)-pyrazol-1-yl]-acetonitrile (533.6 mg, 2.3 mmol, 2.8 eq.), 6-bromo-7-difluoromethyl-1,2,3,4-tetrahydroquinoline (0.5 g, 1.9 mmol, 1.0 eq.), Pd(dppf)Cl$_2$ (139.6 mg, 190.8 µmol, 0.1 eq.) and K$_2$CO$_3$ (791.0 mg, 5.7 mmol, 3.0 eq.) were dissolved in 1,4-dioxane (20 mL) and water (4 mL) and reacted at 110° C. for 14 h under nitrogen protection. The reaction liquid was filtered by suction, the filtrate was rotary evaporated to dryness, and the crude product was purified by column chromatography (PE/EtOAc=3:1-1:1, gradient elution) to give the title compound as a yellow solid (0.5 g, yield of 91%). MS (m/z)=289.13 [M+H]$^+$.

Step 2: Preparation of ethyl 8-[6-(1-cyanomethyl-1H-pyrazol-4-yl)-7-difluoromethyl-3,4-dihydro-2H-quinolin-1-yl]-[1,7]naphthyridine-6-carboxylate Ethyl 8-chloro-1,7-naphthyridine-carboxylate (Intermediate IV) (410.4 mg, 1.7 mmol, 1.0 eq.), 4-(7-difluoromethyl-1,2,3,4-tetrahydroquinolin-6-yl)-pyrazol-1-yl]-acetonitrile (0.5 g, 1.7 mmol, 1.0 eq.), Pd(OAc)$_2$ (38.9 mg, 173.4 µmol, 0.1 eq.), BINAP (215.5 mg, 346.9 µmol, 0.2 eq.) and Cs$_2$CO$_3$ (678.1 mg, 2.1 mmol, 1.2 eq.) were dissolved in toluene (20 mL) and reacted at 90° C. for 3 h under nitrogen protection. The reaction liquid was directly rotary evaporated to dryness, and the crude product was purified by column chromatography (PE/EtOAc=2:1-0:1, gradient elution) to give the title compound as a yellow solid (0.3 g, yield of 35%). MS (m/z)=489.18 [M+H]$^+$.

Step 3: Preparation of 8-[6-(1-cyanomethyl-1H-pyrazol-4-yl)-7-di fluoromethyl-3,4-dihydro-2H-quinolin-1-yl]-[1,7]naphthyridine-6-carboxylic acid methylamide Ethyl 8-[6-(1-cyanomethyl-1H-pyrazol-4-yl)-7-difluoromethyl-3,4-dihydro-2H-quinolin-1-yl]-[1,7]naphthyridine-6-carboxylate (0.3 g, 614.1 μmol, 1.0 eq.) was dissolved in a solution of methylamine in ethanol (10 mL) and reacted at 80° C. for 2 h. The reaction liquid was rotary evaporated to dryness, and the crude product was purified on a thick preparation plate (CH$_2$Cl$_2$/MeOH=20:1) to give the title compound as a yellow solid (0.1 g, yield of 34%). $^1$H NMR (400 MHz, DMSO) δ 8.84 (dd, 1H), 8.60 (dd, 1H), 8.49 (d, 1H), 8.30 (s, 1H), 7.97 (s, 1H), 7.82-7.72 (m, 2H), 7.29 (s, 1H), 6.89-6.52 (m, 2H), 5.54 (s, 2H), 4.21-4.08 (m, 2H), 2.96 (t, 2H), 2.88 (d, 3H), 2.16-2.02 (m, 2H). MS (m/z)=478.18 [M+H]$^+$.

Example 56: 1-[7-difluoromethyl-6-(1-methylcarbamoylmethyl-1H-pyrazol-4-yl)-3,4-dihydro-2H-quinolin-1-yl]-isoquinoline-3-carboxylic acid methylamide

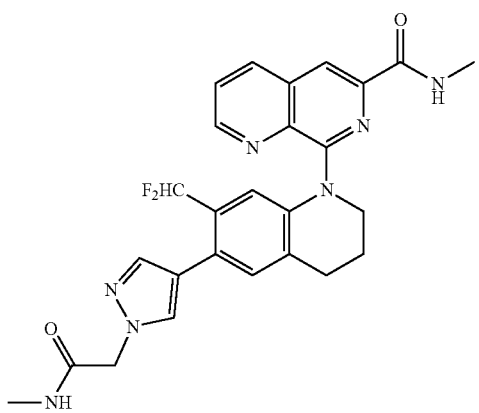

Step 1: Preparation of 1-[7-difluoromethyl-6-(1-methylcarbamoylmethyl-1H-pyrazol-4-yl)-3,4-dihydro-2H-quinolin-1-yl]-isoquinoline-3-carboxylic acid methylamide Ethyl 8-[6-(1-cyanomethyl-1H-pyrazol-4-yl)-7-difluoromethyl-3,4-dihydro-2H-quinolin-1-yl]-[1,7]naphthyridine-6-carboxylate (0.1 g, 614.1 μmol, 1.0 eq.) was dissolved in a solution of methylamine in ethanol (10 mL) and reacted at 110° C. for 2 h. The reaction liquid was rotary evaporated to dryness, and the crude product was purified on a thick preparation plate (CH$_2$Cl$_2$/MeOH=20:1) to give the title compound as a yellow solid (0.05 g, yield of 50%). $^1$H NMR (400 MHz, DMSO) δ 8.60 (d, 1H), 8.41 (s, 1H), 8.24 (d, 1H), 7.95 (d, 1H), 7.90-7.78 (m, 3H), 7.69-7.61 (m, 1H), 7.59 (s, 1H), 7.31 (s, 1H), 6.67 (t, 1H), 6.29 (s, 1H), 4.80 (s, 2H), 3.98 (t, 2H), 3.02 (t, 2H), 2.88 (d, 3H), 2.63 (d, 2H), 2.24-2.10 (m, 2H). MS (m/z)=505.22 [M+H]$^+$.

Example 57: 1-[7-chloro-6-(1-methyl-1H-pyrazol-4-yl)-3,4-dihydro-2H-quinolin-1-yl]-isoquinoline-3-carboxylic acid methylamide

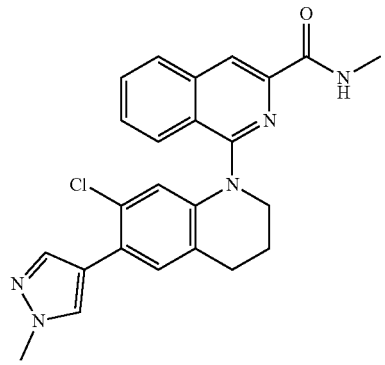

Step 1: Preparation of 6-bromo-7-chloro-1,2,3,4-tetrahydro-quinine 7-chloro-1,2,3,4-tetrahydroquinoline (2.0 g, 12.1 mmol, 1.0 eq.) was dissolved in DMF (30 mL), NBS (2.2 g, 12.5 mmol, 1.0 eq.) was added in batches at 0° C. over 20 min, and the reaction mixture was reacted at 0° C. for 2 h. The reaction liquid was poured into 100 mL of ice water, stirred to precipitate a white solid, filtered by suction and dried to give the title compound as a white solid (2.9 g, quantitative yield). MS (m/z)=245.97 [M+H]$^+$.

Step 2: Preparation of 7-chloro-6-(1-methyl-1H-pyrazol-4-yl)-1,2,3,4-tetrahydroquinoline 1-methylpyrazole-4-boronic acid pinacol ester (2.8 g, 13.3 mmol, 1.1 eq.), 6-bromo-7-chloro-1,2,3,4-tetrahydroquinine (2.9 g, 12.1 mmol, 1.0 eq.), Pd(dppf)Cl$_2$ (887.4 mg, 1.2 mmol, 0.1 eq.) and K$_2$CO$_3$ (5.0 g, 36.4 mmol, 3.0 eq.) were dissolved in 1,4-dioxane (50 mL) and water (10 mL) and reacted at 110° C. for 14 h under nitrogen protection. The reaction liquid was filtered by suction, the filtrate was rotary evaporated to dryness, and the crude product was purified by column chromatography (PE/EtOAc=10:1-3:1, gradient elution) to give the title compound as an off-white solid (2.8 g, yield of 92%). MS (m/z)=248.09 [M+H]$^+$.

Step 3: Preparation of methyl 1-[7-chloro-6-(1-methyl-1H-pyrazol-4-yl)-3,4-dihydro-2H-quinolin-1-yl]-isoquinoline-3-carboxylate Methyl 1-chloroisoquinoline-3-carboxylate (Intermediate I) (280.0 mg, 1.3 mmol, 1.0 eq.), 7-chloro-6-(1-methyl-1H-pyrazol-4-yl)-1,2,3,4-tetrahydroquinoline (344.2 mg, 1.4 mmol, 1.1 eq.), Pd(OAc)$_2$ (56.7 mg, 252.7 μmol, 0.2 eq.), BINAP (157.3 mg, 252.7 μmol, 0.2 eq.) and Cs$_2$CO$_3$ (493.9 mg, 1.5 mmol, 1.2 eq.) were dissolved in toluene (20 mL) and reacted at 90° C. for 3 h under nitrogen protection. The reaction liquid was rotary evaporated to dryness, the crude product was sonicated and filtered with PE/EtOAc=1:1 (15 mL), and the filter cake was dried to give the title compound as a yellow solid (230.0 mg, yield of 42%). MS (m/z)=433.14 [M+H]$^+$.

Step 4: Preparation of 1-[7-chloro-6-(1-methyl-1H-pyrazol-4-yl)-3,4-dihydro-2H-quinolin-1-yl]-isoquinoline-3-carboxylic acid methylamide Methyl 1-[7-chloro-6-(1-methyl-1H-pyrazol-4-yl)-3,4-dihydro-2H-quinolin-1-yl]-isoquinoline-3-carboxylate (230.0 mg, 528.8 μmol, 1.0 eq.) was added to a solution of methylamine in ethanol (10 mL) and reacted at 80° C. for 2 h. The reaction liquid was rotary evaporated to dryness, the crude product was sonicated and filtered with EtOAc (10 mL), and the filter cake was dried to give the title compound as a yellowish solid (180.0 mg, yield of 79%). $^1$H NMR (400 MHz, DMSO) δ 8.62 (s, 1H), 8.42 (s, 1H), 8.23 (d, 1H), 8.00 (s, 1H), 7.88 (d, 2H), 7.85-7.82 (m, 2H), 7.71-7.66 (m, 2H), 7.37 (s, 1H), 6.06 (s, 1H), 3.92-3.86 (m, 5H), 2.97-2.88 (m, 5H), 2.15 (t, 2H). MS (m/z)=432.16 [M+1-1]$^+$.

Example 58: 1-(3-methylcarbamoylisoquinolin-1-yl)-1,2,3,4-tetrahydroquinoline-6-carboxylic acid methylamide

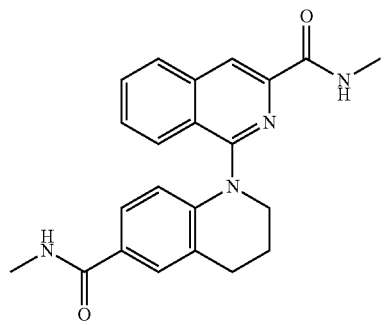

Step 1: Preparation of ethyl 1-(3-methoxycarbonylisoquinolin-1-yl)-1,2,3,4-tetrahydroquinoline-6-carboxylate Methyl 1-chloroisoquinoline-3-carboxylate (Intermediate I) (180.0 mg, 812.1 μmol, 1.0 eq.), ethyl 1,2,3,4-tetrahydroquinoline-6-carboxylate (183.4 mg, 893.3 μmol, 1.1 eq.), Pd(OAc)$_2$ (36.5 mg, 162.4 μmol, 0.2 eq.), BINAP (101.1 mg, 162.4 μmol, 0.2 eq.) and Cs$_2$CO$_3$ (317.5 mg, 974.6 μmol, 1.2 eq.) were dissolved in toluene (20 mL) and reacted at 90° C. for 15 h under nitrogen protection. The reaction liquid was rotary evaporated to dryness, the crude product was sonicated and filtered with PE/EtOAc=1:1 (15 mL), and the filter cake was dried to give the title compound as a yellow solid (88.0 mg, yield of 28%). MS (m/z)=391.17 [M+1-1]$^+$.

Step 2: Preparation of 1-(3-methylcarbamoylisoquinolin-1-yl)-1,2,3,4-tetrahydroquinoline-6-carboxylic acid methylamide Ethyl 1-(3-methoxycarbonylisoquinolin-1-yl)-1,2,3,4-tetrahydroquinoline-6-carboxylate (88.0 mg, 225.4 μmol, 1.0 eq.) was added to a solution of methylamine in ethanol (10 mL) and reacted at 80° C. for 2 h. The reaction liquid was rotary evaporated to dryness to give the title compound as a yellowish solid (15.0 mg, yield of 18%). $^1$H NMR (400 MHz, DMSO) δ 8.64 (s, 1H), 8.43 (s, 1H), 8.23 (d, 1H), 8.11 (s, 1H), 7.81 (d, 2H), 7.70-7.48 (m, 2H), 7.25 (d, 1H), 5.97 (d, 1H), 3.95 (s, 2H), 2.98 (s, 2H), 2.87 (d, 3H), 2.72 (d, 3H), 2.16 (s, 2H). MS (m/z)=375.18 [M+H]$^+$.

Example 59: 1-(6-hydroxymethyl-3,4-dihydro-2H-quinolin-1-yl)-isoquinoline-3-carboxylic acid methylamide

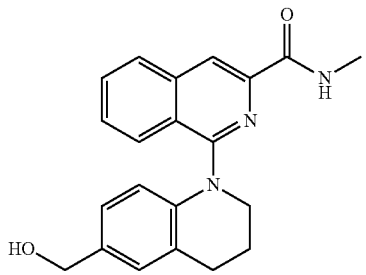 [SMILES: CNC(=O)c1cc2ccccc2c(N2CCCc3cc(CO)ccc32)n1]

Step 1: Preparation of 1-(6-hydroxymethyl-3,4-dihydro-2H-quinolin-1-yl)-isoquinoline-3-carboxylic acid methylamide Ethyl 1-(3-methylcarbamoylisoquinolin-1-yl)-1,2,3,4-tetrahydro quinoline-6-carboxylate (65.0 mg, 166.9 Imo', 1.0 eq.) was added to THF (10 mL), LiAlH$_4$ (25.3 mg, 667.6 μmol, 4.0 eq.) was added in batches at room temperature, and the reaction mixture was reacted at room temperature for 2 h. The reaction liquid was quenched by dropwise adding 0.1 mL of water in ice bath and then filtered, the filter cake was washed by THF, the filtrate was rotary evaporated to dryness to give the crude product, the crude product was sonicated and filtered with PE/EtOAc=5:1 (5 mL), and the filter cake was dried to give the title compound as an off-white solid (46.0 mg, yield of 79%). $^1$H NMR (400 MHz, DMSO) δ 8.59 (d, 1H), 8.30 (s, 1H), 8.16 (d, 1H), 7.76 (d, 2H), 7.54 (t, 1H), 7.12 (s, 1H), 6.73 (d, 1H), 6.02 (d, 1H), 4.98 (t, 1H), 4.35 (d, 2H), 3.94 (t, 2H), 2.92 (t, 2H), 2.88 (d, 3H), 2.23-2.03 (m, 2H). MS (m/z)=348.17 [M+H]$^+$.

Example 60: 1-[7-(1-methyl-1H-pyrazol-4-yl)-2,3-dihydro-benzo[1,4]oxazin-4-yl]-isoquinoline-3-carboxylic acid methylamide

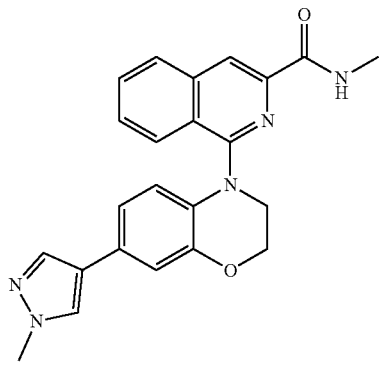 [SMILES: CNC(=O)c1cc2ccccc2c(N2CCOc3cc(-c4cnn(C)c4)ccc32)n1]

Step 1: Preparation of 7-(1-methyl-1H-pyrazol-4-yl)-3,4-dihydro-2H-benzo[1,4]oxazine 1-methylpyrazole-4-boronic acid pinacol ester (1.2 g, 5.6 mmol, 1.2 eq.), 7-bromo-3,4-dihydro-2H-benzo[1,4]oxazine (1.0 g, 4.7 mmol, 1.0 eq.), Pd(dppf)Cl$_2$ (341.8 mg, 467.2 jamol, 0.1 eq.) and K$_2$CO$_3$ (1.9 g, 14.0 mmol, 3.0 eq.) were dissolved in 1,4-dioxane (25 mL) and water (5 mL) and reacted at 110° C. for 14 h under nitrogen protection. The reaction liquid was filtered by suction, the filtrate was rotary evaporated to dryness, and the crude product was purified by column chromatography (PE/EtOAc=5:1-2:1, gradient elution) to give the title compound as a yellowish solid (0.8 g, yield of 80%). MS (m/z)=216.11 [M+14]$^+$.

Step 2: Preparation of methyl 1-[7-(1-methyl-1H-pyrazol-4-yl)-2,3-dihydro-benzo[1,4]oxazin-4-yl]-isoquinoline-3-carboxylate Methyl 1-chloroisoquinoline-3-carboxylate (Intermediate I) (205.9 mg, 929.1 µmol, 1.0 eq.), 7-(1-methyl-1H-pyrazol-4-yl)-3,4-dihydro-2H-benzo[1,4]oxazine (200.0 mg, 929.1 µmol, 1.0 eq.), Pd(OAc)$_2$ (20.9 mg, 92.9 µmol, 0.2 eq.), BINAP (115.7 mg, 185.8 µmol, 0.2 eq.) and Cs$_2$CO$_3$ (363.3 mg, 111.0 µmol, 1.2 eq.) were dissolved in toluene (10 mL) and reacted at 95° C. for 15 h under nitrogen protection. The reaction liquid was rotary evaporated to dryness, and the crude product was purified by column chromatography (PE/EtOAc=1:5-1:9, gradient elution) to give the title compound as a yellow solid (320.0 mg, yield of 86%). MS (m/z)=401.16 [M+H]$^+$.

Step 3: Preparation of 1-[7-(1-methyl-1H-pyrazol-4-yl)-2,3-dihydro-benzo[1,4]oxazin-4-yl]-isoquinoline-3-carboxylic acid methylamide Methyl 1-[7-(1-methyl-1H-pyrazol-4-yl]-2,3-dihydro-benzo[1,4]oxazin-4-yl]-isoquinoline-3-carboxylate (320.0 mg, 799.1 µmol, 1.0 eq.) was added to a solution of methylamine in ethanol (10 mL) and reacted at 80° C. for 2 h. The reaction liquid was rotary evaporated to dryness, and the crude product was purified on a thick preparation plate (CH$_2$Cl$_2$/MeOH=20:1) to give the title compound as a yellow solid (210.0 mg, yield of 66%). $^1$H NMR (400 MHz, DMSO) δ 8.59 (q, 1H), 8.34 (s, 1H), 8.21 (d, 1H), 8.07 (d, 1H), 7.99 (s, 1H), 7.87-7.77 (m, 1H), 7.73 (d, 1H), 7.69-7.61 (m, 1H), 7.11 (d, 1H), 6.76 (dd, 1H), 6.20 (d, 1H), 4.58-4.50 (m, 2H), 4.05 (dd, 2H), 3.82 (s, 3H), 2.88 (d, \3H). MS (m/z)=400.18 [M+H]$^+$.

Example 61: 1-[7-difluoromethyl-6-(1-methyl-1H-pyrazol-4-yl)-3,4-dihydro-2H-quinolin-1-yl]-6,7-dihydro-5H-[2]pyrazine-3-carboxylic acid methylamide

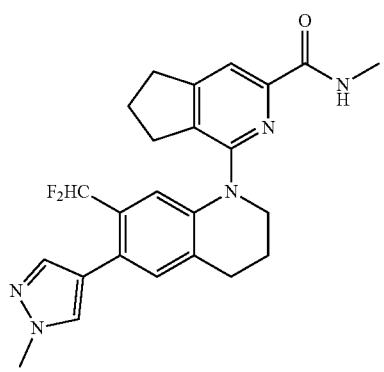 [SMILES: CNC(=O)c1cc2c(c(N3CCCc4cc(-c5cnn(C)c5)c(C(F)F)cc43)n1)CCC2]

Step 1: Preparation of ethyl 6,7-dihydro-5H-[2]pyridine-3-carboxylate 1,6-heptadiyne (3.7 g, 40.2 mmol, 1.0 eq.) was dissolved in 1,2-dichloromethane (50 mL), ethyl cyanoformate (6.0 g, 60.2 mmol, 1.5 eq.) and chloro(1,5-cyclooctadiene)(pentamethylcyclopentadienyl)ruthenium (305.1 mg, 803.1 µmol, 0.02 eq.) were added, and the reaction mixture was reacted at 60° C. for 2 h under N$_2$ protection. The solvent was removed by rotary evaporation, 50 mL of water and 50 mL of EtOAc were added to the residue, the organic phase was washed with saturated brine, dried with anhydrous magnesium sulfate, filtered and concentrated, and the crude product was purified by column chromatography (PE/EtOAc=5:1-1:1, gradient elution) to give the title compound as a yellow solid (730.0 mg, yield of 10%). MS (m/z)=192.10 [M+1-1]$^+$.

Step 2: Preparation of ethyl 2-oxy-6,7-dihydro-5H-[2]pyridine-3-carboxylate

Ethyl 6,7-dihydro-5H-[2]pyridine-3-carboxylate (730.0 mg, 3.8 mmol, 1.0 eq.) was dissolved in dichloromethane (15 mL), and m-CPBA (1.3 g, 7.6 mmol, 2.0 eq.) was added and reacted at room temperature for 12 h. Saturated Na$_2$S$_2$O$_3$ (50 mL) was added to the reaction system, the reaction system was extracted with dichloromethane and washed with saturated Na$_2$CO$_3$, and the organic phase was washed with saturated brine, dried with anhydrous magnesium sulfate, filtered and concentrated to give the title compound as a brown oil (750.0 mg, 95%). MS (m/z)=208.10 [M+1-1]$^+$.

Step 3: Preparation of ethyl 1-chloro-6,7-dihydro-5H-[2]pyridine-3-carboxylate

A mixture of ethyl 2-oxy-6,7-dihydro-5H-[2]pyridine-3-carboxylate (750.0 mg, 3.6 mmol, 1.0 eq.) and POCl$_3$ (8 mL) was heated at 50° C. for 12 h. The reaction mixture was placed in an ice bath, and ice water and NaHCO$_3$ solid were added successively with stirring until no bubbles emerged violently while ensuring that the PH of the mixture was about 8. The reaction mixture was extracted with CH$_2$Cl$_2$, and the organic phase was washed with saturated brine, dried with anhydrous magnesium sulfate, filtered and concentrated to give the title compound as an off-white solid (140.0 mg, 17%), which was used in the next step without further purification. MS (m/z)=226.06 [M+1-1]$^+$.

Step 4: Preparation of ethyl 1-[7-difluoromethyl-6-(1-methyl-1H-pyrazol-4-yl)-3,4-dihydro-2H-quinolin-1-yl]-6,7-dihydro-5H-[2]pyrazine-3-carboxylate Ethyl 1-chloro-6,7-dihydro-5H-[2]pyridine-3-carboxylate (140.0 mg, 620.4 µmol, 1.0 eq.), 7-difluoromethyl-6-(1-methyl-1H-pyrazol-4-yl)-1,2,3,4-tetrahydroquinoline (Intermediate IX) (163.3 mg, 620.4 µmol, 1.0 eq.), Pd(OAc)$_2$ (13.9 mg, 62.0 µmol, 0.1 eq.), BINAP (77.3 mg, 124.1 µmol, 0.2 eq.) and Cs$_2$CO$_3$ (242.6 mg, 744.5 µmol, 1.2 eq.) were dissolved in toluene (15 mL) and reacted at 95° C. for 15 h under nitrogen protection. The reaction liquid was rotary evaporated to dryness, and the crude product was purified by column chromatography (PE/EtOAc=1:5-1:9, gradient elution) to give the title compound as a yellow solid (160.0 mg, yield of 57%). MS (m/z)=453.21 [M+H]$^+$.

Step 5: Preparation of 1-[7-difluoromethyl-6-(1-methyl-1H-pyrazol-4-yl)-3,4-dihydro-2H-quinolin-1-yl]-6,7-dihydro-5H-[2]pyrazine-3-carboxylic acid methylamide Ethyl 1-[7-difluoromethyl-6-(1-methyl-1H-pyrazol-4-yl)-3,4-dihydro-2H-quinolin-1-yl]-6,7-dihydro-5H-[2]pyrazine-3-carboxylate (160.0 mg, 353.6 μmol, 1.0 eq.) was added to a solution of methylamine in ethanol (10 mL) and reacted at 80° C. for 2 h. The reaction liquid was rotary evaporated to dryness, and the crude product was purified on a thick preparation plate ($CH_2Cl_2$/MeOH=20:1) to give the title compound as a yellow solid (100.0 mg, yield of 65%). $^1$H NMR (400 MHz, DMSO) δ 8.44 (q, 1H), 7.82 (s, 1H), 7.71 (s, 1H), 7.56 (s, 1H), 7.23 (s, 1H), 6.85 (t, 1H), 6.57 (s, 1H), 3.97-3.77 (m, 5H), 2.95 (t, 2H), 2.89-2.73 (m, 5H), 2.39 (t, 2H), 2.08-1.86 (m, 4H). MS (m/z)=438.21 [M+H]$^+$.

Example 62 was prepared in a method similar to the method in Example 61.

room temperature for 12 h. 0.1 M NaOH aqueous solution (10 mL) was added to the reaction system to adjust PH to be about 8, the reaction system was extracted with $CH_2Cl_2$, the organic phase was washed with saturated brine, dried with anhydrous magnesium sulfate, filtered and concentrated, and the crude product was purified by column chromatography (PE/EtOAc=3:1-0:1, gradient elution) to give the title compound as a white solid (500.0 mg, 93%). MS (m/z)=212.01 [M+H]$^+$.

Step 2: Preparation of methyl 7-[7-difluoromethyl-6-(1-methyl-1H-pyrazol-4-yl)-3,4-dihydro-2H-quinolin-1-yl]-furan[2,3-c]pyridine-5-carboxylate Methyl 7-chloro-furan[2,3-c]pyridine-5-carboxylate (167.3 mg, 790.7 μmol, 1.0 eq.), 7-difluoromethyl-6-(1-methyl-1H-pyrazol-4-yl)-1,2,3,4-tetrahydroquinoline (Intermediate IX) (208.2 mg, 790.7 μmol, 1.0 eq.), Pd(OAc)$_2$ (17.8 mg, 79.1 μmol, 0.1 eq.), BINAP (98.5 mg, 158.1 μmol,

| Example No. | Structure | Chemical name | $^1$HNMR | MS (m/z) [M + H]$^+$ |
|---|---|---|---|---|
| Example 62 | 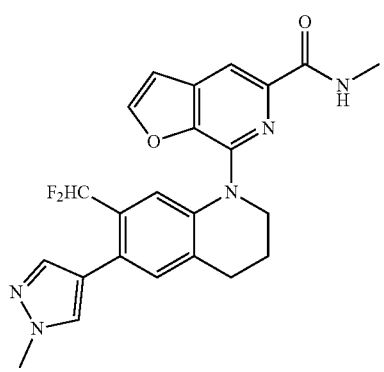 [SMILES: CNC(=O)c1cc2ccoc2c(N2CCCc3cc(-c4cnn(C)c4)c(C(F)F)cc32)n1] | 4-(7-(difluoromethyl)-6-(1-methyl-1H-pyrazol-4-yl)-3,4-dihydroquinolin-1(2H)-yl)-N-methyl-1,3-dihydrofuran[3,4-c]pyridine-6-carboxamide | $^1$H NMR (400 MHz, DMSO) δ 8.51 (d, 1H), 7.85 (s, 1H), 7.68 (s, 1H), 7.60 (s, 1H), 7.28 (s, 1H), 7.07-6.73 (m, 2H), 5.03 (s, 2H), 4.45 (s, 2H), 3.96 (t, 2H), 3.90 (s, 3H), 2.84 (t, 5H), 2.00 (m, 2H). | 440.19 |

Example 63: 7-[7-difluoromethyl-6-(1-methyl-1H-pyrazol-4-yl)-3,4-dihydro-2H-quinolin-1-yl]-furan[2,3-c]pyridine-5-carboxylic acid methylamide 0.2 eq.) and $Cs_2CO_3$ (309.1 mg, 948.8 μmol, 1.2 eq.) were dissolved in toluene (15 mL) and reacted at 95° C. for 15 h under nitrogen protection. The reaction liquid was directly rotary evaporated to dryness, and the crude product was purified by column chromatography (PE/EtOAc=2:1-0:1, gradient elution) to give the title compound as a yellow solid (290.0 mg, yield of 84%). MS (m/z)=439.16 [M+H]$^+$.

Step 3: Preparation of 7-[7-difluoromethyl-6-(1-methyl-1H-pyrazol-4-yl)-3,4-dihydro-2H-quinol in-1-yl]-furan[2,3-c]pyridine-5-carboxylic acid methylamide Methyl 7-[7-difluoromethyl-6-(1-methyl-1H-pyrazol-4-yl)-3,4-dihydro-2H-quinol in-1-yl]-furan[2,3-c]pyridine-5-carboxylate (290.0 mg, 641.0 μmol, 1.0 eq.) was added to a solution of methylamine in ethanol (10 mL) and reacted at 80° C. for 2 h. The reaction liquid was rotary evaporated to dryness, and the crude product was purified on a thick preparation plate ($CH_2Cl_2$/MeOH=20:1) to give the title compound as a yellow solid (220.0 mg, yield of 78%). $^1$H NMR (400 MHz, DMSO) δ 8.39 (q, 1H), 8.13 (d, 1H), 8.05 (s, 1H), 7.85 (s, 1H), 7.60 (s, 1H), 7.29 (s, 1H), 7.15 (d, 1H), 7.01-6.64 (m, 2H), 4.16-4.09 (m, 2H), 3.90 (s, 3H), 2.91 (t, 2H), 2.85 (d, 3H), 2.11-2.01 (m, 2H). MS (m/z)=438.17 [M+H]$^+$.

Step 1: Preparation of methyl 7-chloro-furan[2,3-c]pyridine-5-carboxylate 7-chloro-furan[2,3-c]pyridine-5-carboxylic acid (500.0 mg, 2.5 mmol, 1.0 eq.) was dissolved in $SOCl_2$ (301.1 mg, 2.5 mmol, 1.0 eq.), and the reaction mixture was stirred at

Example 64: 5-[7-difluoromethyl-6-(1-methyl-1H-pyrazol-4-yl)-3,4-dihydro-2H-quinolin-1-yl]-[1,6]naphthyridine-7-carboxylic acid methylamide

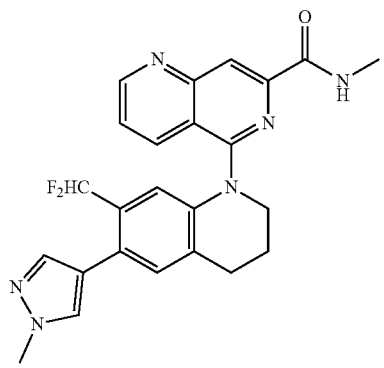 [SMILES: CNC(=O)c1cc2ncccc2c(N2CCCc3cc(-c4cnn(C)c4)c(C(F)F)cc32)n1]

Step 1: Preparation of methyl 2-formylnicotinate

Methyl 2-methylnicotinate (100.0 g, 698.4 mmol, 1.0 eq.) was dissolved in 1,4-dioxane (50 mL), selenium dioxide (77.5 g, 698.4 mmol, 1.0 eq.) was added in batches, and the reaction mixture was reacted at 120° C. for 15 h. After the reaction was cooled to room temperature, the solid was filtered out, and the filtrate was concentrated. 50 mL of water and 50 mL of EtOAc were added to the resulting crude product, and the resulting crude product was extracted EtOAc. The organic phase was washed with saturated brine, dried with anhydrous magnesium sulfate, filtered and concentrated, and the crude product was purified by column chromatography (PE/EtOAc=5:1-1:1, gradient elution) to give the title compound as a brown oil (1.7 g, 31%). MS (m/z)=166.05 [M+1-1]$^+$.

Step 2: Preparation of 6-tert-butyl 7-methyl 5-oxo-5H-[1,6]naphthyridine-6,7-dicarboxylate Methyl 2-formylnicotinate (1.7 g, 10.3 mmol, 1.0 eq.) and DBU (1.6 g, 10.3 mmol, 1.0 eq.) were dissolved in dichloromethane (20 mL), (±)-BOC-alpha-phosphonoglycine trimethyl ester (3.1 g, 10.3 mmol, 1.0 eq.) was added at 0° C., and the reaction mixture was stirred at room temperature for 5 h. The reaction mixture was diluted with 50 mL of water and extracted with dichloromethane, layers were separated, the organic phase was washed with saturated brine, dried with anhydrous magnesium sulfate, filtered and concentrated, and the crude product was purified by column chromatography (PE/EtOAc=3:1-1:1, gradient elution) to give the title compound as a yellowish liquid (1.3 g, yield of 41%). MS (m/z)=305.11 [M+1-1]$^+$.

Step 3: Preparation of methyl 5-oxo-5,6-dihydro-[1,6]naphthyridine-7-carboxylate 6-tert-butyl 7-methyl 5-oxo-5H-[1,6]naphthyridine-6,7-dicarboxylate (1.3 g, 4.3 mmol, 1.0 eq.) was dissolved in 10 mL of dioxane hydrochloride solution (4.0 M), and the reaction mixture was stirred at room temperature for 12 h. After the reaction was completed, the reaction mixture was directly concentrated under vacuum to give the title compound as a yellow solid (0.8 g, 92%). MS (m/z)=205.06 [M+1-1]$^+$.

Step 4: Preparation of methyl 5-chloro-[1,6]naphthyridine-7-carboxylate

A mixture of methyl 5-oxo-5,6-dihydro-[1,6]naphthyridine-7-carboxylate (0.8 g, 3.8 mmol, 1.0 eq.) and POCl$_3$ (20 mL) was heated at 50° C. for 12 h. The reaction mixture was placed in an ice bath, and ice water and NaHCO$_3$ solid were added successively with stirring until no bubbles emerged violently while ensuring that the PH of the mixture was about 8. The reaction mixture was extracted with CH$_2$Cl$_2$, and the organic phase was washed with saturated brine, dried with anhydrous magnesium sulfate, filtered and concentrated to give the title compound as a brown solid (750.0 mg, 86%), which was used in the next step without further purification. MS (m/z)=223.03 [M+H]$^+$.

Step 5: Preparation of methyl 5-[7-difluoromethyl-6-(1-methyl-1H-pyrazol-4-yl)-3,4-dihydro-2H-quinolin-1-yl]-[1,6]naphthyridine-7-carboxylate Methyl 5-chloro-[1,6]naphthyridine-7-carboxylate (180.0 mg, 760.6 µmol, 1.0 eq.), 7-difluoromethyl-6-(1-methyl-1H-pyrazol-4-yl)-1,2,3,4-tetrahydroquinoline (Intermediate IX) (200.3 mg, 760.6 µmol, 1.0 eq.), Pd(OAc)$_2$ (17.1 mg, 76.1 µmol, 0.1 eq.), BINAP (94.7 mg, 152.1 µmol, 0.2 eq.) and Cs$_2$CO$_3$ (297.4 mg, 912.7 µmol, 1.2 eq.) were dissolved in toluene (15 mL) and reacted at 95° C. for 15 h under nitrogen protection. The reaction liquid was rotary evaporated to dryness, and the crude product was purified by column chromatography (PE/EtOAc=2:1-0:1, gradient elution) to give the title compound as a yellow solid (80.0 mg, yield of 23%). MS (m/z)=450.17 [M+H]$^+$.

Step 6: Preparation of 5-[7-difluoromethyl-6-(1-methyl-1H-pyrazol-4-yl)-3,4-dihydro-2H-quinolin-1-yl]-[1,6]naphthyridine-7-carboxylic acid methylamide Methyl 5-[7-difluoromethyl-6-(1-methyl-1H-pyrazol-4-yl)-3,4-dihydro-2H-quinolin-1-yl]-[1,6]naphthyridine-7-carboxylate (80.0 mg, 172.6 µmol, 1.0 eq.) was added to a solution of methylamine in ethanol (10 mL) and reacted at 80° C. for 2 h. The reaction liquid was rotary evaporated to dryness, and the crude product was purified on a thick preparation plate (CH$_2$Cl$_2$/MeOH=20:1) to give the title compound as a yellow solid (60.0 mg, yield of 77%). $^1$H NMR (400 MHz, DMSO) δ 9.14 (dd, 1H), 8.66 (q, 1H), 8.25 (d, 1H), 8.20-8.12 (m, 1H), 7.81 (s, 1H), 7.59 (dd, 1H), 7.56 (s, 1H), 7.32 (s, 1H), 6.69 (t, 1H), 6.45 (s, 1H), 4.03 (dd, 2H), 3.88 (s, 3H), 3.00 (t, 2H), 2.89 (d, 3H), 2.23-2.07 (m, 2H). MS (m/z)=449.19 [M+H]$^+$.

Example 65: 8-[6-difluoromethyl-7-(1-methyl-1H-pyrazol-4-yl)-2,3-dihydro-benzo[1,4]oxazin-4-yl]-[1,7]naphthyridine-6-carboxylic acid methylamide

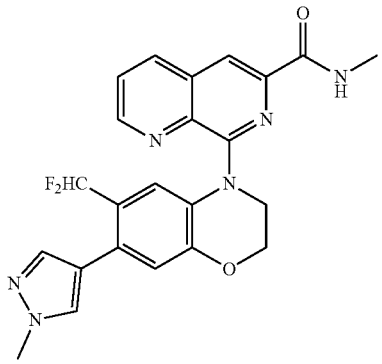

Step 1: Preparation of 2-bromo-4-fluoro-5-nitrobenzaldehyde 2-bromo-4-fluorobenzaldehyde (1.0 g, 4.9 mmol, 1.0 eq.) was dissolved in concentrated sulfuric acid (6 mL), and concentrated nitric acid (0.6 mL 4.9 mmol, 1.0 eq.) was added dropwise at 0° C. and reacted at room temperature for 2 h. 50 mL of water was added to the reaction system, the reaction system was extracted with EtOAc, the organic phase was washed with saturated brine, dried with anhydrous magnesium sulfate, filtered and concentrated, and the crude product was purified by column chromatography (PE/EtOAc=10:1-2:1, gradient elution) to give the title compound as a white solid (1.2 g, quantitative yield). MS (m/z)=247.94 [M+H]$^+$.

Step 2: Preparation of 1-bromo-2-difluoromethyl-5-fluoro-4-nitrobenzene 2-bromo-4-fluoro-5-nitrobenzaldehyde (1.2 g, 4.8 mmol, 1.0 eq.) was dissolved in 100 mL of dichloromethane, DAST (3.1 g, 19.3 mmol, 4.0 eq.) was added dropwise at 0° C., and the reaction mixture was reacted at room temperature for 16 h. The reaction mixture was poured into 50 mL of saturated sodium bicarbonate solution and extracted with dichloromethane, and the organic phase was washed with saturated brine, dried with anhydrous magnesium sulfate, filtered and concentrated. The crude product was purified by column chromatography (PE/EtOAc=10:1-2:1, gradient elution) to give the title compound as a colorless oil (1.3 g, yield of 85%). MS (m/z)=269.94 [M+H]$^+$.

Step 3: Preparation of 1-bromo-5-(2-bromo-ethoxy)-2-difluoromethyl-4-nitrobenzene 1-bromo-2-difluoromethyl-5-fluoro-4-nitrobenzene (1.0 g, 3.7 mmol, 1.0 eq.) was dissolved in THF (10 mL), LDA (0.6 mL, 4.4 mmol, 1.2 eq.) was added dropwise at 0° C. and stirred for 30 min, a solution of 2-bromoethanol (555.4 mg, 4.4 mmol, 1.2 eq.) in THF (10 mL) was added, 50 mL of water was added to the reaction system, the reaction system was extracted with EtOAc, the organic phase was washed with saturated brine, dried with anhydrous magnesium sulfate, filtered and concentrated, and the crude product was purified by column chromatography (PE/EtOAc=5:1-1:1, gradient elution) to give the title compound as a yellowish solid (1.4 g, quantitative yield). MS (m/z)=373.88 [M+H]$^+$.

Step 4: Preparation of 4-bromo-2-(2-bromoethoxy)-5-difluoromethylaniline

HOAc (10 mL) was added to 1-bromo-5-(2-bromo-ethoxy)-2-difluoromethyl-4-nitrobenzene (1.4 g, 3.7 mmol, 1.0 eq.), iron powder (1.0 g, 17.9 mmol, 4.8 eq.) was added, and the reaction mixture was reacted at room temperature for 1 h. The solid was filtered out, 10 mL of water and 1.0 M of NaOH solution were added to adjust PH to be 8, the reaction mixture was extracted with EtOAc, the organic phase was washed with saturated brine, dried with anhydrous magnesium sulfate, filtrated and concentrated to give the title compound as a yellowish oil (1.0 g, 78%). MS (m/z)=343.91 [M+H]$^+$.

Step 5: Preparation of 7-bromo-6-difluoromethyl-3,4-dihydro-2H-benzo[1,4]oxazine 4-bromo-2-(2-bromoethoxy)-5-difluoromethylaniline (1.0 g, 2.9 mmol, 1.0 eq.) was dissolved in DMF (20 mL), K$_2$CO$_3$ (801.3 mg, 5.8 mmol, 2.0 eq.) and NaI (434.5 mg, 2.9 mmol, 1.0 eq.) were added, and the reaction mixture was reacted at 80° C. for 12 h. The solvent was removed by rotary evaporation under reduced pressure, 50 mL of water was added to the residue, the residue was extracted with EtOAc, the organic phase was washed with saturated brine, dried with anhydrous magnesium sulfate, filtered and concentrated, and the crude product was purified by column chromatography (PE/EtOAc=5:1-1:1, gradient elution) to give the title compound as a yellow oil (450.0 mg, 59%). MS (m/z)=263.98 [M+I-1]$^+$.

Step 6: Preparation of 6-difluoromethyl-7-(1-methyl-1H-pyrazol-4-yl)-3,4-dihydro-2H-benzo[1,4]oxazine 1-methylpyrazole-4-boronic acid pinacol ester (425.5 mg, 2.0 mmol, 1.2 eq.), 7-bromo-6-difluoromethyl-3,4-dihydro-2H-benzo[1,4]oxazine (450.0 mg, 1.7 mmol, 1.0 eq.), Pd(dppf)Cl$_2$ (124.7 mg, 170.4 μmol, 0.1 eq.) and K$_2$CO$_3$ (706.6 mg, 5.1 mmol, 3.0 eq.) were dissolved in 1,4-dioxane (25 mL) and water (5 mL) and reacted at 110° C. for 18 h under nitrogen protection. The reaction liquid was filtered by suction, the filtrate was rotary evaporated to dryness, and the crude product was purified by column chromatography (PE/EtOAc=10:1-3:1, gradient elution) to give the title compound as a yellow solid (400.0 mg, yield of 88%). MS (m/z)=266.11 [M+I-1]$^+$.

Step 7: Preparation of ethyl 8-[6-difluoromethyl-7-(1-methyl-1H-pyrazol-4-yl)-2,3-dihydro-benzo[1,4]oxazin-4-yl]-[1,7]naphthyridine-6-carboxylate Ethyl 8-chloro-1,7-naphthyridine-carboxylate (Intermediate IV) (177.9 mg, 799.2 μmol, 1.0 eq.), 6-difluoromethyl-7-(1-methyl-1H-pyrazol-4-yl)-3,4-dihydro-2H-benzo[1,4]oxazine (212.0 mg, 799.2 μmol, 1.0 eq.), Pd(OAc)$_2$ (17.9 mg, 79.9 μmol, 0.1 eq.), BINAP (99.5 mg, 159.8 μmol, 0.2 eq.) and Cs$_2$CO$_3$ (312.5 mg, 959.1 μmol, 1.2 eq.) were dissolved in toluene (20 mL) and reacted at 90° C. for 3 h under nitrogen protection. The reaction liquid was directly rotary evaporated to dryness, and the crude product was purified by column chromatography (PE/EtOAc=2:1-0:1, gradient elution) to give the title compound as a yellow solid (43.0 mg, yield of 12%). MS (m/z)=466.17 [M+H]+.

Step 8: Preparation of 8-[6-difluoromethyl-7-(1-methyl-1H-pyrazol-4-yl)-2,3-dihydro-benzo[1,4]oxazin-4-yl]-[1,7]naphthyridine-6-carboxylic acid methylamide Ethyl 8-[6-difluoromethyl-7-(1-methyl-1H-pyrazol-4-yl)-2,3-dihydro-benzo[1,4]oxazin-4-yl]-[1,7]naphthyridine-6-carboxylate (43.0 mg, 92.4 μmol, 1.0 eq.) was added to a solution of methylamine in ethanol (10 mL) and reacted at 80° C. for 2 h. The reaction liquid was rotary evaporated to dryness, and the crude product was purified on a thick preparation plate (CH$_2$Cl$_2$/MeOH=20:1) to give the title compound as a yellow solid (20.0 mg, yield of 48%). $^1$H NMR (400 MHz, DMSO) δ 8.95 (dd, 1H), 8.62 (dd, 1H), 8.34 (d, 1H), 8.29 (s, 1H), 7.84 (dd, 2H), 7.59 (s, 1H), 7.00 (d, 2H), 6.76 (t, 1H), 4.50-4.40 (m, 2H), 4.37-4.24 (m, 2H), 3.89 (s, 3H), 2.87 (d, 3H). MS (m/z)=451.17 [M+H]+.

Example 66: 8-[1-methyl-3-(1-methy 4-yl)-1H-indazol-5-yl]-[1,7]naphthyridine-6-carboxylic acid methylamide

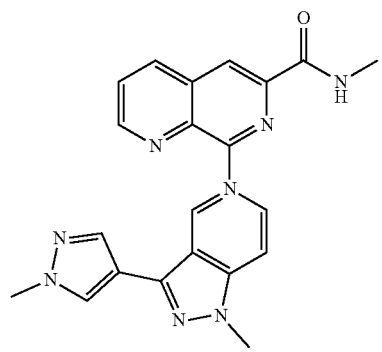

Step 1: Preparation of 5-bromo-3-iodo-1-methyl-1H-indazole 5-bromo-3-iodo-1H-indazole (2.0 g, 6.2 mmol, 1.0 eq.) was dissolved in acetonitrile (30 mL), CH$_3$I (1.3 g, 9.3 mmol, 1.5 eq.) and Cs$_2$CO$_3$ (3.0 g, 9.3 mmol, 1.5 eq.) were added, and the reaction mixture was stirred at room temperature for 1 h. The solid was filtered out, the filtrate was rotary evaporated to dryness, and the crude product was purified by column chromatography (PE/EtOAc=5:1-2:1, gradient elution) to give the title compound as a white solid (1.7 g, yield of 81%). MS (m/z)=336.88

Step 2: Preparation of 5-bromo-1-methyl-3-(1-methyl-1H-pyrazol-4-yl)-1H-indazole 1-methylpyrazole-4-boronic acid pinacol ester (1.2 g, 5.6 mmol, 1.1 eq.), 5-bromo-3-iodo-1-methyl-1H-indazole (1.7 g, 5.1 mmol, 1.0 eq.), Pd(dppf)Cl$_2$ (368.8 mg, 504.5 μmol, 0.1 eq.) and K$_2$CO$_3$ (2.1 g, 15.1 mmol, 3.0 eq.) were dissolved in 1,4-dioxane (25 mL) and water (5 mL) and reacted at 110° C. for 18 h under nitrogen protection. The reaction liquid was filtered by suction, the filtrate was rotary evaporated to dryness, and the crude product was purified by column chromatography (PE/EtOAc=2:1-0:1, gradient elution) to give the title compound as a white solid (1.2 g, yield of 82%). MS (m/z)=291.02 [M+1-1]+.

Step 3: Preparation of 1-methyl-3-(1-methyl-1H-pyrazol-4-yl)-5-(4,4,5,5-tetramethyl-[1,3,2]dioxin-2-yl)-1H-indazole Bis(pinacolato)diboron (1.1 g, 4.1 mmol, 1.5 eq.), 5-bromo-1-methyl-3-(1-methyl-1H-pyrazol-4-yl)-1H-indazole (0.8 g, 2.8 mmol, 1.0 eq.), Pd(dppf)Cl$_2$ (200.9 mg, 274.8 μmol, 0.1 eq.) and KOAc (809.0 mg, 8.2 mmol, 3.0 eq.) were dissolved in 1,4-dioxane (20 mL) and water (5 mL) and reacted at 110° C. for 18 h under nitrogen protection. The reaction liquid was filtered by suction, the filtrate was rotary evaporated to dryness, and the crude product was purified by column chromatography (PE/EtOAc=2:1-0:1, gradient elution) to give the title compound as a yellow oil (0.8 g, yield of 86%). MS (m/z)=339.20 [M+H]+.

Step 4: Preparation of ethyl 8-[1-methyl-3-(1-methy 1-1H-pyrazol-4-yl)-1H-indazol-5-yl]-[1,7]naphthyridine-6-carboxylate Ethyl 8-chloro-1,7-naphthyridine-carboxylate (Intermediate IV) (223.9 mg, 946.2 μmol, 0.8 eq.), 1-methyl-3-(1-methyl-1H-pyrazol-4-yl)-5-(4,4,5,5-tetramethyl-[1,3,2]dioxin-2-yl)-1H-indazole (0.4 g, 1.2 mmol, 1.0 eq.), Pd(dppf)Cl$_2$ (86.5 mg, 118.3 μmol, 0.1 eq.) and K$_2$CO$_3$ (490.4 mg, 3.6 mmol, 3.0 eq.) were dissolved in 1,4-dioxane (25 mL) and water (5 mL) and reacted at 100° C. for 2 h under nitrogen protection. The reaction liquid was filtered by suction, the filtrate was rotary evaporated to dryness, and the crude product was purified by column chromatography (PE/EtOAc=1:1-0:1, gradient elution) to give the title compound as a yellow solid (0.2 g, yield of 41%). MS (m/z)=413.17 [M+1-1]+.

Step 5: Preparation of 8-[1-methyl-3-(1-methy 1-1H-pyrazol-4-yl)-1H-indazol-5-yl]-[1,7]naphthyridine-6-carboxylic acid methylamide Ethyl 8-[1-methyl-3-(1-methy 1-1H-pyrazol-4-yl)-1H-indazol-5-yl]-[1,7]naphthyridine-6-carboxylate (200.0 mg, 484.9 μmol, 1.0 eq.) was added to a solution of methylamine in ethanol (10 mL) and reacted at 80° C. for 2 h. The reaction liquid was rotary evaporated to dryness, and the crude product was purified on a thick preparation plate (CH$_2$Cl$_2$/MeOH=20:1) to give the title compound as a yellow solid (100.0 mg, yield of 52%). $^1$H NMR (400 MHz, DMSO) δ 9.17 (dd, 1H), 8.94 (d, 1H), 8.82 (s, 1H), 8.71 (dd, 1H), 8.60 (s, 1H), 8.38 (s, 1H), 8.28 (dd, 1H), 8.02 (d, 1H), 7.89 (dd, 1H), 7.76 (d, 1H), 4.13 (s, 3H), 3.93 (s, 3H), 2.94 (d, 3H). MS (m/z)=398.17 [M+H]+.

Experimental Example 1 Determination of Affinity to CBP Protein

The affinity of the compounds synthesized in the present patent to the CBP recombinant proteins was determined by competitive HTRF method. His-tagged cyclic adenosine monophosphate response element binding protein (CREB-binding protein, CBP) was expressed in Escherichia coli system and further purified. CBP biotinylated ligands were all self-made. The BL21 star (DE3) competert cells transfected with His-tagged CBP protein genes at N-terminal were cultured at 37° C. for 16 h until the OD value was between 0.6 and 0.8, induced by 0.5 mM of IPTG and cultured overnight. The supernatant of cell lysate was purified by a Ni-ion affinity column and a Superdex75 molecular sieve column sequentially. The purity of resulting CBP proteins was 95%. The fluorescent donor reagent MAb Anti 6HIS—Eu cryptate Gold (Cisbio #61HI2KLA), the receptor reagent Streptavidin-XL665 (#610SAXLA) and the detection buffer (#62SDBRDD) required for HTRF were obtained from CISBIO BIOASSAYS (Codolet, France). Tris(2-carboxyethyl)phosphine hydrochloride (TCEP), sodium chloride, adenosine triphosphate (ATP), Tween-20, dimethylsulfoxide (DMSO), bovine serum albumin (BSA) and HEPES buffer were obtained from SIGMA at the highest level commercially available.

The general procedure of the competitive HTRF assay for the affinity to CBP recombinant proteins is as follows: 0.05% Tween-20 and 1 mM of TCEP were added immediately before the assay, and the assay was performed in a buffer consisting of 0.1 mg/ml BSA, 50 mM of HEPES and 5 mM of NaCl of pH 7.5. 2.5 µL of compound solution in a determination buffer with 4% DMSO and 5 µL of CBP solution in a determination buffer were added to a white low-volume 384-well microtiter plate, incubated at room temperature for 20 min, and then incubated at room temperature for 40 min by adding 2.5 µL of biotin-labeled ligand solution to the determination buffer. The final concentrations of CBP, biotin-labeled ligand and DMSO were 5 nM, 50 nM and 1%, respectively. Then, 5 µL of MAb Anti 6HIS—Eu cryptate Gold and 5 pt of Streptavidin-XL665 in detection buffers from the manufacturer were added to the mixture, and the mixture was incubated for another 60 min. The final concentration of Streptavidin-XL665 was 12.5 nM, and MAb Anti 6HIS—Eu cryptate Gold was diluted according to the final concentration provided by the supplier. The multimode reader Spark from TECAN (Mannedorf, Switzerland) was used to read the plate to detect the homogeneous time-resolved fluorescence intensity of two groups, in which the excitation wavelength was 320 nm and the emission wavelengths were 665 nm and 620 nm. The $IC_{50}$ value of the inhibitor was obtained by fitting fluorescence intensity ratios at 665 nm/620 nm with respect to the inhibitor concentration in an S-shaped dose-response curve by using Prism 7 (La Jolla, 15 CA).

The $IC_{50}$ data of representative compounds provided by the present application are shown in Table 1.

TABLE 1

| Example | $IC_{50}$ (nM) | Example | $IC_{50}$ (nM) | Example | $IC_{50}$ (nM) |
|---|---|---|---|---|---|
| 1 | 72 | 2 | 19 | 3 | 245 |
| 4 | >1000 | 5 | >1000 | 6 | >1000 |
| 7 | >1000 | 8 | >1000 | 9 | >1000 |
| 10 | N/A | 11 | >1000 | 12 | >1000 |
| 13 | 21 | 14 | 15 | 15 | 7.5 |
| 16 | 13 | 17 | 12 | 18 | 19 |
| 19 | 6.9 | 20 | 18 | 21 | 38 |
| 22 | 22 | 23 | 18 | 24 | 7.8 |
| 25 | 4.2 | 26 | 11 | 27 | 3.3 |
| 28 | 5.3 | 29 | 16 | 30 | 22 |
| 31 | 49 | 32 | 36 | 33 | 44 |
| 34 | 32 | 35 | 16 | 36 | 12 |
| 37 | 16 | 38 | 14 | 39 | 13 |
| 40 | 62 | 41 | 57 | 42 | 50 |
| 43 | 6.7 | 44 | 64 | 45 | 8.5 |
| 46 | 5.4 | 47 | 31 | 48 | 13 |
| 49 | 12 | 50 | 54 | 51 | 22 |
| 52 | 27 | 53 | 14 | 54 | 11 |
| 55 | 15 | 56 | 24 | 57 | 36 |

TABLE 1-continued

| Example | $IC_{50}$ (nM) | Example | $IC_{50}$ (nM) | Example | $IC_{50}$ (nM) |
|---|---|---|---|---|---|
| 58 | 100 | 59 | 402 | 60 | 58 |
| 61 | 70 | 62 | 287 | 63 | 136 |
| 64 | 14 | 65 | 12 | 66 | 49 |

"N/A" represents not measured.

What is claimed is:
1. A compound of Formula (I), an isomer thereof or a pharmaceutically acceptable salt thereof:

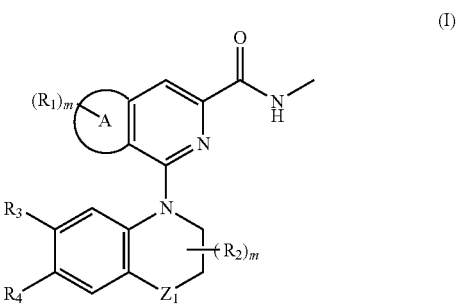

(I)

wherein $R_1$ is selected from hydrogen, $C_1$-$C_6$ alkyl, halogenated $C_1$-$C_6$ alkyl, halogen, cyano, —C(O)$NR_5R_6$, —C(O)$R_5$, —C(O)$OR_5$, —$OR_5$, —OC(O)$R_5$, —OC(O)$OR_5$, —OC(O)$NR_5R_6$, —$NR_5R_6$, —$SR_5$, —S(O)$R_5$, —S(O)$_2R_5$, —(CH$_2$)nOH or a 5-6-membered saturated or unsaturated ring containing 0-3 N, O or S atoms; wherein the 5-6-membered saturated or unsaturated ring containing 0-3 N, O or S atoms is optionally substituted with 1-3 $R_5$;

$R_2$ is selected from hydrogen, $C_1$-$C_6$ alkyl, halogenated $C_1$-$C_6$ alkyl, halogen, cyano, —C(O)$NR_5R_6$, —C(O)$R_5$, —C(O)$OR_5$, —$OR_5$, —OC(O)$R_5$, —OC(O)$OR_5$, —OC(O)$NR_5R_6$, —$NR_5R_6$, —$SR_5$, —S(O)$R_5$, —S(O)$_2R_5$ or —(CH$_2$)nOH;

$R_3$ is selected from hydrogen, $C_1$-$C_6$ alkyl, halogenated $C_1$-$C_6$ alkyl, halogen, cyano, —C(O)$NR_5R_6$, —C(O)$R_5$, —C(O)$OR_5$, —$OR_5$, —OC(O)$R_5$, —OC(O)$OR_5$, —OC(O)$NR_5R_6$, —$NR_5R_6$, —$SR_5$, —S(O)$R_5$, —S(O)$_2R_5$, —(CH$_2$)nOH or a 5-6-membered saturated or unsaturated ring containing 0-3 N, O or S atoms; wherein the 5-6-membered saturated or unsaturated ring containing 0-3 N, O or S atoms is optionally substituted with 1-3 $R_5$;

$R_4$ is selected from hydrogen, $C_1$-$C_6$ alkyl, halogenated $C_1$-$C_6$ alkyl, halogen, cyano, —C(O)$NR_5R_6$, —C(O)$R_5$, —C(O)$OR_5$, —$OR_5$, —OC(O)$R_5$, —OC(O)$OR_5$, —OC(O)$NR_5R_6$, —$NR_5R_6$, —$SR_5$, —S(O)$R_5$, —S(O)$_2R_5$, —(CH$_2$)nOH or a 5-6-membered saturated or unsaturated ring containing 0-3 N, O or S atoms; wherein the 5-6-membered saturated or unsaturated ring containing 0-3 N, O or S atoms is optionally substituted with 1-3 $R_5$;

each $R_5$ and $R_6$ is independently selected from hydrogen, $C_1$-$C_6$ alkyl, $C_3$-$C_6$ cycloalkyl, 3-6-membered heterocyclyl optionally substituted with $R_7$, halogenated $C_1$-$C_6$ alkyl, halogen, =O, —(CH$_2$)nC(O)$NR_7R_8$, —C(O)$R_7$, —C(O)$OR_7$, —$OR_7$, —OC(O)$R_7$, —OC(O)$OR_7$, —OC(O)$NR_7R_8$, —(CH$_2$)n$NR_7R_8$, —$SR_7$, —S(O)$R_7$, —(CH$_2$)nS(O)$_2R_7$, —(CH$_2$)nOH or —(CH$_2$)nCN;

each R₇ and R₈ is independently selected from hydrogen or $C_1$-$C_6$ alkyl;

$Z_1$ is —CH₂— or —O—;

the ring A is a 5-6-membered saturated or unsaturated ring containing 0-3 N, O or S atoms; and each m and n is independently selected from 0, 1, 2 or 3.

2. The compound, the isomer thereof or the pharmaceutically acceptable salt thereof according to claim 1, wherein Formula (I) is Formula (Ia), Formula (Ib), Formula (Ic), Formula (Id) or Formula (Ie):

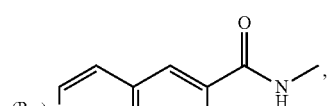
(Ia)

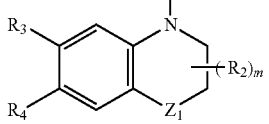
(Ib)

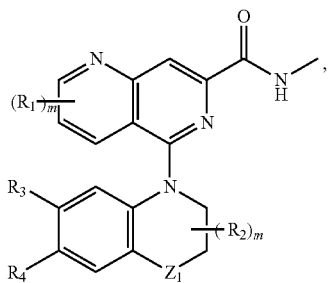
(Ic)

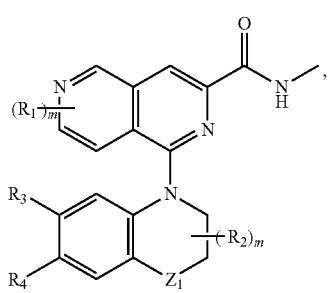
(Id)

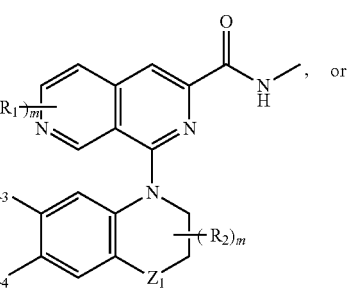
(Ie)

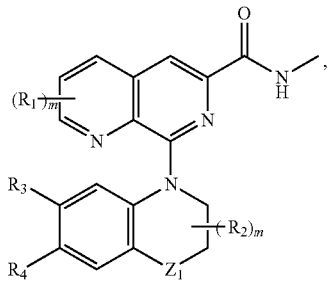

wherein $R_1$ is selected from hydrogen, $C_1$-$C_6$ alkyl, halogenated $C_1$-$C_6$ alkyl, halogen, cyano, —C(O)NR₅R₆, —C(O)R₅, —C(O)OR₅, —OR₅, —OC(O)R₅, —OC(O)OR₅, —OC(O)NR₅R₆, —NR₅R₆, —SR₅, —S(O)R₅, —S(O)₂R₅, —(CH₂)nOH or a 5-6-membered saturated or unsaturated ring containing 0-3 N, O or S atoms; wherein the 5-6-membered saturated or unsaturated ring containing 0-3 N, O or S atoms is optionally substituted with 1-3 R₅;

$R_2$ is selected from hydrogen, $C_1$-$C_6$ alkyl, halogenated $C_1$-$C_6$ alkyl, halogen, cyano, —C(O)NR₅R₆, —C(O)R₅, —C(O)OR₅, —OR₅, —OC(O)R₅, —OC(O)OR₅, —OC(O)NR₅R₆, —NR₅R₆, —SR₅, —S(O)R₅, —S(O)₂R₅ or —(CH₂)nOH;

$R_3$ is selected from hydrogen, $C_1$-$C_6$ alkyl, halogenated $C_1$-$C_6$ alkyl, halogen, cyano, —C(O)NR₅R₆, —C(O)R₅, —C(O)OR₅, —OR₅, —OC(O)R₅, —OC(O)OR₅, —OC(O)NR₅R₆, —NR₅R₆, —SR₅, —S(O)R₅, —S(O)₂R₅, —(CH₂)nOH or a 5-6-membered saturated or unsaturated ring containing 0-3 N, O or S atoms; wherein the 5-6-membered saturated or unsaturated ring containing 0-3 N, O or S atoms is optionally substituted with 1-3 R₅;

$R_4$ is selected from hydrogen, $C_1$-$C_6$ alkyl, halogenated $C_1$-$C_6$ alkyl, halogen, cyano, —C(O)NR₅R₆, —C(O)R₅, —C(O)OR₅, —OR₅, —OC(O)R₅, —OC(O)OR₅, —OC(O)NR₅R₆, —NR₅R₆, —SR₅, —S(O)R₅, —S(O)₂R₅, —(CH₂)nOH or a 5-6-membered saturated or unsaturated ring containing 0-3 N, O or S atoms; wherein the 5-6-membered saturated or unsaturated ring containing 0-3 N, O or S atoms is optionally substituted with 1-3 R₅;

each $R_5$ and $R_6$ is independently selected from hydrogen, $C_1$-$C_6$ alkyl, $C_3$-$C_6$ cycloalkyl, 3-6-membered heterocyclyl optionally substituted with R₇, halogenated $C_1$-$C_6$ alkyl, halogen, =O, —(CH₂)nC(O)NR₇R₈, —C(O)R₇, —C(O)OR₇, —OR₇, —OC(O)R₇, —OC(O)OR₇, —OC(O)NR₇R₈, —(CH₂)nNR₇R₈, —SR₇, —S(O)R₇, —(CH₂)nS(O)₂R₇, —(CH₂)nOH or —(CH₂)nCN;

each $R_7$ and $R_8$ is independently selected from hydrogen or $C_1$-$C_6$ alkyl;

$Z_1$ is —CH₂— or —O—; and m and n are independently selected from 0, 1, 2 or 3.

3. The compound, the isomer thereof or the pharmaceutically acceptable salt thereof according to claim 1, wherein Formula (I) is Formula (If), Formula (Ig) or Formula (Ih):

(If)

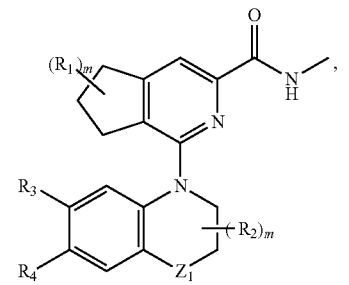

(Ig)

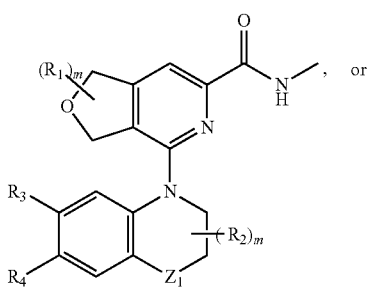

or (Ih)

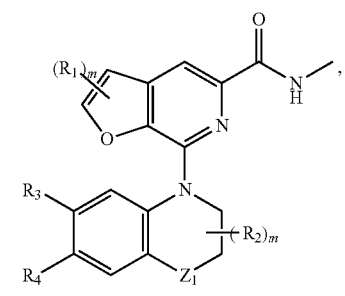

wherein $R_1$ is selected from hydrogen, $C_1$-$C_6$ alkyl, halogenated $C_1$-$C_6$ alkyl, halogen, cyano, —C(O)NR$_5$R$_6$, —C(O)R$_5$, —C(O)OR$_5$, —OR$_5$, —OC(O)R$_5$, —OC(O)OR$_5$, —OC(O)NR$_5$R$_6$, —NR$_5$R$_6$, —SR$_5$, —S(O)R$_5$, —S(O)$_2$R$_5$, —(CH$_2$)nOH or a 5-6-membered saturated or unsaturated ring containing 0-3 N, O or S atoms; wherein the 5-6-membered saturated or unsaturated ring containing 0-3 N, O or S atoms is optionally substituted with 1-3 $R_5$;

$R_2$ is selected from hydrogen, $C_1$-$C_6$ alkyl, halogenated $C_1$-$C_6$ alkyl, halogen, cyano, —C(O)NR$_5$R$_6$, —C(O)R$_5$, —C(O)OR$_5$, —OR$_5$, —OC(O)R$_5$, —OC(O)OR$_5$, —OC(O)NR$_5$R$_6$, —NR$_5$R$_6$, —SR$_5$, —S(O)R$_5$, —S(O)$_2$R$_5$ or —(CH$_2$)nOH;

$R_3$ is selected from hydrogen, $C_1$-$C_6$ alkyl, halogenated $C_1$-$C_6$ alkyl, halogen, cyano, —C(O)NR$_5$R$_6$, —C(O)R$_5$, —C(O)OR$_5$, —OR$_5$, —OC(O)R$_5$, —OC(O)OR$_5$, —OC(O)NR$_5$R$_6$, —NR$_5$R$_6$, —SR$_5$, —S(O)R$_5$, —S(O)$_2$R$_5$, —(CH$_2$)nOH or a 5-6-membered saturated or unsaturated ring containing 0-3 N, O or S atoms; wherein the 5-6-membered saturated or unsaturated ring containing 0-3 N, O or S atoms is optionally substituted with 1-3 $R_5$;

$R_4$ is selected from hydrogen, $C_1$-$C_6$ alkyl, halogenated $C_1$-$C_6$ alkyl, halogen, cyano, —C(O)NR$_5$R$_6$, —C(O)R$_5$, —C(O)OR$_5$, —OR$_5$, —OC(O)R$_5$, —OC(O)OR$_5$, —OC(O)NR$_5$R$_6$, —NR$_5$R$_6$, —SR$_5$, —S(O)R$_5$, —S(O)$_2$R$_5$, —(CH$_2$)nOH or a 5-6-membered saturated or unsaturated ring containing 0-3 N, O or S atoms; wherein the 5-6-membered saturated or unsaturated ring containing 0-3 N, O or S atoms is optionally substituted with 1-3 $R_5$;

each $R_5$ and $R_6$ is independently selected from hydrogen, $C_1$-$C_6$ alkyl, $C_3$-$C_6$ cycloalkyl, 3-6-membered heterocyclyl optionally substituted with $R_7$, halogenated $C_1$-$C_6$ alkyl, halogen, =O, —(CH$_2$)nC(O)NR$_7$R$_8$, —C(O)R$_7$, —C(O)OR$_7$, —OR$_7$, —OC(O)R$_7$, —OC(O)OR$_7$, —OC(O)NR$_7$R$_8$, —(CH$_2$)nNR$_7$R$_8$, —SR$_7$, —S(O)R$_7$, —(CH$_2$)nS(O)$_2$R$_7$, —(CH$_2$)nOH or —(CH$_2$)nCN;

each $R_7$ and $R_8$ is independently selected from hydrogen or $C_1$-$C_6$ alkyl;

$Z_1$ is —CH$_2$— or —O—; and m and n are independently selected from 0, 1, 2 or 3.

4. The compound, the isomer thereof or the pharmaceutically acceptable salt thereof according to claim 1, wherein $R_1$ is selected from hydrogen, halogen, methoxy,

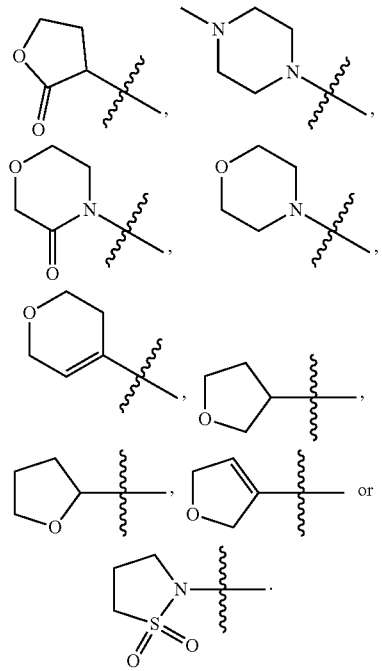

5. The compound, the isomer thereof or the pharmaceutically acceptable salt thereof according to claim 1, wherein $R_2$ is selected from —OH or —NHCH$_3$.

6. The compound, the isomer thereof or the pharmaceutically acceptable salt thereof according to claim 1, wherein $R_3$ is selected from hydrogen, halogen or halogenated $C_1$-$C_6$ alkyl.

7. The compound, the isomer thereof or the pharmaceutically acceptable salt thereof according to claim 6, wherein $R_3$ is —CHF$_2$.

8. The compound, the isomer thereof or the pharmaceutically acceptable salt thereof according to claim 1, wherein $R_4$ is selected from hydrogen, —CH$_2$OH, —C(O) NHCH$_3$,

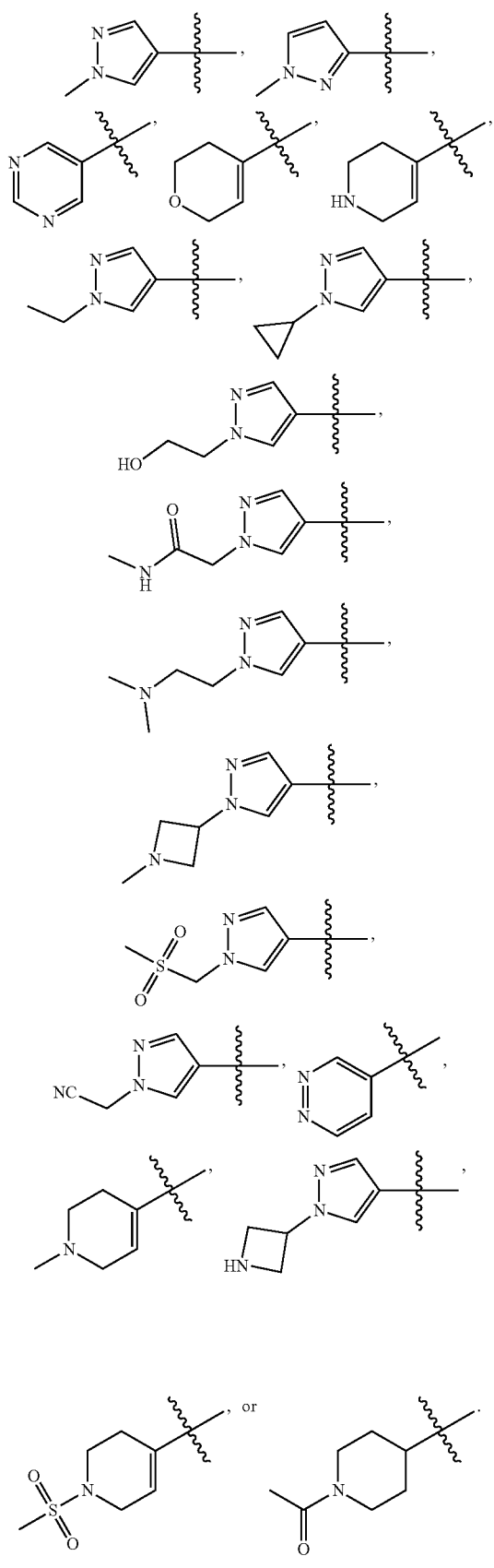
9. A compound having the following structure, an isomer thereof or a pharmaceutically acceptable salt thereof:
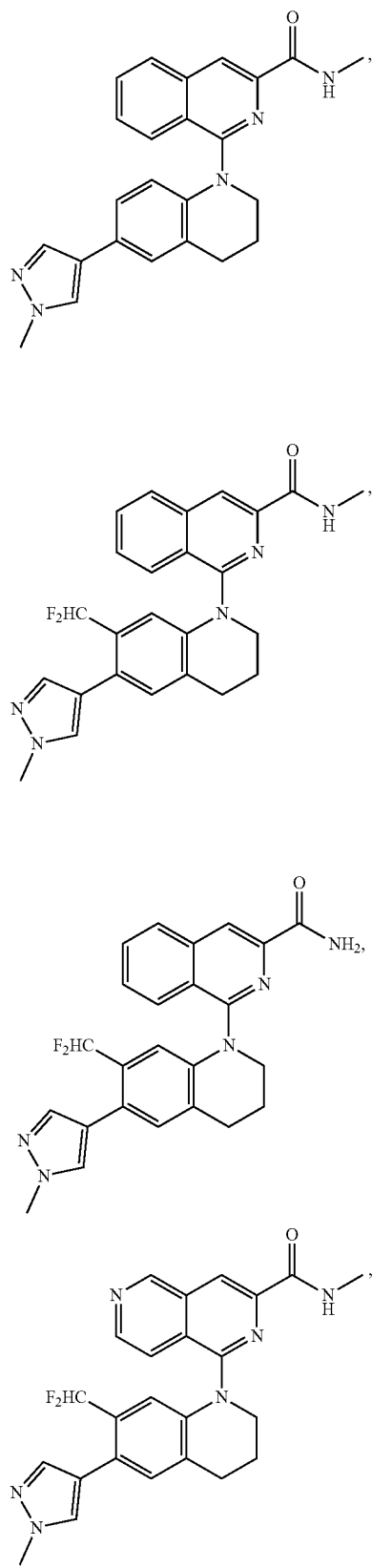

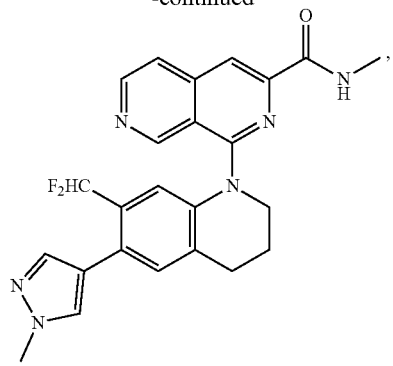
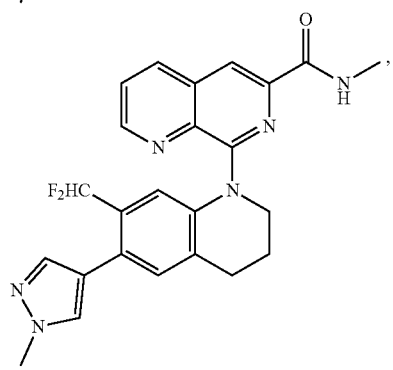
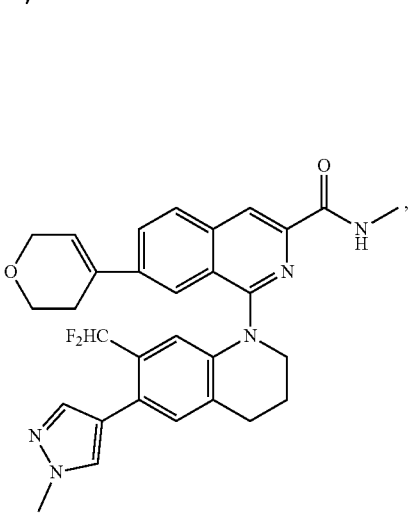
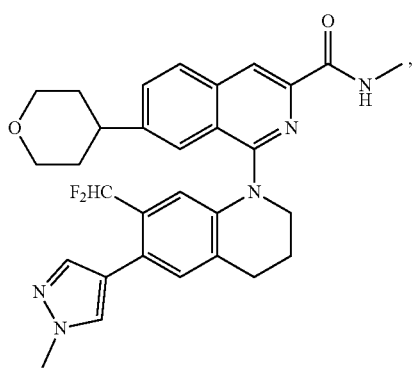
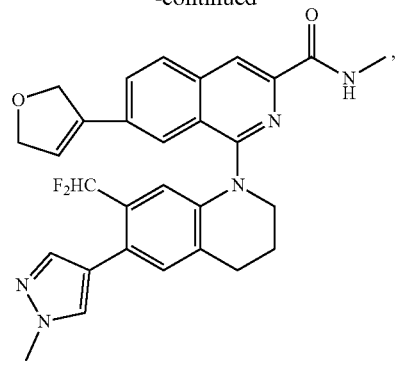
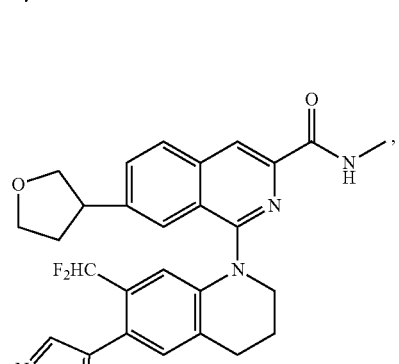
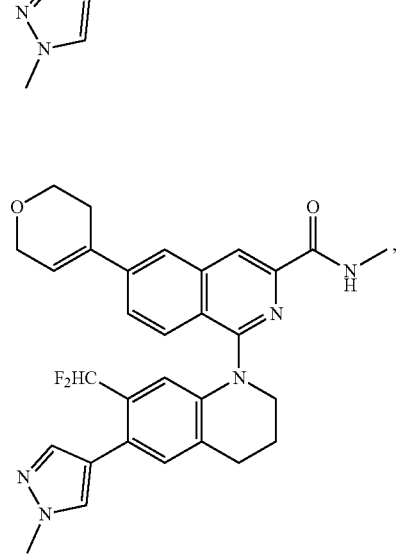
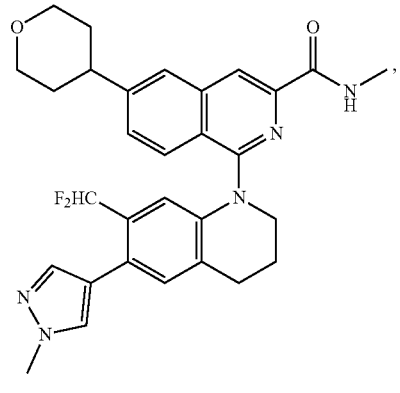

93
-continued
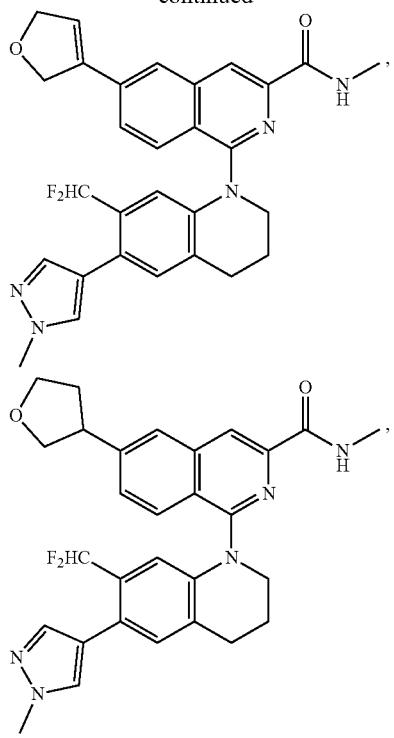
94
-continued
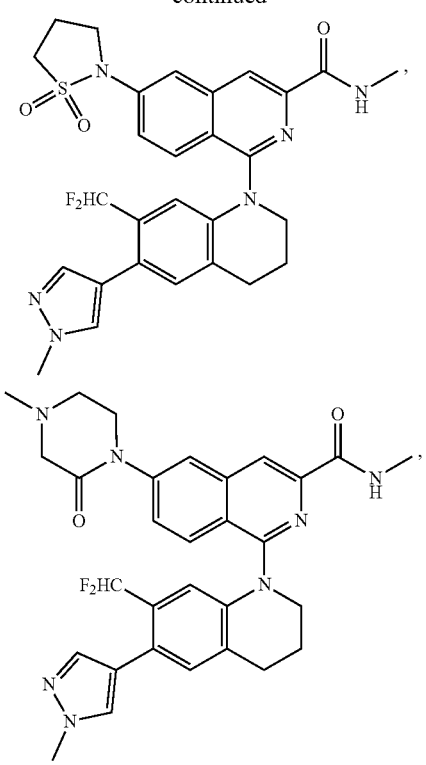
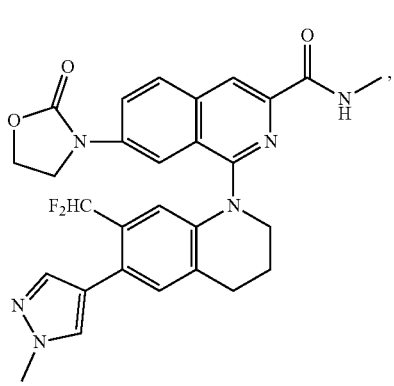
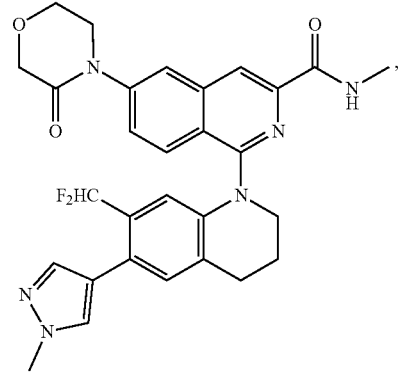
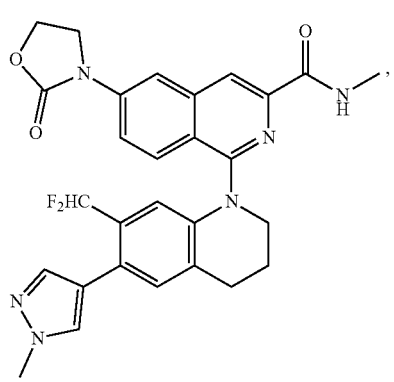
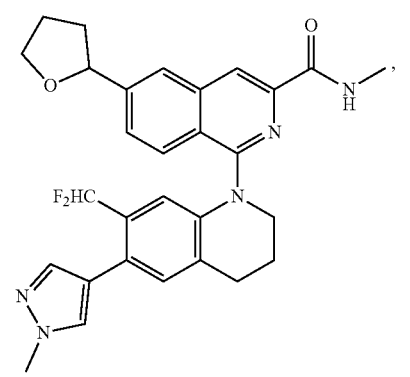

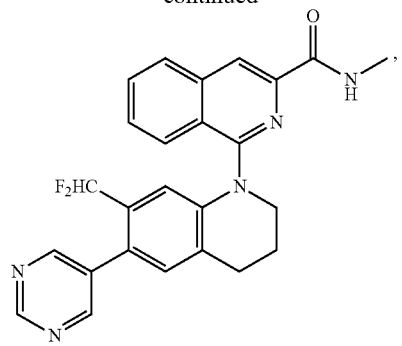
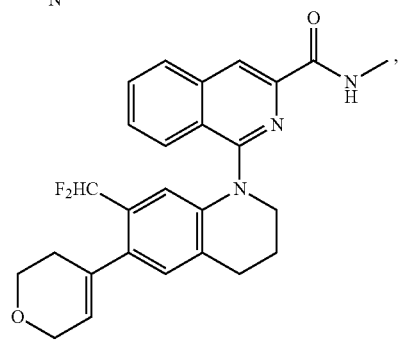
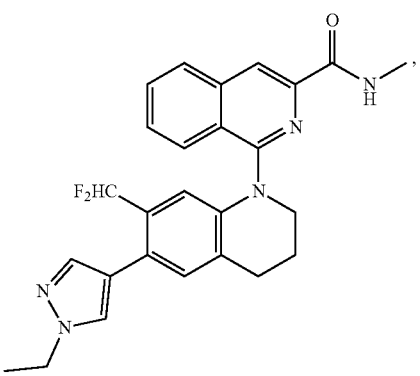
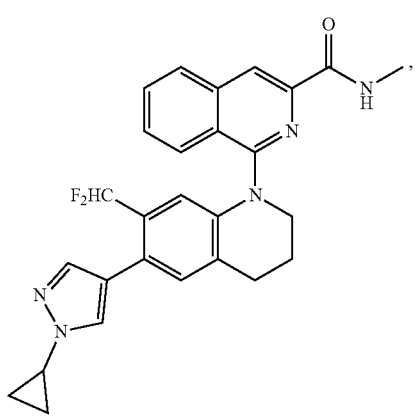
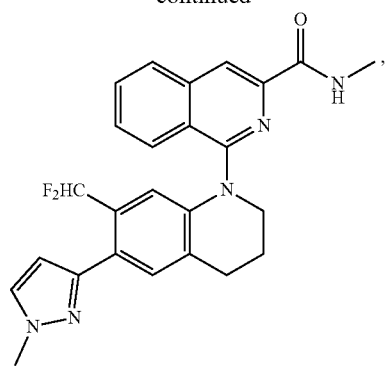
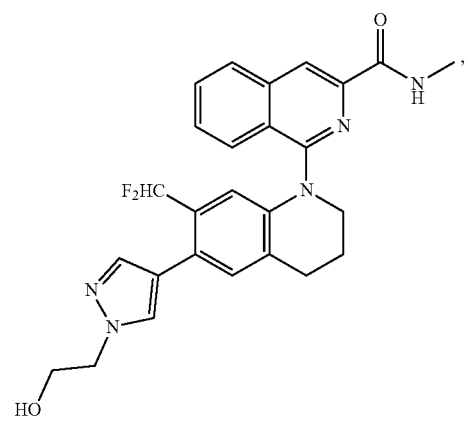
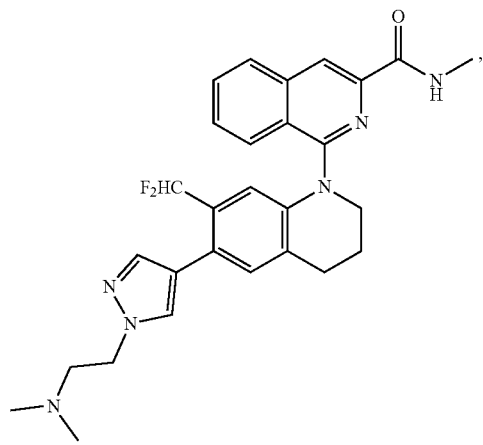
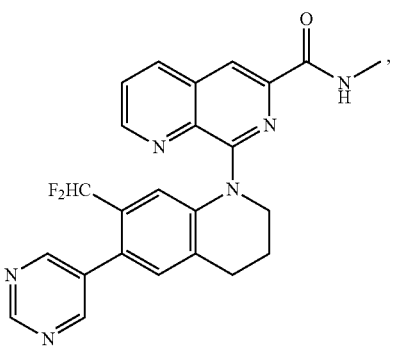

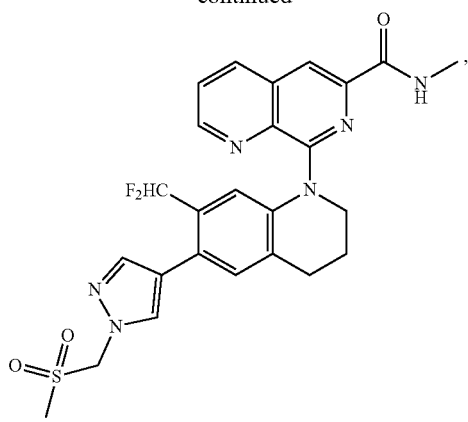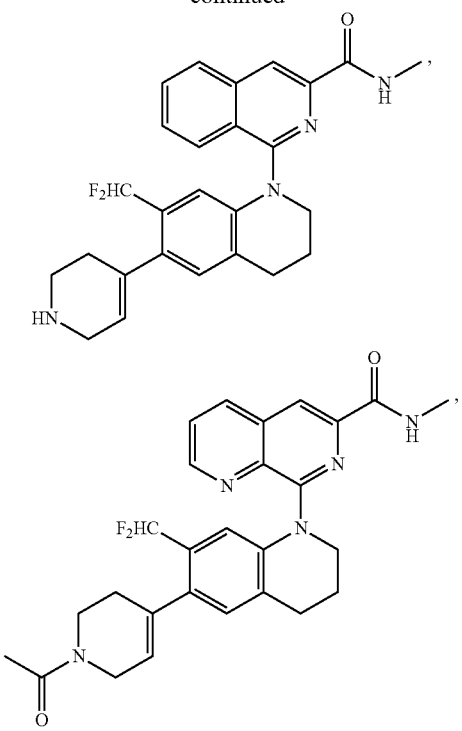

99
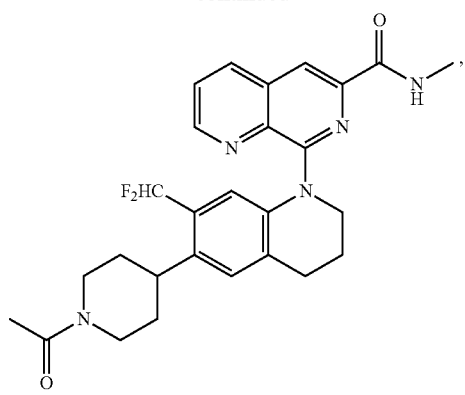
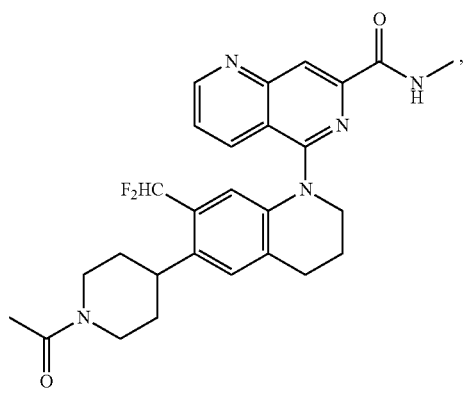
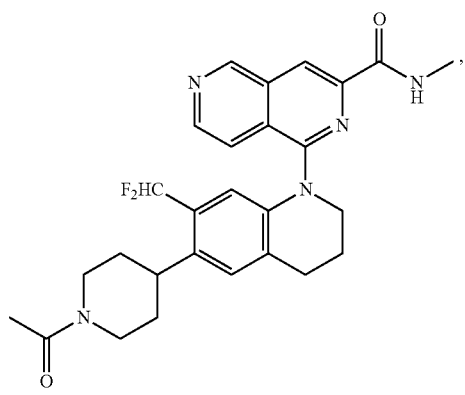
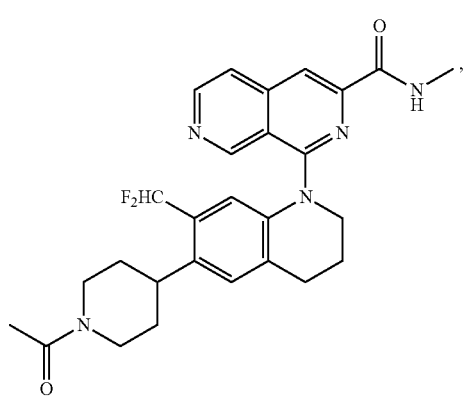
100
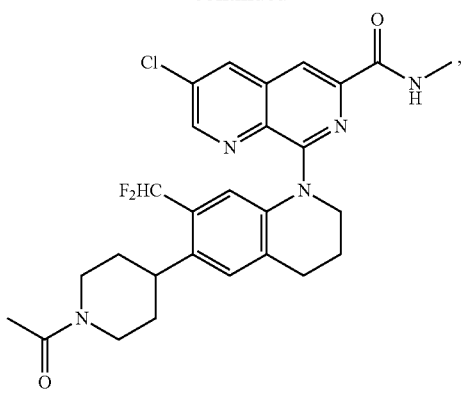
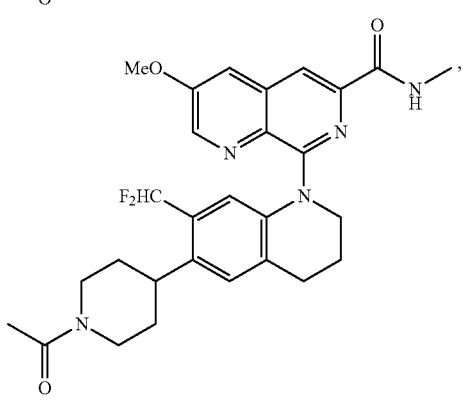
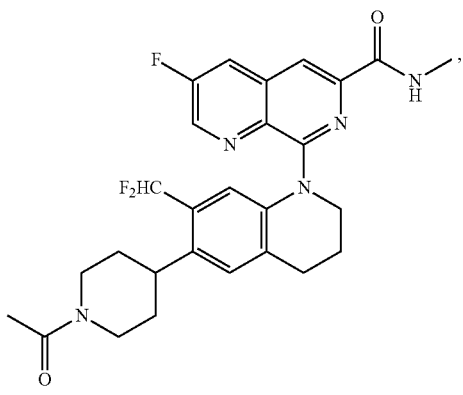
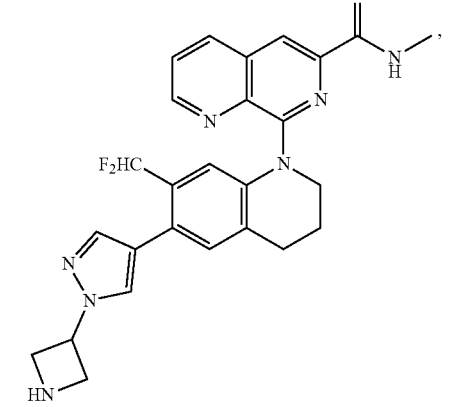

101
-continued
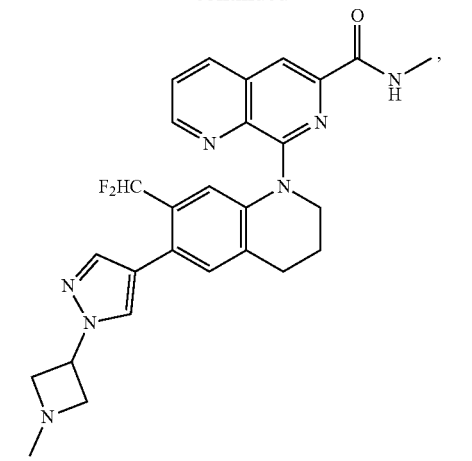
102
-continued
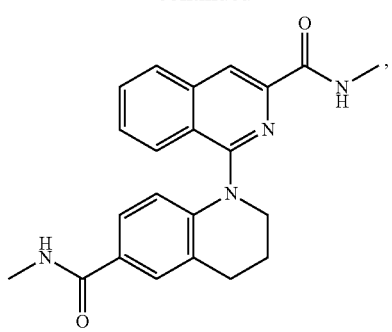
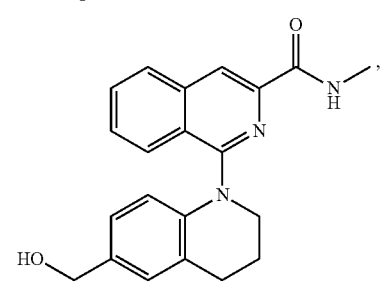
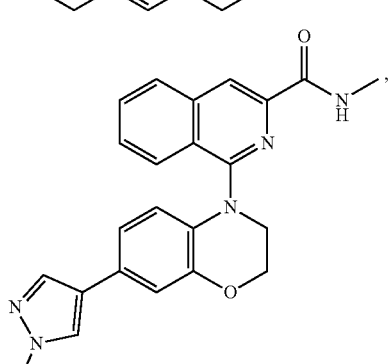
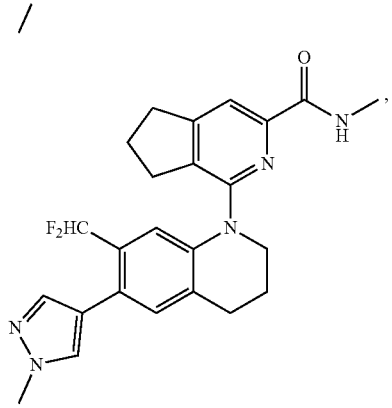
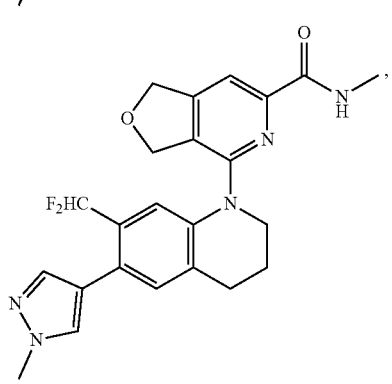

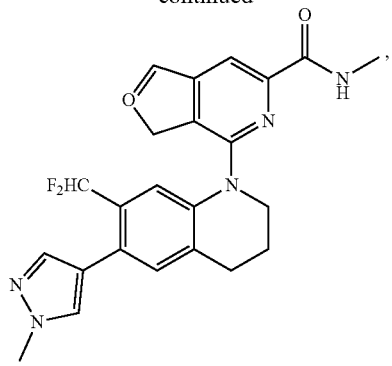

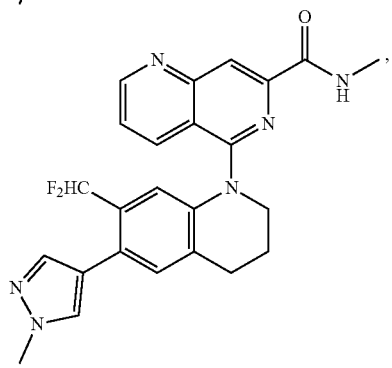

or

10. A pharmaceutical composition, comprising a therapeutically effective amount of the compound, the isomer thereof or the pharmaceutically acceptable salt thereof according to claim 1, and a pharmaceutically acceptable carrier or excipient.

11. The pharmaceutical composition according to claim 10, further comprising one or more other anti-cancer drugs.

12. The pharmaceutical composition according to claim 11, wherein the anti-cancer drug is a chemotherapy drug.

13. A pharmaceutical composition, comprising a therapeutically effective amount of the compound, the isomer thereof or the pharmaceutically acceptable salt thereof according to claim 9, and a pharmaceutically acceptable carrier or excipient.

14. The pharmaceutical composition according to claim 13, further comprising one or more other anti-cancer drugs.

* * * * *